United States Patent
Onyon et al.

(10) Patent No.: US 9,542,076 B1
(45) Date of Patent: Jan. 10, 2017

(54) SYSTEM FOR AND METHOD OF UPDATING A PERSONAL PROFILE

(71) Applicant: Synchronoss Technologies, Inc., Bridgewater, NJ (US)

(72) Inventors: Richard Onyon, San Jose, CA (US); Liam Stannard, San Jose, CA (US); Leighton Ridgard, San Jose, CA (US)

(73) Assignee: Synchronoss Technologies, Inc., Bridgewater, NJ (US)

( * ) Notice: Subject to any disclaimer, the term of this patent is extended or adjusted under 35 U.S.C. 154(b) by 20 days.

(21) Appl. No.: 14/049,055

(22) Filed: Oct. 8, 2013

Related U.S. Application Data

(60) Division of application No. 12/856,327, filed on Aug. 13, 2010, which is a continuation-in-part of application No. 11/128,121, filed on May 12, 2005, now Pat. No. 8,611,873.

(60) Provisional application No. 60/570,409, filed on May 12, 2004.

(51) Int. Cl.
  *G06F 3/048* (2013.01)
  *G06F 3/0482* (2013.01)

(52) U.S. Cl.
  CPC .................... *G06F 3/0482* (2013.01)

(58) Field of Classification Search
  None
  See application file for complete search history.

(56) References Cited

U.S. PATENT DOCUMENTS

| | | |
|---|---|---|
| 4,887,212 A | 12/1989 | Zamora et al. |
| 5,111,398 A | 5/1992 | Nunberg et al. |
| 5,115,466 A | 5/1992 | Presttun |
| 5,130,993 A | 7/1992 | Gutman et al. |
| 5,146,221 A | 9/1992 | Whiting et al. |
| 5,204,902 A | 4/1993 | Reeds et al. |
| 5,329,619 A | 7/1994 | Page et al. |
| 5,392,390 A | 2/1995 | Crozier |
| 5,418,854 A | 5/1995 | Kaufman et al. |
| 5,418,908 A | 5/1995 | Keller et al. |
| 5,425,079 A | 6/1995 | Noda et al. |
| 5,483,352 A | 1/1996 | Fukuyama |

(Continued)

FOREIGN PATENT DOCUMENTS

| | | |
|---|---|---|
| CN | 1202662 | 12/1998 |
| CN | 1455522 | 11/2003 |

(Continued)

OTHER PUBLICATIONS

Bob Temple, The Complete Idiot's Guide to Microsoft Outlook 2000, Que, A division of Macmillian Computer Publishing, 1999, pp. 158-167.*

(Continued)

*Primary Examiner* — Tyler Torgrimson
(74) *Attorney, Agent, or Firm* — Synchronoss Technologies, Inc; Frederick W. Dour

(57) ABSTRACT

A living address book allows subscribers to define their own personas as collections of information which define the users. Subscribers can then publish their persona(s) to their friends' and associates' mobile phones and update the others' address books with the subscriber's contact information. Users can also specify different personas to be presented to different users. The living address book graphical user interface allows more efficient and easier access to data.

41 Claims, 36 Drawing Sheets

(56) References Cited

U.S. PATENT DOCUMENTS

| | | |
|---|---|---|
| 5,485,161 A | 1/1996 | Vaughn |
| 5,509,070 A | 4/1996 | Schull |
| 5,519,433 A | 5/1996 | Lappington et al. |
| 5,519,606 A | 5/1996 | Frid-Nielsen et al. |
| 5,543,789 A | 8/1996 | Behr et al. |
| 5,544,061 A | 8/1996 | Morimoto et al. |
| 5,561,446 A | 10/1996 | Montlick |
| 5,574,906 A | 11/1996 | Morris |
| 5,579,489 A | 11/1996 | Dornier et al. |
| 5,588,009 A | 12/1996 | Will |
| 5,592,470 A | 1/1997 | Rudrapatna et al. |
| 5,623,406 A | 4/1997 | Ichibah |
| 5,623,661 A | 4/1997 | Hon |
| 5,628,005 A | 5/1997 | Hurvig |
| 5,630,081 A | 5/1997 | Rybicki et al. |
| 5,638,508 A | 6/1997 | Kanai et al. |
| 5,640,577 A | 6/1997 | Scharmer |
| 5,644,709 A | 7/1997 | Austin |
| 5,647,002 A | 7/1997 | Brunson |
| 5,649,195 A | 7/1997 | Scott et al. |
| 5,650,800 A | 7/1997 | Benson |
| 5,657,372 A | 8/1997 | Ahlberg |
| 5,666,397 A | 9/1997 | Lamons et al. |
| 5,666,553 A | 9/1997 | Crozier |
| 5,682,524 A | 10/1997 | Freund et al. |
| 5,684,990 A | 11/1997 | Boothby |
| 5,694,596 A | 12/1997 | Campbell |
| 5,699,255 A | 12/1997 | Ellis et al. |
| 5,701,423 A | 12/1997 | Crozier |
| 5,706,509 A | 1/1998 | Man-Hak Tso |
| 5,710,922 A | 1/1998 | Alley et al. |
| 5,727,202 A | 3/1998 | Kucala |
| 5,727,950 A | 3/1998 | Cook et al. |
| 5,729,735 A | 3/1998 | Meyering |
| 5,729,739 A | 3/1998 | Cantin et al. |
| 5,729,743 A | 3/1998 | Squibb |
| 5,742,792 A | 4/1998 | Yanai et al. |
| 5,745,750 A | 4/1998 | Porcaro |
| 5,745,906 A | 4/1998 | Squibb |
| 5,757,920 A | 5/1998 | Misra et al. |
| 5,758,150 A | 5/1998 | Bell et al. |
| 5,758,354 A | 5/1998 | Huang et al. |
| 5,758,355 A | 5/1998 | Buchanan |
| 5,764,899 A | 6/1998 | Eggleston et al. |
| 5,768,480 A | 6/1998 | Crawford, Jr. et al. |
| 5,768,597 A | 6/1998 | Simm |
| 5,771,354 A | 6/1998 | Crawford |
| 5,778,346 A | 7/1998 | Frid-Nielsen et al. |
| 5,778,361 A | 7/1998 | Nanjo et al. |
| 5,778,367 A | 7/1998 | Wesinger et al. |
| 5,778,388 A | 7/1998 | Kawamura et al. |
| 5,781,901 A | 7/1998 | Kuzma |
| 5,787,247 A | 7/1998 | Norin et al. |
| 5,787,262 A | 7/1998 | Shakib et al. |
| 5,794,228 A | 8/1998 | French et al. |
| 5,801,699 A * | 9/1998 | Hocker et al. ............ 715/837 |
| 5,804,803 A | 9/1998 | Cragun et al. |
| 5,809,497 A | 9/1998 | Freund et al. |
| 5,812,773 A | 9/1998 | Norin |
| 5,812,793 A | 9/1998 | Shakib et al. |
| 5,818,437 A | 10/1998 | Grover et al. |
| 5,826,245 A | 10/1998 | Sandberg-Diment |
| 5,828,376 A * | 10/1998 | Solimene et al. ............ 715/821 |
| 5,832,489 A | 11/1998 | Kucala |
| 5,832,518 A | 11/1998 | Mastors |
| 5,832,519 A | 11/1998 | Bowen et al. |
| 5,832,520 A | 11/1998 | Miller |
| 5,845,283 A | 12/1998 | Williams et al. |
| 5,859,973 A | 1/1999 | Carpenter |
| 5,864,864 A | 1/1999 | Lerner |
| 5,875,296 A | 2/1999 | Shi et al. |
| 5,884,323 A | 3/1999 | Hawkins et al. |
| 5,884,325 A | 3/1999 | Bauer et al. |
| 5,893,119 A | 4/1999 | Squibb |
| 5,896,321 A | 4/1999 | Miller |
| 5,897,640 A | 4/1999 | Veghte et al. |
| 5,897,642 A | 4/1999 | Capossela et al. |
| 5,903,723 A | 5/1999 | Beck et al. |
| 5,907,793 A | 5/1999 | Reams |
| 5,909,568 A | 6/1999 | Nason |
| 5,923,756 A | 7/1999 | Shambroom |
| 5,923,848 A | 7/1999 | Goodhand et al. |
| 5,926,816 A | 7/1999 | Bauer et al. |
| 5,933,653 A | 8/1999 | Ofek |
| 5,933,778 A | 8/1999 | Buhrmann et al. |
| 5,933,816 A | 8/1999 | Zeanah et al. |
| 5,935,262 A | 8/1999 | Barrett et al. |
| 5,937,405 A | 8/1999 | Campbell |
| 5,941,944 A | 8/1999 | Messerly |
| 5,943,676 A | 8/1999 | Boothby |
| 5,944,787 A | 8/1999 | Zoken |
| 5,946,615 A | 8/1999 | Holmes et al. |
| 5,948,066 A | 9/1999 | Whalen et al. |
| 5,950,193 A | 9/1999 | Kulkarni |
| 5,951,636 A | 9/1999 | Zerber |
| 5,961,572 A | 10/1999 | Craport et al. |
| 5,961,590 A | 10/1999 | Mendez et al. |
| 5,966,717 A | 10/1999 | Sass |
| 5,968,131 A | 10/1999 | Mendez et al. |
| 5,970,149 A | 10/1999 | Johnson |
| 5,970,490 A | 10/1999 | Morgenstern |
| 5,971,277 A | 10/1999 | Cragun et al. |
| 5,974,238 A | 10/1999 | Chase, Jr. |
| 5,974,563 A | 10/1999 | Beeler, Jr. |
| 5,987,381 A | 11/1999 | Oshizawa |
| 5,987,609 A | 11/1999 | Hasebe |
| 5,995,118 A | 11/1999 | Masuda |
| 6,000,000 A | 12/1999 | Hawkins et al. |
| 6,006,215 A | 12/1999 | Retallick |
| 6,006,274 A | 12/1999 | Hawkins et al. |
| 6,009,462 A | 12/1999 | Birrell et al. |
| 6,012,063 A | 1/2000 | Bodnar |
| 6,012,088 A | 1/2000 | Li et al. |
| 6,014,695 A | 1/2000 | Yamashita et al. |
| 6,016,394 A | 1/2000 | Walker |
| 6,016,478 A | 1/2000 | Zhang et al. |
| 6,023,620 A | 2/2000 | Harisson |
| 6,023,708 A | 2/2000 | Mendez et al. |
| 6,023,723 A | 2/2000 | McCormick et al. |
| 6,026,414 A | 2/2000 | Anglin |
| 6,034,621 A * | 3/2000 | Kaufman ............ 340/7.21 |
| 6,038,665 A | 3/2000 | Bolt et al. |
| 6,044,381 A | 3/2000 | Boothby et al. |
| 6,049,776 A | 4/2000 | Donnelly et al. |
| 6,052,735 A | 4/2000 | Ulrich et al. |
| 6,058,399 A | 5/2000 | Morag et al. |
| 6,061,790 A | 5/2000 | Bodnar |
| 6,061,796 A | 5/2000 | Chen et al. |
| 6,063,134 A | 5/2000 | Peters et al. |
| 6,064,880 A | 5/2000 | Alanara |
| 6,065,018 A | 5/2000 | Beier et al. |
| 6,067,582 A | 5/2000 | Smith et al. |
| 6,073,133 A | 6/2000 | Chrabaszcz |
| 6,076,109 A | 6/2000 | Kikinis |
| 6,078,960 A | 6/2000 | Ballard |
| 6,081,900 A | 6/2000 | Subramaniam et al. |
| 6,084,951 A * | 7/2000 | Smith et al. ............ 379/93.17 |
| 6,094,618 A | 7/2000 | Harada |
| 6,101,480 A | 8/2000 | Conmy et al. |
| 6,108,330 A | 8/2000 | Bhatia et al. |
| 6,108,703 A | 8/2000 | Leighton et al. |
| 6,112,024 A | 8/2000 | Almond et al. |
| 6,115,797 A | 9/2000 | Kanda et al. |
| 6,131,096 A | 10/2000 | Ng et al. |
| 6,131,116 A | 10/2000 | Riggins et al. |
| 6,141,011 A | 10/2000 | Bodnar et al. |
| 6,141,621 A | 10/2000 | Piwowarski et al. |
| 6,141,659 A | 10/2000 | Barker et al. |
| 6,141,664 A | 10/2000 | Boothby |
| 6,145,088 A | 11/2000 | Stevens |
| 6,148,260 A | 11/2000 | Musk et al. |
| 6,151,606 A | 11/2000 | Mendez |
| 6,157,630 A | 12/2000 | Adler et al. |
| 6,163,773 A | 12/2000 | Kishi |

(56) References Cited

U.S. PATENT DOCUMENTS

| | | | |
|---|---|---|---|
| 6,163,779 A | 12/2000 | Mantha et al. | |
| 6,163,844 A | 12/2000 | Duncan et al. | |
| 6,167,120 A | 12/2000 | Kikinis | |
| 6,173,310 B1 | 1/2001 | Yost et al. | |
| 6,173,311 B1 | 1/2001 | Hassett et al. | |
| 6,182,117 B1 | 1/2001 | Christie et al. | |
| 6,182,141 B1 | 1/2001 | Blum et al. | |
| 6,185,598 B1 | 2/2001 | Farber et al. | |
| 6,189,030 B1 | 2/2001 | Kirsch et al. | |
| 6,189,096 B1 | 2/2001 | Haverty | |
| 6,195,695 B1 | 2/2001 | Cheston et al. | |
| 6,195,794 B1 | 2/2001 | Buxton | |
| 6,202,085 B1 | 3/2001 | Benson et al. | |
| 6,205,448 B1 | 3/2001 | Kruglikov et al. | |
| 6,209,034 B1 | 3/2001 | Gladwin et al. | |
| 6,212,529 B1 | 4/2001 | Boothby et al. | |
| 6,212,556 B1 | 4/2001 | Arunachalam | |
| 6,216,131 B1 | 4/2001 | Liu et al. | |
| 6,219,680 B1 | 4/2001 | Bernardo et al. | |
| 6,219,694 B1 | 4/2001 | Lazaridis et al. | |
| 6,223,187 B1 | 4/2001 | Boothby et al. | |
| 6,226,650 B1 | 5/2001 | Mahajan et al. | |
| 6,233,565 B1 | 5/2001 | Lewis et al. | |
| 6,233,589 B1 | 5/2001 | Balcha et al. | |
| 6,243,705 B1 | 6/2001 | Kucala | |
| 6,243,760 B1 | 6/2001 | Armbruster et al. | |
| 6,246,889 B1 | 6/2001 | Boltz | |
| 6,247,048 B1 | 6/2001 | Greer et al. | |
| 6,247,135 B1 | 6/2001 | Feague | |
| 6,249,690 B1 | 6/2001 | Mashiko | |
| 6,252,547 B1 | 6/2001 | Perry et al. | |
| 6,255,989 B1 | 7/2001 | Munson et al. | |
| 6,256,750 B1 | 7/2001 | Takeda | |
| 6,260,124 B1 | 7/2001 | Crockett et al. | |
| 6,269,405 B1 | 7/2001 | Dutcher et al. | |
| 6,272,545 B1 | 8/2001 | Flanagin et al. | |
| 6,275,831 B1 | 8/2001 | Bodnar et al. | |
| 6,278,941 B1 | 8/2001 | Yokoyama | |
| 6,282,435 B1 | 8/2001 | Wagner et al. | |
| 6,282,698 B1 | 8/2001 | Baker et al. | |
| 6,285,889 B1 | 9/2001 | Nykanen et al. | |
| 6,286,029 B1 | 9/2001 | Delph | |
| 6,286,053 B1 | 9/2001 | Van Peursem et al. | |
| 6,286,085 B1 | 9/2001 | Jouenne et al. | |
| 6,289,212 B1 | 9/2001 | Stein et al. | |
| 6,292,743 B1 | 9/2001 | Pu et al. | |
| 6,292,905 B1 | 9/2001 | Wallach et al. | |
| 6,295,502 B1 | 9/2001 | Hancock et al. | |
| 6,295,541 B1 | 9/2001 | Bodnar et al. | |
| 6,304,881 B1 | 10/2001 | Halim et al. | |
| 6,317,755 B1 | 11/2001 | Rakers et al. | |
| 6,321,236 B1 | 11/2001 | Zollinger et al. | |
| 6,324,467 B1 | 11/2001 | Machii et al. | |
| 6,324,526 B1 | 11/2001 | D'Agostino | |
| 6,324,544 B1 | 11/2001 | Alam et al. | |
| 6,327,533 B1 | 12/2001 | Chou | |
| 6,329,680 B1 | 12/2001 | Yoshida et al. | |
| 6,330,568 B1 | 12/2001 | Boothby et al. | |
| 6,332,158 B1 | 12/2001 | Risley et al. | |
| 6,333,973 B1 | 12/2001 | Smith et al. | |
| 6,338,096 B1 | 1/2002 | Ukelson | |
| 6,339,710 B1 | 1/2002 | Suzuki | |
| 6,341,316 B1 | 1/2002 | Kloba et al. | |
| 6,345,308 B1 | 2/2002 | Abe | |
| 6,349,336 B1 | 2/2002 | Sit et al. | |
| 6,353,448 B1 | 3/2002 | Scarborough et al. | |
| 6,356,910 B1 | 3/2002 | Zellweger | |
| 6,356,961 B1 | 3/2002 | Oprescu-Surcobe | |
| 6,360,252 B1 | 3/2002 | Rudy et al. | |
| 6,360,330 B1 | 3/2002 | Mutalik et al. | |
| 6,363,249 B1 | 3/2002 | Nordeman et al. | |
| 6,363,412 B1 | 3/2002 | Niwa et al. | |
| 6,374,250 B2 | 4/2002 | Ajtai et al. | |
| 6,381,700 B1 | 4/2002 | Yoshida | |
| 6,389,462 B1 | 5/2002 | Cohen et al. | |
| 6,396,482 B1 | 5/2002 | Griffin et al. | |
| 6,397,307 B2 | 5/2002 | Ohran | |
| 6,397,351 B1 | 5/2002 | Miller et al. | |
| 6,401,104 B1 | 6/2002 | LaRue et al. | |
| 6,405,218 B1 | 6/2002 | Boothby | |
| 6,418,309 B1 | 7/2002 | Moon et al. | |
| 6,430,289 B1 | 8/2002 | Liffick | |
| 6,430,576 B1 | 8/2002 | Gates et al. | |
| 6,434,621 B1 | 8/2002 | Pezzillo et al. | |
| 6,434,627 B1 | 8/2002 | Millet et al. | |
| 6,437,818 B1 | 8/2002 | Ludwig et al. | |
| 6,441,836 B1* | 8/2002 | Takasu et al. | 715/835 |
| 6,449,622 B1 | 9/2002 | LaRue et al. | |
| 6,453,392 B1 | 9/2002 | Flynn, Jr. | |
| 6,457,062 B1 | 9/2002 | Pivowar et al. | |
| 6,460,036 B1 | 10/2002 | Herz | |
| 6,462,644 B1 | 10/2002 | Howell et al. | |
| 6,463,464 B1 | 10/2002 | Lazaridis et al. | |
| 6,466,967 B2 | 10/2002 | Landsman et al. | |
| 6,473,621 B1 | 10/2002 | Heie | |
| 6,480,896 B1 | 11/2002 | Brown et al. | |
| 6,484,143 B1 | 11/2002 | Swildens et al. | |
| 6,487,560 B1 | 11/2002 | LaRue et al. | |
| 6,490,655 B1 | 12/2002 | Kershaw | |
| 6,496,944 B1 | 12/2002 | Hsiao et al. | |
| 6,499,108 B1 | 12/2002 | Johnson | |
| 6,505,216 B1 | 1/2003 | Schutzman et al. | |
| 6,507,891 B1 | 1/2003 | Challenger et al. | |
| 6,516,314 B1 | 2/2003 | Birkler et al. | |
| 6,516,327 B1 | 2/2003 | Zondervan et al. | |
| 6,519,452 B1 | 2/2003 | Agostino et al. | |
| 6,523,063 B1 | 2/2003 | Hanson | |
| 6,523,079 B2 | 2/2003 | Kikinis et al. | |
| 6,532,588 B1 | 3/2003 | Porter | |
| 6,535,743 B1 | 3/2003 | Kennedy et al. | |
| 6,535,949 B1* | 3/2003 | Parker | 711/103 |
| 6,539,494 B1 | 3/2003 | Abramson et al. | |
| 6,542,933 B1 | 4/2003 | Durst, Jr. et al. | |
| 6,546,425 B1 | 4/2003 | Hanson et al. | |
| 6,549,933 B1 | 4/2003 | Barrett et al. | |
| 6,549,937 B1 | 4/2003 | Auerbach et al. | |
| 6,553,375 B1 | 4/2003 | Huang et al. | |
| 6,553,410 B2 | 4/2003 | Kikinis | |
| 6,553,413 B1 | 4/2003 | Leighton et al. | |
| 6,564,336 B1 | 5/2003 | Majkowski | |
| 6,567,850 B1 | 5/2003 | Freishtat et al. | |
| 6,567,857 B1 | 5/2003 | Gupta et al. | |
| 6,574,744 B1* | 6/2003 | Kantz et al. | 714/1 |
| 6,581,065 B1 | 6/2003 | Rodkin et al. | |
| 6,584,454 B1 | 6/2003 | Hummel et al. | |
| 6,589,290 B1 | 7/2003 | Maxwell et al. | |
| 6,591,266 B1 | 7/2003 | Li et al. | |
| 6,591,306 B1 | 7/2003 | Redlich | |
| 6,591,362 B1 | 7/2003 | Li | |
| 6,597,700 B2 | 7/2003 | Golikeri et al. | |
| 6,601,071 B1 | 7/2003 | Bowker et al. | |
| 6,601,143 B1 | 7/2003 | Lamparter | |
| 6,609,005 B1 | 8/2003 | Chern | |
| 6,611,850 B1 | 8/2003 | Shen | |
| 6,628,194 B1 | 9/2003 | Hellebust et al. | |
| 6,636,894 B1 | 10/2003 | Short et al. | |
| 6,643,707 B1 | 11/2003 | Booth | |
| 6,647,399 B2 | 11/2003 | Zaremba | |
| 6,654,746 B1 | 11/2003 | Wong et al. | |
| 6,662,212 B1 | 12/2003 | Chandhok et al. | |
| 6,665,721 B1 | 12/2003 | Hind et al. | |
| 6,668,254 B2 | 12/2003 | Matson et al. | |
| 6,671,724 B1 | 12/2003 | Pandya et al. | |
| 6,671,757 B1 | 12/2003 | Multer et al. | |
| 6,684,088 B1 | 1/2004 | Halahmi | |
| 6,684,206 B2 | 1/2004 | Chen et al. | |
| 6,684,302 B2 | 1/2004 | Kershaw | |
| 6,694,335 B1 | 2/2004 | Hopmann et al. | |
| 6,694,336 B1 | 2/2004 | Multer et al. | |
| 6,701,316 B1 | 3/2004 | Li et al. | |
| 6,704,849 B2 | 3/2004 | Steegmans | |
| 6,714,987 B1 | 3/2004 | Amin et al. | |
| 6,718,336 B1 | 4/2004 | Saffer et al. | |
| 6,718,348 B1 | 4/2004 | Novak et al. | |

(56) References Cited

U.S. PATENT DOCUMENTS

| | | |
|---|---|---|
| 6,718,390 B1 | 4/2004 | Still et al. |
| 6,725,239 B2 | 4/2004 | Sherman et al. |
| 6,728,530 B1 | 4/2004 | Heinonen et al. |
| 6,732,101 B1 | 5/2004 | Cook |
| 6,732,264 B1 | 5/2004 | Sun et al. |
| 6,738,789 B2 | 5/2004 | Multer et al. |
| 6,741,851 B1 | 5/2004 | Lee et al. |
| 6,745,040 B2 | 6/2004 | Zimmerman |
| 6,757,696 B2 | 6/2004 | Multer et al. |
| 6,757,698 B2 | 6/2004 | McBride et al. |
| 6,757,712 B1 | 6/2004 | Bastian et al. |
| 6,781,575 B1 | 8/2004 | Hawkins et al. |
| 6,795,848 B1 | 9/2004 | Border et al. |
| 6,799,214 B1 | 9/2004 | Li |
| 6,804,690 B1 | 10/2004 | Dysert et al. |
| 6,804,783 B1 | 10/2004 | Wesinger, Jr. et al. |
| 6,810,411 B1 | 10/2004 | Coughlin et al. |
| 6,812,961 B1 | 11/2004 | Parulski et al. |
| 6,813,487 B1 | 11/2004 | Trommelen |
| 6,816,481 B1 | 11/2004 | Adams et al. |
| 6,829,654 B1 | 12/2004 | Jungck |
| 6,836,657 B2 | 12/2004 | Ji et al. |
| 6,836,765 B1 | 12/2004 | Sussman |
| 6,839,022 B1 | 1/2005 | Benco et al. |
| 6,839,568 B2 | 1/2005 | Suzuki |
| 6,842,695 B1 | 1/2005 | Tu et al. |
| 6,850,944 B1 | 2/2005 | MacCall et al. |
| 6,868,451 B1 | 3/2005 | Peacock |
| 6,870,921 B1 | 3/2005 | Elsey et al. |
| 6,886,013 B1 | 4/2005 | Beranek |
| 6,892,225 B1 | 5/2005 | Tu et al. |
| 6,892,245 B1 | 5/2005 | Crump et al. |
| 6,904,449 B1 | 6/2005 | Quinones |
| 6,904,460 B1 | 6/2005 | Raciborski et al. |
| 6,920,488 B1 | 7/2005 | Le Pennec et al. |
| 6,925,476 B1 | 8/2005 | Multer |
| 6,925,477 B1 | 8/2005 | Champagne et al. |
| 6,934,767 B1 | 8/2005 | Jellinek |
| 6,944,651 B2 | 9/2005 | Onyon et al. |
| 6,944,676 B1 | 9/2005 | Armbruster et al. |
| 6,954,660 B2 | 10/2005 | Aoyama |
| 6,954,783 B1 | 10/2005 | Bodwell et al. |
| 6,959,331 B1 | 10/2005 | Traversat et al. |
| 6,963,914 B1 | 11/2005 | Breitbart et al. |
| 6,973,299 B2 | 12/2005 | Apfel |
| 6,975,709 B2 | 12/2005 | Wullert, II |
| 6,990,187 B2 * | 1/2006 | MacNamara et al. ... 379/210.02 |
| 6,996,617 B1 | 2/2006 | Aiken, Jr. et al. |
| 6,996,631 B1 | 2/2006 | Aiken, Jr. et al. |
| 7,003,555 B1 | 2/2006 | Jungck |
| 7,003,668 B2 | 2/2006 | Berson et al. |
| 7,007,041 B2 | 2/2006 | Multer et al. |
| 7,010,578 B1 | 3/2006 | Lewin et al. |
| 7,016,964 B1 | 3/2006 | Still et al. |
| 7,023,868 B2 | 4/2006 | Rabenko et al. |
| 7,024,491 B1 | 4/2006 | Hanmann et al. |
| 7,030,730 B1 | 4/2006 | Zondervan |
| 7,035,878 B1 | 4/2006 | Multer et al. |
| 7,039,656 B1 | 5/2006 | Tsai et al. |
| 7,051,275 B2 | 5/2006 | Gupta et al. |
| 7,054,594 B2 | 5/2006 | Bloch et al. |
| 7,054,952 B1 | 5/2006 | Schwerdtfeger et al. |
| 7,082,476 B1 | 7/2006 | Cohen et al. |
| 7,085,817 B1 | 8/2006 | Tock et al. |
| 7,096,418 B1 | 8/2006 | Singhal et al. |
| 7,099,915 B1 | 8/2006 | Tenereillo et al. |
| 7,103,794 B2 | 9/2006 | Malcolm et al. |
| 7,107,043 B2 | 9/2006 | Aoyama |
| 7,110,954 B2 | 9/2006 | Yung et al. |
| 7,116,681 B1 | 10/2006 | Hovell et al. |
| 7,133,503 B2 | 11/2006 | Revisky |
| 7,146,161 B2 | 12/2006 | Chou |
| 7,158,805 B1 | 1/2007 | Park et al. |
| 7,159,036 B2 | 1/2007 | Hinchliffe et al. |
| 7,162,494 B2 | 1/2007 | Arellano |
| 7,167,728 B1 | 1/2007 | Wagner et al. |
| 7,181,628 B2 | 2/2007 | Sato et al. |
| 7,197,574 B1 | 3/2007 | Ishiyama |
| 7,233,791 B2 | 6/2007 | Gilbert et al. |
| 7,237,027 B1 | 6/2007 | Raccah et al. |
| 7,249,175 B1 | 7/2007 | Donaldson |
| 7,269,433 B2 | 9/2007 | Vargas et al. |
| 7,284,051 B1 | 10/2007 | Okano et al. |
| 7,289,964 B1 | 10/2007 | Bowman-Amuah |
| 7,293,074 B1 | 11/2007 | Jellinek et al. |
| 7,308,651 B2 | 12/2007 | Kling et al. |
| 7,315,826 B1 | 1/2008 | Guheen et al. |
| 7,317,907 B2 | 1/2008 | Linkert et al. |
| 7,328,341 B1 | 2/2008 | Eun et al. |
| 7,343,568 B2 | 3/2008 | Jiang et al. |
| 7,349,719 B2 | 3/2008 | Buniatyan |
| 7,356,559 B1 | 4/2008 | Jacobs et al. |
| 7,363,233 B1 | 4/2008 | Levine |
| 7,383,061 B1 | 6/2008 | Hawkins |
| 7,392,034 B2 | 6/2008 | Westman et al. |
| 7,415,486 B2 | 8/2008 | Multer et al. |
| 7,440,746 B1 | 10/2008 | Swan |
| 7,447,743 B1 | 11/2008 | Jordan, Jr. |
| 7,454,500 B1 | 11/2008 | Hsu et al. |
| 7,499,888 B1 | 3/2009 | Tu et al. |
| 7,505,762 B2 | 3/2009 | Onyon et al. |
| 7,519,702 B1 | 4/2009 | Allan |
| 7,539,697 B1 | 5/2009 | Akella et al. |
| 7,587,398 B1 | 9/2009 | Fredricksen et al. |
| 7,596,609 B1 | 9/2009 | Refuah et al. |
| 7,643,824 B2 | 1/2010 | Onyon |
| 7,663,652 B1 | 2/2010 | Reese |
| 7,707,150 B2 | 4/2010 | Sundararajan et al. |
| 7,764,782 B1 | 7/2010 | Coughlan |
| 7,853,664 B1 | 12/2010 | Wang et al. |
| 7,895,334 B1 | 2/2011 | Tu et al. |
| 7,957,772 B2 | 6/2011 | Charlier |
| 8,010,095 B2 | 8/2011 | Natsuno et al. |
| 8,044,818 B2 | 10/2011 | Tysowski et al. |
| 8,073,954 B1 | 12/2011 | Tu et al. |
| 8,156,074 B1 | 4/2012 | Multer et al. |
| 8,224,308 B1 | 7/2012 | Gavrylyako et al. |
| 2001/0005849 A1 | 6/2001 | Boothby et al. |
| 2001/0014893 A1 | 8/2001 | Boothby |
| 2001/0028363 A1 | 10/2001 | Nomoto et al. |
| 2001/0034737 A1 | 10/2001 | Cane et al. |
| 2001/0044805 A1 | 11/2001 | Multer et al. |
| 2001/0047393 A1 | 11/2001 | Arner et al. |
| 2001/0047471 A1 | 11/2001 | Johnson |
| 2001/0051920 A1 | 12/2001 | Joao et al. |
| 2001/0056473 A1 | 12/2001 | Arneson et al. |
| 2002/0007303 A1 | 1/2002 | Brokler et al. |
| 2002/0010868 A1 | 1/2002 | Nakashima et al. |
| 2002/0016818 A1 | 2/2002 | Kirani et al. |
| 2002/0016912 A1 | 2/2002 | Johnson |
| 2002/0023136 A1 | 2/2002 | Silver et al. |
| 2002/0032751 A1 | 3/2002 | Bharadwaj |
| 2002/0035605 A1 | 3/2002 | McDowell et al. |
| 2002/0040369 A1 | 4/2002 | Multer et al. |
| 2002/0049852 A1 | 4/2002 | Lee et al. |
| 2002/0055909 A1 | 5/2002 | Fung et al. |
| 2002/0056011 A1 | 5/2002 | Nardone et al. |
| 2002/0059116 A1 | 5/2002 | Bulatovic et al. |
| 2002/0062365 A1 | 5/2002 | Nishikawa et al. |
| 2002/0067816 A1 | 6/2002 | Bushnell |
| 2002/0069178 A1 | 6/2002 | Hoffman |
| 2002/0072350 A1 | 6/2002 | Fukuzato |
| 2002/0073212 A1 | 6/2002 | Sokol et al. |
| 2002/0078075 A1 | 6/2002 | Colson et al. |
| 2002/0082995 A1 | 6/2002 | Christie |
| 2002/0083325 A1 | 6/2002 | Mediratta et al. |
| 2002/0087588 A1 | 7/2002 | McBride et al. |
| 2002/0091785 A1 | 7/2002 | Ohlenbusch et al. |
| 2002/0116444 A1 | 8/2002 | Chaudhri et al. |
| 2002/0118192 A1 | 8/2002 | Couckuyt et al. |
| 2002/0120600 A1 | 8/2002 | Schiavone et al. |
| 2002/0126814 A1 | 9/2002 | Awada et al. |
| 2002/0128908 A1 | 9/2002 | Levin et al. |
| 2002/0129047 A1 | 9/2002 | Cane et al. |

(56) References Cited

U.S. PATENT DOCUMENTS

| | | |
|---|---|---|
| 2002/0138582 A1 | 9/2002 | Chandra et al. |
| 2002/0138765 A1 | 9/2002 | Fishman et al. |
| 2002/0152278 A1 | 10/2002 | Pontenzone et al. |
| 2002/0162011 A1 | 10/2002 | Tanaka et al. |
| 2002/0168964 A1 | 11/2002 | Kraft |
| 2002/0168975 A1 | 11/2002 | Gresham et al. |
| 2002/0194196 A1 | 12/2002 | Weinberg et al. |
| 2003/0021274 A1 | 1/2003 | Siikaniemi et al. |
| 2003/0028451 A1 | 2/2003 | Ananian |
| 2003/0028554 A1 | 2/2003 | Koskimies et al. |
| 2003/0028603 A1 | 2/2003 | Aktas et al. |
| 2003/0028647 A1 | 2/2003 | Grosu |
| 2003/0037020 A1 | 2/2003 | Novak et al. |
| 2003/0043195 A1 | 3/2003 | Kling et al. |
| 2003/0046433 A1 | 3/2003 | Luzzatti et al. |
| 2003/0061163 A1 | 3/2003 | Durfield |
| 2003/0065934 A1 | 4/2003 | Angelo et al. |
| 2003/0069874 A1 | 4/2003 | Hertzog et al. |
| 2003/0084121 A1 | 5/2003 | De Boor et al. |
| 2003/0093797 A1 | 5/2003 | Bazzaz |
| 2003/0110280 A1 | 6/2003 | Hinchliffe et al. |
| 2003/0115240 A1 | 6/2003 | Cho |
| 2003/0134625 A1 | 7/2003 | Choi |
| 2003/0135463 A1 | 7/2003 | Brown et al. |
| 2003/0139172 A1 | 7/2003 | Lampela et al. |
| 2003/0158960 A1 | 8/2003 | Engberg |
| 2003/0163483 A1 | 8/2003 | Zingher et al. |
| 2003/0172236 A1 | 9/2003 | Iyengar et al. |
| 2003/0200234 A1 | 10/2003 | Koppich et al. |
| 2003/0204568 A1 | 10/2003 | Bhargava et al. |
| 2003/0208546 A1 | 11/2003 | Desalvo et al. |
| 2003/0210265 A1* | 11/2003 | Haimberg ............. H04L 12/581 715/758 |
| 2003/0217181 A1 | 11/2003 | Kiiskinen |
| 2003/0224760 A1 | 12/2003 | Day |
| 2003/0229723 A1 | 12/2003 | Kangas et al. |
| 2003/0229898 A1 | 12/2003 | Babu et al. |
| 2003/0233383 A1 | 12/2003 | Koskimies |
| 2003/0233418 A1 | 12/2003 | Goldman |
| 2003/0236933 A1 | 12/2003 | Shigeta et al. |
| 2004/0003390 A1 | 1/2004 | Canter et al. |
| 2004/0054746 A1 | 3/2004 | Shibata |
| 2004/0093317 A1 | 5/2004 | Swan |
| 2004/0093342 A1 | 5/2004 | Arbo et al. |
| 2004/0093385 A1 | 5/2004 | Yamagata |
| 2004/0110497 A1 | 6/2004 | Little |
| 2004/0111465 A1 | 6/2004 | Chuang et al. |
| 2004/0119760 A1* | 6/2004 | Grossman et al. ............ 345/854 |
| 2004/0120477 A1 | 6/2004 | Nguyen et al. |
| 2004/0128324 A1 | 7/2004 | Sheynman et al. |
| 2004/0132428 A1 | 7/2004 | Mulligan |
| 2004/0142711 A1 | 7/2004 | Mahonen et al. |
| 2004/0146150 A1 | 7/2004 | Barnes |
| 2004/0148408 A1 | 7/2004 | Nadarajah |
| 2004/0162830 A1 | 8/2004 | Shirwadkar et al. |
| 2004/0174965 A1 | 9/2004 | Brahm et al. |
| 2004/0192260 A1 | 9/2004 | Sugimoto et al. |
| 2004/0192282 A1 | 9/2004 | Vasudevan |
| 2004/0193953 A1 | 9/2004 | Callahan et al. |
| 2004/0204120 A1 | 10/2004 | Jiles |
| 2004/0224665 A1 | 11/2004 | Kokubo |
| 2004/0235523 A1 | 11/2004 | Schrire et al. |
| 2004/0243994 A1 | 12/2004 | Nasu |
| 2004/0267390 A1 | 12/2004 | Ben-Yaacov et al. |
| 2004/0267676 A1 | 12/2004 | Feng et al. |
| 2004/0267944 A1 | 12/2004 | Britt |
| 2005/0021571 A1 | 1/2005 | East |
| 2005/0032527 A1 | 2/2005 | Sheha et al. |
| 2005/0038863 A1 | 2/2005 | Onyon et al. |
| 2005/0044404 A1 | 2/2005 | Bhansali et al. |
| 2005/0050117 A1 | 3/2005 | Seo et al. |
| 2005/0054354 A1 | 3/2005 | Roman et al. |
| 2005/0060392 A1 | 3/2005 | Goring et al. |
| 2005/0064859 A1 | 3/2005 | Kotzin et al. |
| 2005/0081152 A1* | 4/2005 | Commarford et al. ....... 715/705 |
| 2005/0086296 A1 | 4/2005 | Chi et al. |
| 2005/0086318 A1 | 4/2005 | Aubault |
| 2005/0090253 A1 | 4/2005 | Kim et al. |
| 2005/0091272 A1* | 4/2005 | Smith et al. ............... 707/104.1 |
| 2005/0096975 A1 | 5/2005 | Moshe |
| 2005/0099963 A1 | 5/2005 | Multer et al. |
| 2005/0100150 A1 | 5/2005 | Dhara et al. |
| 2005/0102257 A1 | 5/2005 | Onyon et al. |
| 2005/0102328 A1 | 5/2005 | Ring et al. |
| 2005/0102329 A1 | 5/2005 | Jiang et al. |
| 2005/0114470 A1 | 5/2005 | Bal |
| 2005/0131990 A1 | 6/2005 | Jewell |
| 2005/0143111 A1 | 6/2005 | Fitzpatrick et al. |
| 2005/0144200 A1 | 6/2005 | Hesselink et al. |
| 2005/0144251 A1 | 6/2005 | Slate |
| 2005/0157858 A1* | 7/2005 | Rajagopalan et al. ..... 379/93.23 |
| 2005/0164651 A1* | 7/2005 | Ollis et al. ................... 455/100 |
| 2005/0191998 A1 | 9/2005 | Onyon et al. |
| 2005/0203971 A1 | 9/2005 | Koskimies et al. |
| 2005/0203992 A1 | 9/2005 | Tanaka et al. |
| 2005/0204001 A1 | 9/2005 | Stein et al. |
| 2005/0210101 A1 | 9/2005 | Janik |
| 2005/0216300 A1 | 9/2005 | Appelman et al. |
| 2005/0227674 A1 | 10/2005 | Kopra et al. |
| 2005/0233800 A1* | 10/2005 | Jones ............................. 463/20 |
| 2005/0240494 A1 | 10/2005 | Cue et al. |
| 2005/0246325 A1* | 11/2005 | Pettinati et al. .................. 707/3 |
| 2005/0268107 A1 | 12/2005 | Harris et al. |
| 2005/0273632 A1 | 12/2005 | Kawakami |
| 2005/0283741 A1* | 12/2005 | Balabanovic et al. ........ 715/838 |
| 2006/0021059 A1 | 1/2006 | Brown et al. |
| 2006/0035647 A1 | 2/2006 | Eisner et al. |
| 2006/0052091 A1 | 3/2006 | Onyon et al. |
| 2006/0095397 A1 | 5/2006 | Torres et al. |
| 2006/0129627 A1 | 6/2006 | Phillips et al. |
| 2006/0148418 A1 | 7/2006 | Purkayastha et al. |
| 2006/0148477 A1 | 7/2006 | Reilly |
| 2006/0190626 A1 | 8/2006 | Bhogal et al. |
| 2006/0195474 A1 | 8/2006 | Cadiz et al. |
| 2006/0199599 A1 | 9/2006 | Gupta et al. |
| 2006/0206709 A1 | 9/2006 | Labrou et al. |
| 2006/0212482 A1 | 9/2006 | Celik |
| 2006/0224675 A1* | 10/2006 | Fox et al. ..................... 709/206 |
| 2006/0233335 A1 | 10/2006 | Pfleging et al. |
| 2006/0268842 A1 | 11/2006 | Takahashi et al. |
| 2006/0277160 A1 | 12/2006 | Singh et al. |
| 2006/0288112 A1 | 12/2006 | Soelberg et al. |
| 2007/0005504 A1 | 1/2007 | Chen et al. |
| 2007/0016796 A1 | 1/2007 | Singhal |
| 2007/0022469 A1 | 1/2007 | Cooper et al. |
| 2007/0037605 A1 | 2/2007 | Logan |
| 2007/0043739 A1 | 2/2007 | Takai et al. |
| 2007/0047523 A1* | 3/2007 | Jiang ............................. 370/352 |
| 2007/0047533 A1 | 3/2007 | Criddle et al. |
| 2007/0050734 A1 | 3/2007 | Busey |
| 2007/0053335 A1 | 3/2007 | Onyon et al. |
| 2007/0056043 A1 | 3/2007 | Onyon et al. |
| 2007/0061331 A1 | 3/2007 | Ramer et al. |
| 2007/0082668 A1 | 4/2007 | Silver et al. |
| 2007/0094042 A1 | 4/2007 | Ramer et al. |
| 2007/0127597 A1 | 6/2007 | Ammer et al. |
| 2007/0190983 A1 | 8/2007 | Goldfarb et al. |
| 2007/0214149 A1 | 9/2007 | Bodin et al. |
| 2007/0214264 A1 | 9/2007 | Koister |
| 2007/0220419 A1 | 9/2007 | Stibel et al. |
| 2007/0226199 A1* | 9/2007 | Moore et al. ..................... 707/3 |
| 2007/0226272 A1 | 9/2007 | Huang et al. |
| 2007/0226783 A1 | 9/2007 | Mimlitsch |
| 2007/0254697 A1 | 11/2007 | Sugio et al. |
| 2008/0005080 A1 | 1/2008 | Xiques et al. |
| 2008/0005282 A1 | 1/2008 | Gaedcke |
| 2008/0009268 A1 | 1/2008 | Ramer et al. |
| 2008/0022220 A1 | 1/2008 | Cheah |
| 2008/0027826 A1 | 1/2008 | Popick et al. |
| 2008/0037743 A1 | 2/2008 | Bishop |
| 2008/0039020 A1 | 2/2008 | Eskin |
| 2008/0051071 A1 | 2/2008 | Vishwanathan et al. |
| 2008/0051117 A1 | 2/2008 | Khare et al. |
| 2008/0059897 A1 | 3/2008 | Dilorenzo |

(56) References Cited

U.S. PATENT DOCUMENTS

| | | |
|---|---|---|
| 2008/0064378 A1 | 3/2008 | Kahan et al. |
| 2008/0082421 A1 | 4/2008 | Onyon et al. |
| 2008/0089299 A1 | 4/2008 | Lindsley et al. |
| 2008/0104442 A1 | 5/2008 | Diao et al. |
| 2008/0109881 A1 | 5/2008 | Dasdan |
| 2008/0120199 A1 | 5/2008 | Pirnack et al. |
| 2008/0127289 A1 | 5/2008 | Julia et al. |
| 2008/0201362 A1 | 8/2008 | Multer et al. |
| 2008/0208617 A1 | 8/2008 | Onyon et al. |
| 2008/0214163 A1 | 9/2008 | Onyon et al. |
| 2008/0214167 A1 | 9/2008 | Natsuno et al. |
| 2008/0268823 A1 | 10/2008 | Shalev et al. |
| 2008/0270805 A1 | 10/2008 | Kean |
| 2008/0294768 A1 | 11/2008 | Sampson et al. |
| 2009/0012940 A1 | 1/2009 | Ives et al. |
| 2009/0029685 A1 | 1/2009 | Willis |
| 2009/0037828 A1 | 2/2009 | Waite et al. |
| 2009/0049135 A1 | 2/2009 | O'Sullivan et al. |
| 2009/0055464 A1 | 2/2009 | Multer et al. |
| 2009/0106110 A1 | 4/2009 | Stannard et al. |
| 2009/0138546 A1 | 5/2009 | Cruzada |
| 2009/0183091 A1 | 7/2009 | Sharpe et al. |
| 2009/0186672 A1 | 7/2009 | Duff et al. |
| 2009/0287921 A1 | 11/2009 | Zhu et al. |
| 2009/0307486 A1 | 12/2009 | Grajek et al. |
| 2009/0327305 A1 | 12/2009 | Roberts et al. |
| 2010/0057777 A1 | 3/2010 | Williamson |
| 2010/0100945 A1 | 4/2010 | Ozzie et al. |
| 2010/0190475 A1 | 7/2010 | El-Kadri et al. |
| 2010/0205448 A1 | 8/2010 | Tarhan et al. |
| 2010/0241857 A1 | 9/2010 | Okude et al. |
| 2010/0251230 A1 | 9/2010 | O'Farrell et al. |
| 2010/0319434 A1 | 12/2010 | Weber et al. |
| 2011/0107203 A1 | 5/2011 | Nash et al. |
| 2011/0109170 A1 | 5/2011 | Chen et al. |
| 2011/0269424 A1 | 11/2011 | Multer et al. |
| 2012/0151346 A1 | 6/2012 | McClements, IV |

FOREIGN PATENT DOCUMENTS

| | | |
|---|---|---|
| CN | 1313697 | 2/2005 |
| EP | 0801487 | 10/1997 |
| EP | 0836131 | 4/1998 |
| EP | 0836301 | 4/1998 |
| EP | 0924917 | 6/1999 |
| EP | 0930593 | 7/1999 |
| EP | 1024441 | 2/2000 |
| EP | 0986225 | 3/2000 |
| EP | 1139608 | 10/2001 |
| EP | 1180890 | 2/2002 |
| EP | 1263244 | 12/2002 |
| EP | 1804418 | 4/2007 |
| EP | 2043012 | 1/2009 |
| GB | 2366050 | 6/2001 |
| JP | 7303146 | 11/1995 |
| JP | 10191453 | 7/1998 |
| JP | 11242620 | 9/1999 |
| JP | 11242677 | 9/1999 |
| JP | 2000232680 | 8/2000 |
| JP | 2000316053 | 11/2000 |
| JP | 2002142254 | 5/2002 |
| JP | 2002185575 | 6/2002 |
| JP | 2002247144 | 8/2002 |
| JP | 2002314689 | 10/2002 |
| JP | 2003259011 | 9/2003 |
| WO | 97/04391 | 2/1997 |
| WO | 97/39564 | 10/1997 |
| WO | 97/41520 | 11/1997 |
| WO | 98/03005 | 1/1998 |
| WO | 98/21648 | 5/1998 |
| WO | 98/29994 | 7/1998 |
| WO | 98/54662 | 12/1998 |
| WO | 98/56159 | 12/1998 |
| WO | 99/05813 | 2/1999 |
| WO | 99/06900 | 2/1999 |
| WO | 99/36870 | 7/1999 |
| WO | 99/40514 | 8/1999 |
| WO | 99/45451 | 9/1999 |
| WO | 99/45484 | 9/1999 |
| WO | 99/46701 | 9/1999 |
| WO | 99/50761 | 10/1999 |
| WO | 99/65256 | 12/1999 |
| WO | 00/11832 | 3/2000 |
| WO | 00/16222 | 3/2000 |
| WO | 00/29998 | 5/2000 |
| WO | 01/33874 | 5/2001 |
| WO | 01/71539 | 9/2001 |
| WO | 01/80535 | 9/2001 |
| WO | 02/17140 | 2/2002 |
| WO | 02/071219 | 9/2002 |
| WO | 03/056789 | 7/2003 |
| WO | 03/083716 | 10/2003 |
| WO | 2005/112586 | 12/2005 |

OTHER PUBLICATIONS

Gma, Using Microsoft Outlook 2000 for Contact Management, Active Technologies [online], [retrieved on Dec. 29, 2012] Retrieved from the Internet <URL: http://active-technologies.com/content/using-microsoft-outlook-2000-contact-management>.*

Padwick and Ray, Using Microsoft Outlook 98, 1998.*

Handy Address Book website as it appeared on Dec. 8, 2003 and Dec. 12, 2003 and was stored by the Internet Archive, retrieved on Aug. 8, 2014, retrieved from the Internet <URL: "https://web.archive.org/web/20031208113634/http://www.beiley.com/habook/index.html" et al.>.*

Handy Address Book Documentation as it appeared on Jun. 3, 2004 and was stored by the Internet Archive, retrieved on Aug. 8, 2014, retrieved from the Internet <URL: https://web.archive.org/web/20040603075016/http://www.beiley.com/habook/help/documentation.htm>.*

Screenshots taken from the Handy Address Book software on Aug. 25, 2014.*

How-To Geek, Convert a Row to a Column in Excel the Easy Way, retrieved on Feb. 8, 2015, retrieved from the Internet at URL: <http://www.howtogeek.com/howto/12366/convert-a-row-to-a-column-in-excel-the-easy-way/>.*

Office Action mailed on Dec. 16, 2013, U.S. Appl. No. 14/049,080, filed Oct. 8, 2013, Richard Onyon et al.

* cited by examiner

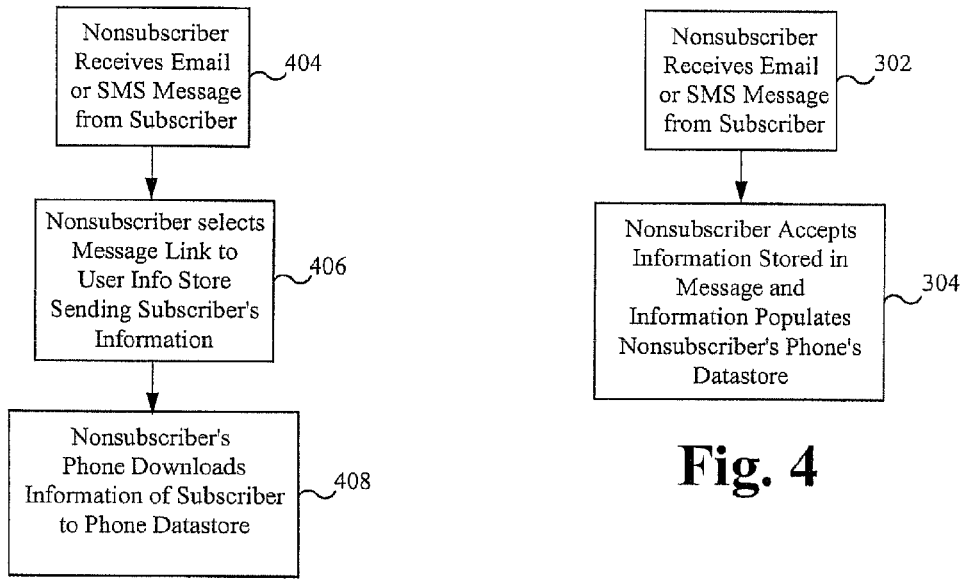
Fig. 5
Fig. 4
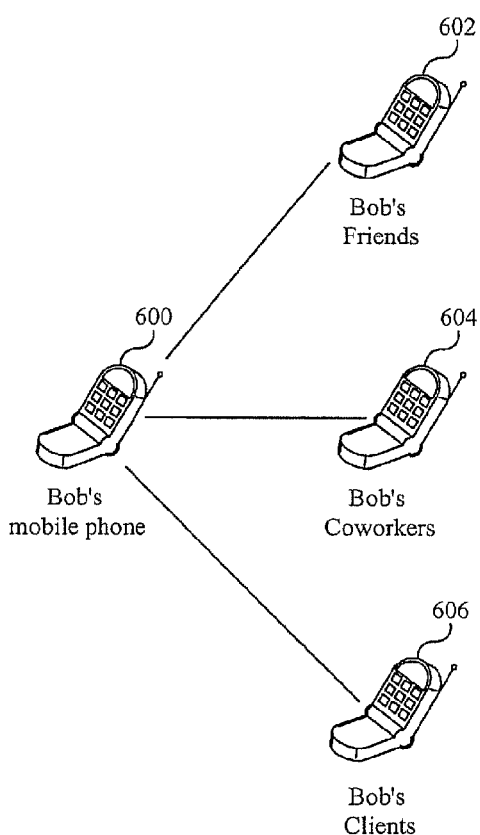
Fig. 6

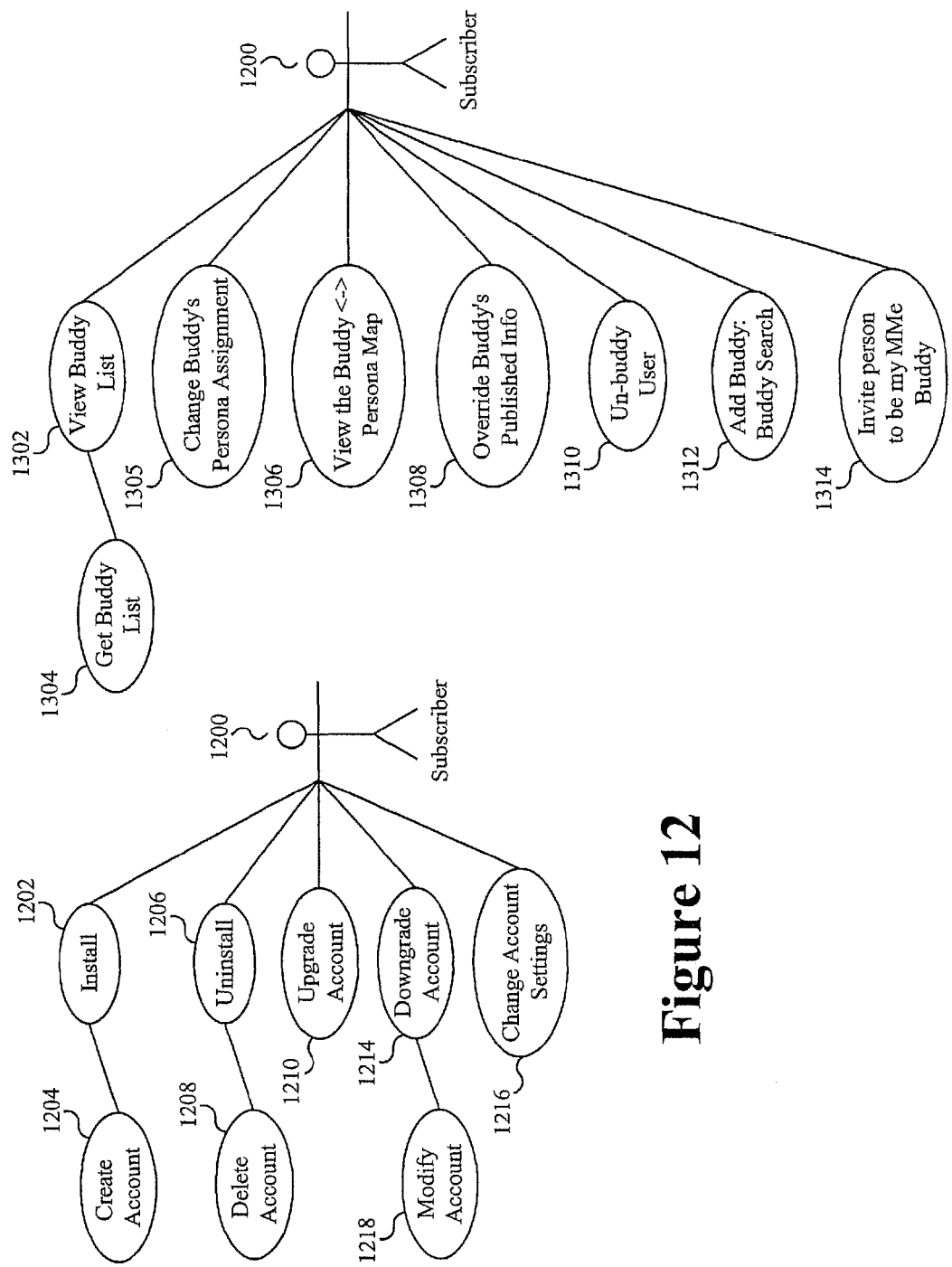

Figure 20B

ACID 2.0 — 2060
Last sync (Success)
4/21/2005 8:30 PM
All contacts: 120
Advanced CID
  2.0 contacts: 25
Personas: 18
Images: 45
Ringtones: 27
Options        Sync

Figure 20C

ACID 2.0
Last sync (Success)
4/21/2005 8:30 PM
[1] Contacts
[2] Personas
[3] Sync Now
[4] Settings

Figure 20D

Contacts
(&) Anna Kay
(&) Andrew Hogg
(&) Bill G.
(&) Jason Burns
(&) Rebecca Zhu
(&) Steven Taylor
Options ▾    Back

Figure 20E

Contacts
(&) Anna Kay
(&) Andrew Hogg
[1] Open
[2] Assign Persona
[3] Invite Contact
[4] Disable ACID
Close

Figure 20F

Contacts
(&) Anna Kay
(&) Andrew Hogg
(&) Bill G.
(&) Jason Burns
[1] Open
[2] Invite Contact
Close

Figure 20G

Anna Kay
[👥] Co-workers
[🏠] Anna in NYC
[♫] moonstar.mid
(&) Anna
☎ 408-2221234
▦ 408-2221235
View ▾    Back

Figure 20H

Anna in NYC
Close    Change

Figure 20I

Moonstar.mid
Close    Change

Figure 20J

Nick Name
Anna

OK    Change

Figure 20K

Assign Persona
Default
Friends
Co-worker
Family
Girlfriend
blacklist
Assign ▾    Back

Figure 20L

Assign Persona
"Co-worker"
persona has been
assigned to
Anna Kay.

OK    Change

Figure 20M

Disable ACID
Are you sure you
want to disable
ACID from "Anna
Kay" ?

Yes    No

| Personas |
|---|
| Default |
| Friends |
| Co-worker |
| Family |
| Girlfriend |
| Blocked caller |
| Options ▾  Back |

Figure 21B

| Personas |
|---|
| Default |
| Friends |
| 1 Open |
| 2 New |
| 3 Edit |
| 4 Delete |
| Close |

Figure 21C

| Default(12) |
|---|
| 👤 Default |
| 🖼 F1 logo |
| ♪ moonstar.mid |
| 👤 Richard M. Onyon |
| ☎ 408-2221234 |
| 📠 408-2221235 |
| View ▾  Back |

Figure 21D

| Persona Name |
|---|
| Default |
| 📖 Press "Assigned" to view a list of assigned contacts with this Persona. |
| OK    Assigned |

Figure 21E

| Contacts |
|---|
| 👤 Anna Kay |
| 👤 Andrew Hogg |
| 👤 Bill G. |
| 👤 Jason Burns |
| 👤 Rebecca Zhu |
| 👤 Steven Taylor |
| Open ▾  Back |

Figure 21F

| None |
|---|
| 👤 None |
| 🖼 None |
| ♪ None |
| 👤 None |
| ☎ 408-2221234 |
| Add ▾  Back |

Figure 21G

| Persona Name |
|---|
| Default |
| 📖 Press "Assigned" to view a list of assigned contacts with this Persona. |
| Multitap    Cancel |

Figure 21H

| Text |
|---|
| 1 Multitap |
| 2 Numbers |
| 3 T9Word |
| 4 Symbols |
| |
| Close |

Figure 21I

| Alumni |
|---|
| 👤 Alumni |
| 🖼 None |
| ♪ None |
| 👤 None |
| ☎ 408-2221234 |
| Add ▾  Back |

Figure 21J

| < On Phone > |
|---|
| 🖼 None |
| 🖼 Bird |
| 🖼 golf |
| 🖼 monkey |
| 🖼 poppy |
| 🖼 sky |
| Select ▾  Cancel |

Figure 21K

| < Bird > |
|---|
| 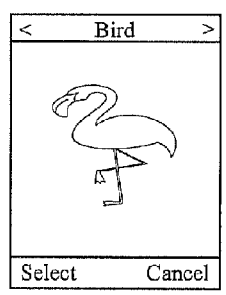 |
| Select    Cancel |

Figure 21L

| < On Phone > |
|---|
| ♪ None |
| ♪ Moonstar |
| ♪ oldfashionphone |
| ♪ melody01 |
| ♪ melody02 |
| ♪ melody03 |
| Select ▾  Cancel |

Figure 21M

| Delete Persona |
|---|
| Are you sure you want to delete "Default" persona? |
| |
| |
| |
| Yes    No |

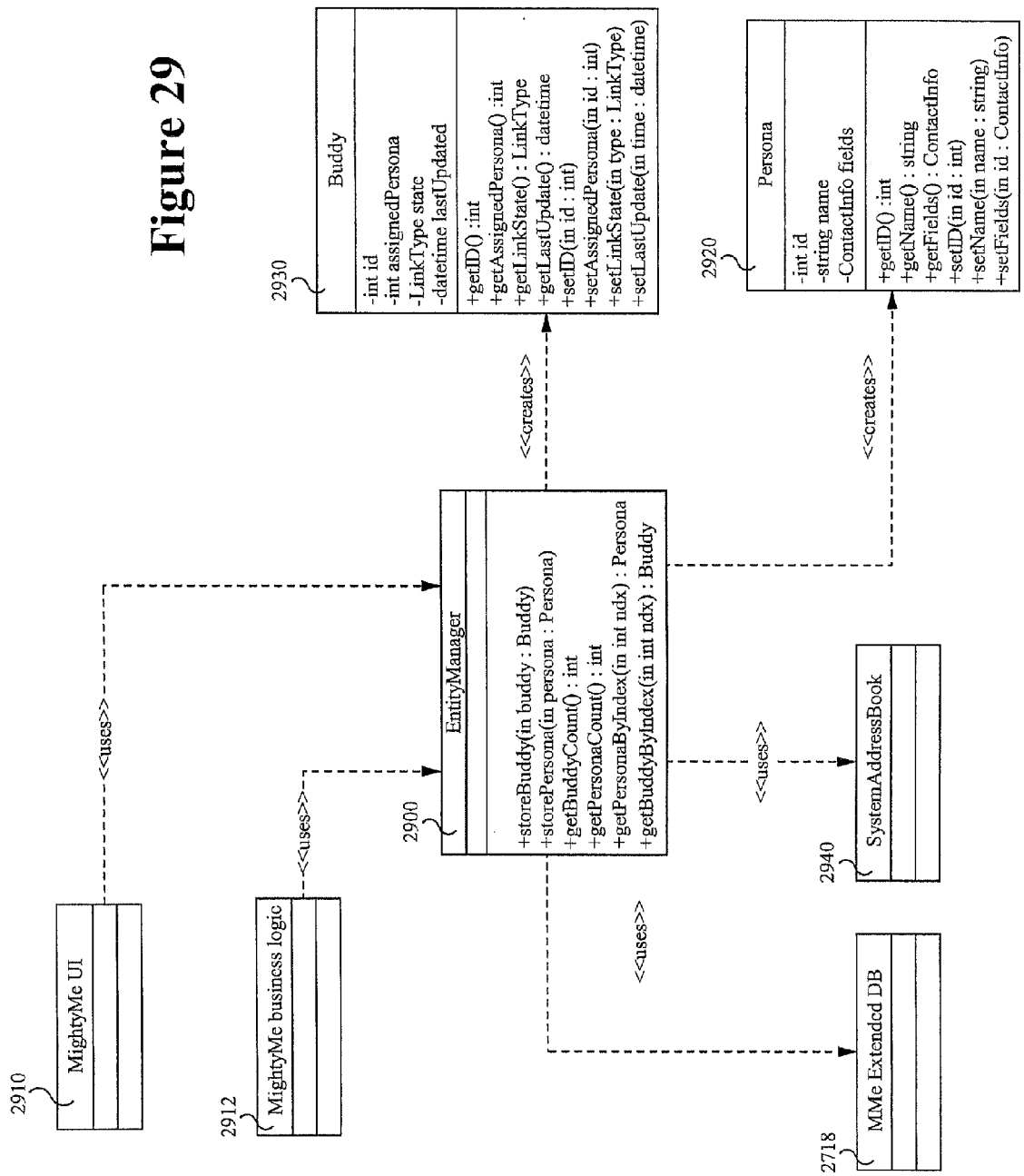

Metagroup 9

Group 9

Call 9

Dialing Speed Contact 9

SYSTEM FOR AND METHOD OF UPDATING A PERSONAL PROFILE

RELATED APPLICATION(S)

This application is a divisional application of co-pending U.S. patent application Ser. No. 12/856,327, filed on Aug. 13, 2010 and titled "SYSTEM FOR AND METHOD OF UPDATING A PERSONAL PROFILE," which is hereby incorporated by reference in its entirety for all purposes. The U.S. patent application Ser. No. 12/856,327, filed on Aug. 13, 2010 and titled "SYSTEM FOR AND METHOD OF UPDATING A PERSONAL PROFILE" is a continuation-in-part of co-pending U.S. patent application Ser. No. 11/128,121, filed on May 12, 2005 and entitled "ADVANCED CONTACT IDENTIFICATION SYSTEM" which is hereby incorporated by reference, and which claims priority under 35 U.S.C. §119(e) of the co-owned U.S. Provisional Patent Application Ser. No. 60/570,409, filed May 12, 2004, and entitled "COMMUNICATION NETWORK IDENTIFICATION SYSTEM." The Provisional Patent Application Ser. No. 60/570,409, filed May 12, 2004, and entitled "COMMUNICATION NETWORK IDENTIFICATION SYSTEM" is also hereby incorporated by reference in its entirety.

FIELD OF THE INVENTION

The invention relates to a system for allowing users to provide other individuals with a personalized representation of the user in a network environment, such as a cellular telephone network.

BACKGROUND OF THE INVENTION

Wireless telephones have become more powerful with the inclusion of such features as cameras, address books, calendars and games. Many now include microprocessors, operating systems and memory which allow developers to provide limited applications for the phones. Phones now include the ability to play multimedia files including polyphonic ringtones, MP3 files, MPEG, AVI and QuickTime movies, and the like, in addition to displaying pictures taken on or downloaded to the phone.

Wireless phones have long been able to access the Internet via a Wireless Access Protocol (WAP) browser, and receive messages via Short Message Service (SMS). A user on a wireless telephone connects via the wireless network to a server which enables the phone to read WAP enabled content. Most providers enable a user to access an email message account via the WAP browser, and/or provide SMS messages directly to the user's phone. SMS allows users to receive abbreviated text messaging directly on the phone. Messages can actually be stored on the phone, but the storage available is limited to a very small amount of memory. In addition, no provision for handling attachments in SMS is available.

More recently, phones themselves have become powerful enough to utilize data connections over a carrier's network to manipulate data. For example, users of a carrier's network can download multimedia content to their phone, shop and download phone specific applications, and send and receive more robust messaging. Devices which have been combined with wireless phones, such as Research In Motion's Blackberry device, provide a user with enhanced message capabilities and attachment handling. These devices are specifically configured to provide contact and message applications over a wireless network.

Still, the majority of phones provide limited native address and contact data storage, and only SMS messaging capability. Some phones do allow users to associate images and specific ringtones with users in their phone's address book. Most wireless phones support caller ID, which displays the number of an incoming caller. Using this information, phones having imaging and multiple ringtone capabilities display an incoming caller's address book associated picture (if available) when the incoming call is received, and play a specially designated ringtone (if specified).

With the numerous different types of wireless phones and other communications devices available, a system which will enable users to provide a personalized representation of themselves on other user's phones would be useful in allowing the users to identify themselves to other users.

SUMMARY OF THE INVENTION

The present invention, roughly described, pertains to a system and method which allows advanced identification information to be created and distributed to users of wireless communication devices, such as mobile phones. Subscribers can define their own personas as collections of information which define the users. Subscribers can then publish their persona(s) to their friends' and associates' mobile phones, and update the others' address books with the subscriber's contact information. Users can specify different personas to be presented to different users.

In one embodiment, the invention is a system for providing personification information to users of a wireless phone.

In another embodiment, the invention is a method of identifying a service subscriber on a wireless device. The method may include the steps of: establishing a subscriber persona comprising information identifying a user to other users; and displaying at least a portion of the persona on a device when a call or other type of contact such as SMS, Push-To-Talk message, email, voiceclip, is received from another subscriber whose personalization information has been provided to the user.

In another embodiment, the invention is a method of providing an advanced caller identification service. In this embodiment, the invention includes: maintaining a store of subscriber persona information provided by users, the persona information identifying the user to other users; and distributing persona information to others based on an established relationship between subscribers.

A still further embodiment of the invention includes an application on a subscriber phone. The application includes a store of personification information for at least one other subscriber; and a display interface providing personification information to a phone interface and an interface for managing the user's own personalization information, as well as any system or account preferences.

In another embodiment, the invention is an application server for a communication system. The sever includes a store of personification information for a plurality of subscribers; and a distribution system management application.

In another aspect, a system implemented on a first system comprises a structure for storing a set of information including graphically represented contact-related information and a mechanism for altering the set of information by a second system.

In another aspect, a user interface within a first system for displaying and altering a set of information stored within the first system comprises a grid, a set of interactive sections within the grid and a set of groups within the grid containing the set of interactive sections, wherein the set of interactive sections within the grid provide access to display and alter the set of information.

In another aspect, a method of utilizing an interactive address book on a first system comprises storing a set of information in a structure on the first system, wherein the set of information is accessible though a user interface and accessing the set of information on the first system through the user interface, wherein a subset of the set of information is alterable by a second system.

In yet another aspect, a method of utilizing an interactive address book on a first system comprises altering a set of information in the interactive address book on the first system and pushing the set of information to a second system.

The present invention can be accomplished using hardware, software, or a combination of both hardware and software. The software used for the present invention is stored on one or more processor readable storage media including hard disk drives, CD-ROMs, DVDs, optical disks, floppy disks, tape drives, RAM, ROM or other suitable storage devices. In alternative embodiments, some or all of the software can be replaced by dedicated hardware including custom integrated circuits, gate arrays, FPGAs, PLDs, and special purpose computers.

These and other objects and advantages of the present invention will appear more clearly from the following description in which the preferred embodiment of the invention has been set forth in conjunction with the drawings.

BRIEF DESCRIPTION OF THE DRAWINGS

FIG. 4 is a flow chart illustrating a first method for providing an invitation to a non-subscriber to join a service established by an enterprise service provider in accordance with the present invention.

FIG. 5 illustrates a second method for providing an invitation to a non-subscriber in accordance with the present invention.

FIG. 6 is an illustration of personas and persona groups relative to a subscriber in accordance with the present invention.

FIG. 12 use case diagram illustrating the functions available to a user/subscriber in accordance with the system of the present invention.

FIG. 13 is a use case diagram illustrating the contact management available to a user/subscriber in accordance with the system of the present invention.

FIGS. 20B-20M are exemplary user interface screens provided on a client device such as a phone to manage contacts providing the features shown with respect to FIG. 20A on a client device such as a phone.

FIG. 21B-21N are user interface screens which may be provided on a client device such as a cell phone to implement the features shown in FIG. 21.

FIG. 24 is an exemplary user interface provided in a web browser by a server in accordance with the present invention allowing a user to manage details of the user's account in accordance with the system of the present invention.

FIG. 29 is a static structure of an entity manager utilized on a client structure such as that shown in FIG. 28.

DETAILED DESCRIPTION OF THE PREFERRED EMBODIMENT

The present invention allows advanced contact identification features to be provided to a phone or other mobile device by allowing a user to provide personification information for other users of advanced wireless communication devices. Each user can create one or more individualized representations of themselves and push this information to other users. The service is generally enabled by an enterprise service provider or cellular network carrier via one or more servers. Users can subscribe to the service, allowing them to create and distribute sub-sets of personification information or "personas", or merely participate in an advanced contact identification system, receiving personification information from subscribers. Since devices have different capabilities, the system will vary in its ability to provide personification information to each device, and in one embodiment, the type of user device and its capabilities are stored for each member of the system. The method and implementing systems and applications of the present invention provided by an enterprise service provider (ESP) may be subject to a service fee to maintain the personification information in a data store, and provide functionality associated with the system.

In general, a new subscriber creates a personification of the new subscriber which may include the new subscriber's contact information, signature, photo, multimedia information and a specific ringtone identifying the new subscriber to other phone users. Many cellular phones include an ability to download specific ringtones and use the ringtones to identify incoming callers by associating a ringtone and picture with a contact information in the phone and triggering it using caller ID functions. The system of the present invention allows the new subscriber to specify the subscriber's own ringtone and picture, and use it to identify the new subscriber to other users. In addition to the static information in the personification information, the new subscriber may provide dynamic information such as a geographic location, time zone, availability, and event-relevant information (e.g., a reminder it's a caller's birthday, or a summary of calendar events, blogs, reminders, or tasks assigned to or by the caller) or control information to other users or participants.

Figure 1:
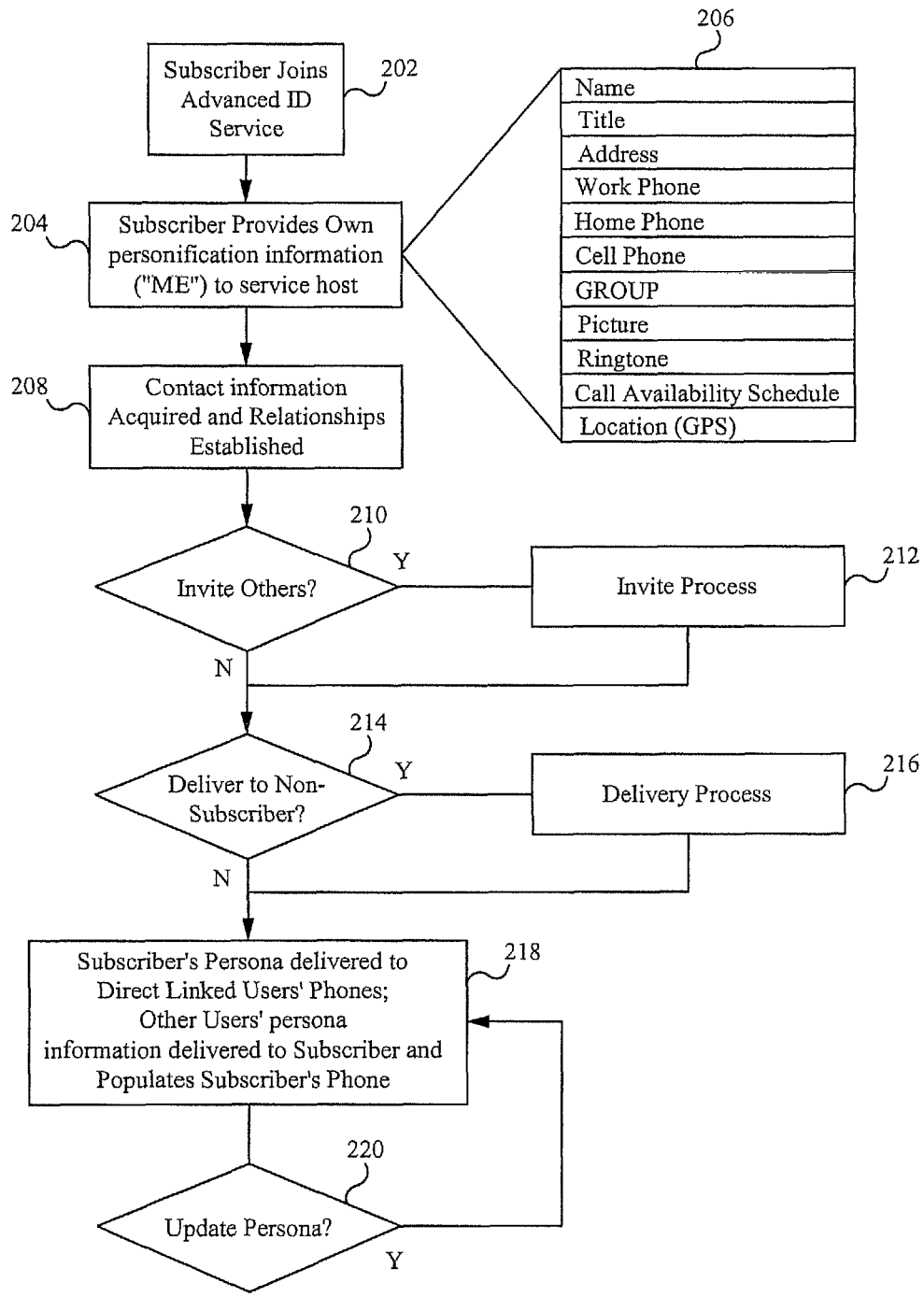
FIG. 1 is a flow chart illustrating a method in accordance with the present invention.

FIG. 1 illustrates a general method in accordance with the present invention. At step 202, the new subscriber joins an advanced contact ID service. The new subscriber establishes an account by providing account creation information such as a user name, a secure password, and other configuration information. This step may be performed via a phone based interface or via a web based interface or any other suitable interface means.

At step 204, the new subscriber may set the subscriber's own personification information. This is referred to in Figures occasionally as creating or updating "me". As shown at table 206, the new subscriber's personification information may include the new subscriber's name, address, phone number and any other contact information, a picture of the new subscriber, a specific ringtone for the new subscriber, and a schedule of available times that the new subscriber may be contacted in various manners. In addition, the new subscriber may input user location information. Location information may be of varying specificity, and may be initially input manually or through a connection with a geographic location system (e.g. GPS) in a geographic locating-enabled phone. Information in the location section of the new subscriber's system may be updated by an agent on the phone using the phone's geographic locating agent. The ringtone may be uploaded by the new subscriber or may be selected from tones provided by a system administrator as part of the service, or the new subscriber may use the phone's microphone (if equipped) to author a new audio clip which will be used as a ringtone. Optionally, a value added media distributor may provide phones, and digital rights management incorporated in the system to ensure proper control of copyrighted material within the system of the present invention. A phone manufacturer, a mobile phone carrier, or another entity may add DRM functionality as well, which may determine which protected content may be redistributed (and how). It should be recognized that step 204 is optional, and the new subscriber may decide not to provide personification information, but only participate in the system to acquire personification information of others. In another embodiment, subscription to the advanced contact ID service provided by the ESP is not required to receive personification information.

As discussed in further detail below, different sets of personification information (or "personas") may be provided for different groups of individuals in the new subscriber's contact list. For example, the new subscriber may wish one group of contacts to receive one set of personification information (such as business contacts), while another set (such as personal friends) to receive a different set of information. A group definition allows the new subscriber to define recipients who receive a particular version of contact information. The new subscriber may assign one or more users to a particular group using an interface provided on the phone, or alternatively via some other interface, such as a webpage or an administrative configuration console. Additionally, the new subscriber can specify a "public" persona which anyone may download (and will be automatically assigned to new contacts in the new subscriber's phone). The system or agent maintains group assignments in persistent storage. The system or agent transmits the information appropriate for each group to the members of the group using the above described techniques. The enterprise service provider can allow the new subscriber to have a default persona upon establishing an account with the system. For example, the system can establish default, public friends, family, co-workers, business associates, and blacklist persona templates, allowing the new subscriber to input certain information and have established personas once the new subscriber joins the system. The blacklisted persona is intended to be assigned to buddies to whom the new subscriber does not want to publish information.

At step 208, the new subscriber's contact records are provided to the ESP in one of a number of ways, and relationships are detected between the new subscriber's contact records and other subscribers'. This input may be as simple as downloading phone numbers that the new subscriber has stored in the new subscriber's phone, or may include additional contact information which allows the system to determine whether individuals are members of the system. In addition, the new subscriber may manually input contacts during account creation, or download contact information from another source, such as a personal information manager on a personal computer or personal digital assistant. A search mechanism may also be provided, allowing the new subscriber to input information on individuals to determine whether an individual is part of the system. For example, if the new subscriber does not have a stored resource of personal information, the new subscriber may, via the web browser, access a form provided by a system administration which provides name and other contact fields which the system can use to search for other users participating in the system. Once found, this information can then be provided to the new subscriber.

In accordance with the system of the present invention, different types of links may be established between users. Generally, a user's contact list is found in a user address book in a phone data store. Due to the nature of human communication, it is likely that a contact in the user's address book will have the user's information in that contact's own address book. For example, assuming Bob and Alice are both friends, they will likely have each other's contact information in their respective address books. This reciprocal link between people can be utilized to recognize and distinguish different types of links. In accordance with the invention, "half" linked users are users who have other's contact information in their address books, but the others do not reciprocate. Unlinked users are not connected for purposes of data exchange and the invitation functions provided in FIGS. 4 and 5 may be offered to unlinked users giving them the opportunity to subscribe to the system and establish true links with an inviter. "True" or "direct" linked users exist when both users have each other's contact information in their respective address books. These users have established some level of relationship outside of the service provided by the enterprise service provider or via system's "Invitation" function, and will automatically exchange and maintain any information each user has configured. Within a context of the foregoing description a "buddy" is any user who has established a true link with an individual user. For privacy as well as practicality, information exchange in the system occurs only between true linked users. Half-linked users may invite the unlinked user to join the system to establish true links. Additionally, in another embodiment, half-linked users are able to receive information pushed by other users without requiring the establishment of a true link. In such circumstances, the system is used as a distribution mechanism for details to or from users without requiring reciprocal address book relationships As discussed above, when the new subscriber provides his own personification information to a service host at step 204, links between users are detected at step 208 by examining the contents of their address books which are provided to an advanced ID service server. At step 208, once the contacts have been acquired, relationships between the new subscriber's contacts and other subscribers are established. This can occur automatically by an algorithm run by the ESP, may be set manually by the new subscriber, or may occur by some combination of the two.

In order to identify each user from a pool of all users of the system, the system uses telephone numbers and in one embodiment e-mail addresses as unique keys. In a further embodiment, the system of the present invention can use telephone number equivalence algorithms to match phone numbers regardless of formatting, country and area codes.

Users who wish to remove their information and "unlink another user" simply remove that user from their phones' address books. Using rules of the system, two users are no longer linked and no further updated information between them occurs. No information is deleted from a unlinked party's address book in this process. Another approach is to assign the unlinked party to a "blacklisted" persona.

Optionally, at step 210, the new subscriber may be offered the opportunity to invite other people to become subscribers. The new subscriber may be prompted to determine if the new subscriber wishes to invite contacts stored in the new subscriber's phone to become subscribers to obtain additional benefits attributable to subscription. If the new subscriber wishes to invite others, an invite process is performed at step 212.

Optionally, at step 214, the new subscriber may be given the option to allow the new subscriber's persona to be provided to non-subscribers. If the new subscriber desires the personification information to be delivered, a delivery process 216 transmits the personification information to non-subscribers. This may occur in any number of ways, such as via SyncML or via SMS messages, as described below.

At step 218, personification information from other subscribers in the new subscriber's contact list is delivered to the new subscriber, and the new subscriber's information is sent to the other subscribers. As discussed below, contacts who are also subscribers are true-linked users and automatically populate the new subscriber's phone. The information may be transmitted to the new subscriber in a data stream directly to the agent, which then populates the new subscriber's phone data. Alternatively, the information may be provided in a series of messages. Preferentially, the information will be transmitted via SyncML.

Included in persona information is whether the new subscriber's contacts should be alerted the new subscriber's location based on the geographic locating system in the geographic locating-enabled phone or manually entered location information in the new subscriber's own record. Also included may be, for example, the level of granularity available to the new subscriber's contacts. For example, a receiving member may be allowed to know the country, city or a more or less specific location. Once received, the receiving member may further configure the new subscriber's personification information based on the information received. For example, suppose the new subscriber provides location information in the new subscriber's record. The receiving member may specify that the receiving member wishes to be notified when the new subscriber with location information moves to a particular location or within a particular distance from the receiving member.

Other criteria may also be configured, such as group information. For example, the new subscriber may specify which groups each contact belongs to so that if a requesting member requests personification information about the new subscriber, the correct group information is provided to the requesting member.

Finally, at step 220, the new subscriber may update information in the new subscriber's persona. When the new subscriber does so, the information is re-transmitted to true linked subscribers and, if enabled, non-subscribers in the system. Updates may be started on the new subscriber's device by a client application as a result of data changes on the device. This may occur because of user interaction with the device, or changing transient information such as time zone. Updates can occur in one of two ways. Server-initiated updates are triggered by time intervals, or a change in data which is to be sent to the new subscriber's device. Server-initiated updates are handled via direct socket connection to the client or via SMS messages or some other asynchronous notification mechanism sent from the advanced ID service server to the client application on the device. Each advanced contact ID account supports a configurable "server initiated sync on/off" setting which controls whether SMS messages are automatically sent when a client is out of date. The SMS message from the advanced ID service server may be sent to the text port (or configured data port, if appropriate).

Figure 2:
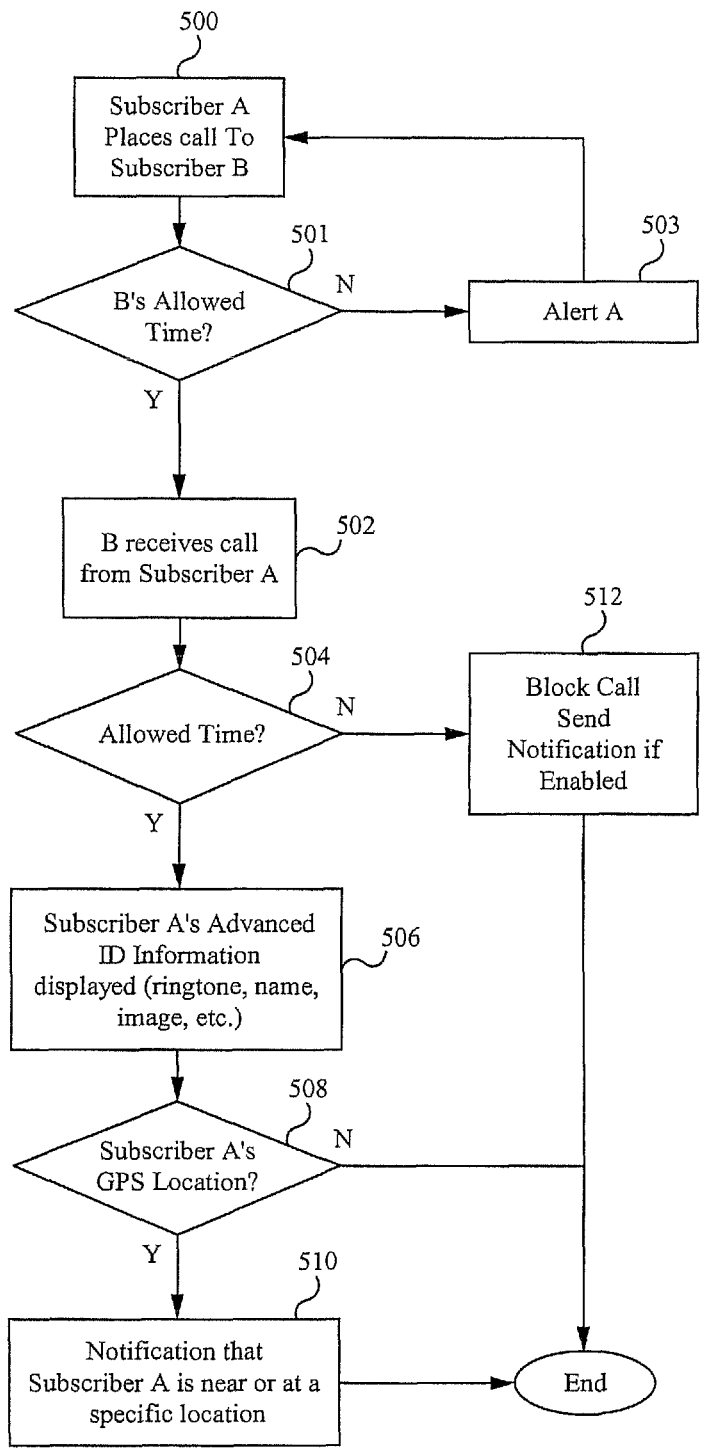
FIG. 2 is a flow chart illustrating a second method in accordance with the present invention.

FIG. 2 shows the method of the present invention once the new subscriber has established a relationship with the enterprise service provider in accordance with the present invention and installed the client application on the new subscriber's phone. At step 500, when a receiving user, Subscriber B, receives a call from calling user, Subscriber A, who has downloaded Subscriber B's information into Subscriber A's phone, advanced caller identification features can provide Subscriber A's information at step 506 on Subscriber B's phone.

In one aspect, the system supports controlling both the calling user's phone and the receiving user's phone. At step 501, if Subscriber B has configured Subscriber B's persona (which is downloaded to Subscriber A) to prevent calls during a certain period of time, the client application 140 on the calling user's phone can prevent Subscriber A from connecting to Subscriber B during this period. Hence at step 501, the method may check (on Subscriber A's phone) whether a call to Subscriber B is allowed based on Subscriber B's configuration. If not, an alert 503 may be provided to Subscriber A.

At step 502, if the call is initiated by Subscriber A and received by Subscriber B, optionally at step 504, the receiving user can configure the receiving user's phone to prevent calls during a specific period of time. Hence, at step 504, the method may check to determine whether a call is allowed during a specific period by the receiving user. If the call is not allowed, the method may block the call at step 512. If the call is not blocked, the calling user's advanced contact ID information (persona) is displayed on the receiving caller's phone at step 506, as mentioned above. If the call is blocked, it may be directed to the receiving user's voicemail system. In another embodiment, the call-initiating party whose call is blocked may be directed to use another form of communication such as SMS, email, IM, or voice clip.

An advanced contact ID information or persona is a collection of information which defines a particular user, such as a phone number, e-mail address, picture, geo location information and other data. This allows subscribers to manage their own "personal brand," controlling how they are represented on other users' phones by specifying ringtones or pictures associated with their contacts. As discussed herein, one can have a "friends" persona and a "co-workers" persona which contain different information or different sets of information. Additional features such as geo location information provided by geographic locating-enabled phones is also provided, as is information about the caller which is transient in nature—such as whether it's the caller's birthday or anniversary, or information concerning phone calls, meetings, or tasks assigned to or by the caller.

The system may be implemented by using a direct push system from an advanced ID service server via a SyncML server to a SyncML client, or may be operated on by a specific client application resident in the phone which communicates with the service-side implementation. SyncML is an Extensible Markup Language (XML) protocol under development as an open standard for the universal synchronization of data between devices. Synchronization of data allows changes made to data on one device (such as a smartphone or a laptop computer) to be instantly reflected in data on another device (such as a networked computer).

Optionally, at step 508, if the calling user has chosen to provide the calling user's geographic information, at step 510 the geographic information can be provided in a notification to show that the calling user is at or near a specific location.

The present invention supports two different types of data: static and dynamic. Static data can include a user's ringtone, name and image. The static information is provided by the calling user to the receiving user's client application on the receiving user's phone at step 506. Step 501 indicates a feature of the present invention which allows the calling user to define the calling user's own personification information to control the receiving user's phone—this dynamic or "active control" information can be updated more often than the static persona information. Dynamic information such as geographic location or time zone information is updated regularly based on the needs of the calling user. Due to the interaction of the client application on the receiving user's phone, the receiving user may actually prevent (or merely warn) the calling user from calling the receiving user's phone and may instead provide the calling user a user-configurable message which may direct the calling user to use some other mechanism to contact the intended receiving user (e.g., SMS, email, etc). As with all other similar information, this preferred availability information is stored users' personas.

Figure 3:
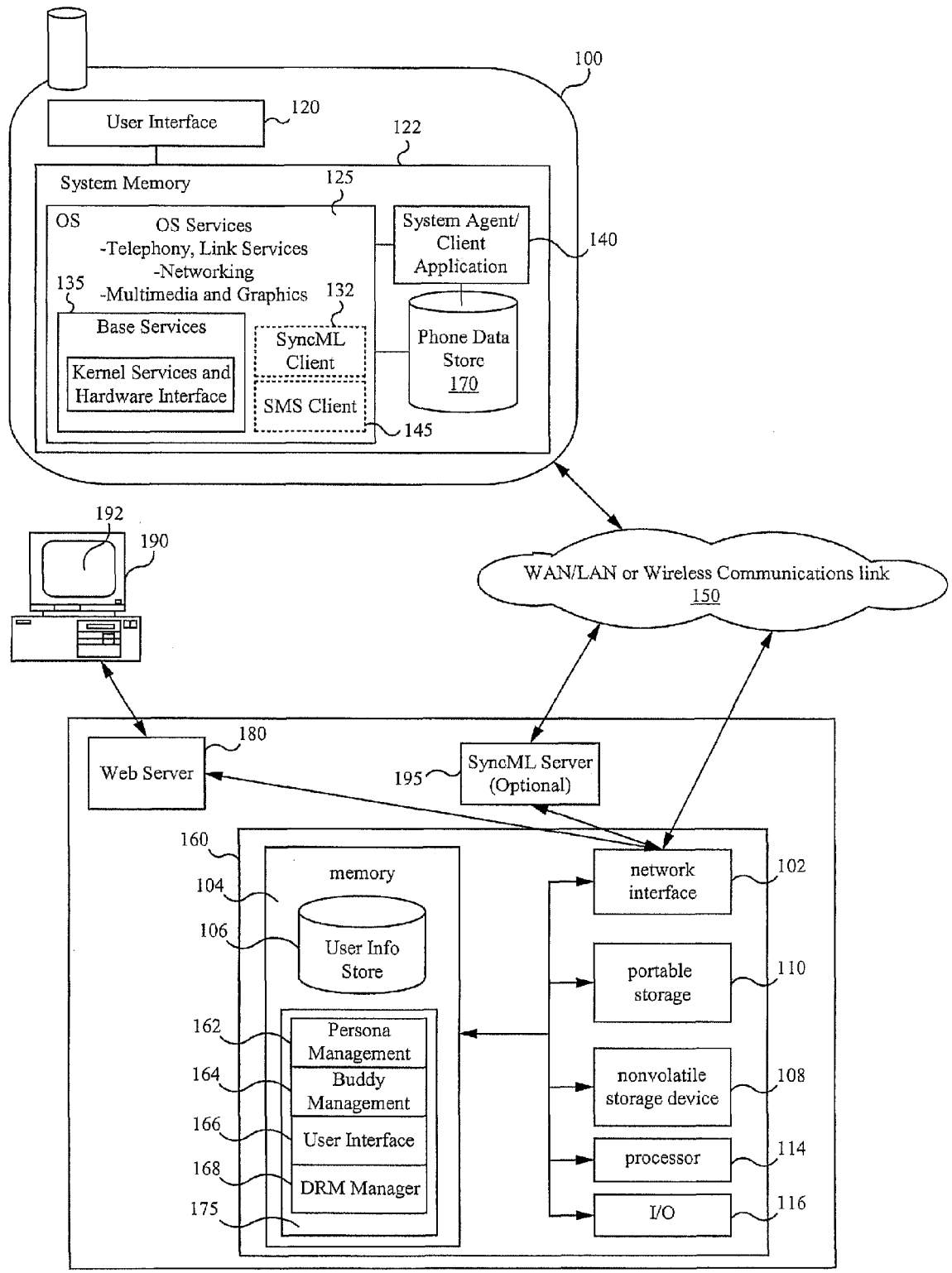
FIG. 3 is a block diagram of a system suitable for implementing the identification system of present invention.

FIG. 3 illustrates a general overview of a system for implementing the present invention. As shown in FIG. 3, a wireless communication device, such as a phone 100, is connected to a wireless communications link or network 150 to transmit voice and data communications to other devices coupling to the wireless communications link 150. It will be understood that the wireless communications link 150 may be a wireless internet link or a cellular network maintained by a cellular carrier, a GSM or CDMA network, or some other wireless communications link. The carrier may comprise the enterprise service provider or may be separate from the enterprise service provider. Data may be transmitted over the network in any number of known formats.

An advanced ID service server 160 is also provided which communicates with the phone 100 via the wireless network 150 directly over a data connection or via a SyncML server 195. Various embodiments of the system for implementing the advanced contact ID service are discussed herein. In FIG. 3, the advanced ID service server 160 communicates directly with the phone 100. In alternative embodiments, discussed below, the advanced contact ID system is implemented using a synchronization server such as that described in U.S. Pat. Nos. 6,671,757, 6,694,336 or 6,757,696.

The phone 100 may be provided with a system application or agent 140. The system agent 140 can include a SyncML communication client designed to interact with the SyncML server 195 in accordance with approved and proposed versions of the SyncML OMA DS specification, including proposed extensions (available at http://www.openmobilealliance.org). Alternatively, the system agent 140 can be an application designed to communicate with the advanced ID service server 160 using an existing SyncML client 132 on the phone 100 provided by the phone's manufacturer (as well as any custom extensions supported by such SyncML client 132), or an application specifically designed to communicate with the advanced ID service server 160 via another protocol, including a proprietary protocol. In one embodiment, the system agent 140 has a fully implemented SyncML communication client and the advanced ID service server 160 includes a SyncML server 195. In another embodiment, the application is a client application device sync agent such as that disclosed in U.S. Pat. No. 6,671,757. Various embodiments of the client application 140 are set forth below.

In accordance with the present invention, the phone 100 includes a system memory 122 which may further include an operating system (OS) 125 having operating system services including telephony and linking services, networking services, multimedia and graphics display services all provided to a user interface (UI) 120. The OS 125 may be the phone's proprietary OS, BREW, or any other device or operating system suitable for a phone (such as the Symbian Operating system). Additional base services 135 and operating system kernel services may also be provided. The operating system 125 may additionally provide an SMS client 145 built into the operating system 125 allowing short messages to be provided across the wireless communications link 150 to other users. Still further, the SyncML client 132 may be provided and supported by the operating system services. The phone 100 includes a native phone data store 170 which contains an address book of contacts and other information which may be provided by a subscriber. Such information can further include ringtones, pictures, sounds, and movies, all dependent on the functional capabilities of the phone 100, the space allowed in the system memory 122, and the services provided by the operating system 125.

The client application 140, various embodiments of which are discussed herein, is also loaded into phone 100. As will be well understood by one of average skill in the art, the client application 140 can be provided by the phone manufacturer or downloaded by a user at a later time. To download and install the client application 140, the user selects a download area of the phone operating system 125, selects the client application 140 from offerings provided by the service provider or carrier who maintains the wireless communications link 150, or an enterprise service provider who maintains the advanced ID service server 160, and installs the client application 140 onto the phone 100. In an alternative embodiment, the system agent 140 is a self-supporting application designed to run as a JAVA or BREW agent, or any other device or operating system specific agent (such as an agent operable on the Symbian Operating system). This system agent 140 can either include its own SyncML communication client, or interact with the existing SyncML client 132 on the phone 100. Changes can occur at field level or byte level. Alternative embodiments can communicate via alternative protocols via the wireless communications link 150 to store information in the user info store 106.

The phone 100 includes at least the user interface (UI) 120, the client application 140 having a communication or sync engine and data store manager, the SyncML client 132 and the phone data store 170. The client application 140 provides an appropriate graphical user interface to the UI 120 which provides the user an alternative point of interaction with the system and service provided by the enterprise service provider. The graphical user interface allows the user to define and manage personas and buddies as well as other tasks as specified in the case definition described herein. Interaction with the system can be via this phone user interface 120 or via an interface provided by the web server 180. The sync engine and data store manager are responsible for maintaining user settings and options in the phone's persistent storage as well as automatically pushing and retrieving changes to and from the advanced ID service server 160. The phone data store 170 includes account information, persona data, buddy information, data for other users who have true links with the subscriber, and multimedia content The advanced ID service server 160 is a centralized storage location for all system service information, including buddy, persona, relationship, and user data. The client application 140 can connect to and synchronize with the advanced ID service server 160 to update a local copy of this data as well as publish any changed information or retrieve any new available information from the advanced ID service server 160. In the phone 100, the persona information belonging to the user's buddy is primarily stored in the native address book or a separate address book provided by the client application 140. As some devices will not support all the published buddy information including the extended information such as geo location and presence information, the client application 140 can store this information in a phone data store 170 and provide access to it via the phone user interface 120.

In general, a hardware structure suitable for implementing the advance ID service server 160, the web server 180 or the SyncML server 195 includes a processor 114, memory 104, nonvolatile storage device 108, portable storage device 110, network interface 102 and I/O device(s) 116. The choice of processor 114 is not critical as long as a suitable processor with sufficient speed is chosen. Memory 104 could be any conventional computer memory known in the art. Nonvolatile storage device 108 could include a hard drive, CDROM, CDRW, flash memory card, or any other nonvolatile storage device. Portable storage 110 could include a floppy disk drive or another portable storage device. The advanced ID service server 160 may include one or more network interfaces 102. An example of a network interface includes a network card connected to an Ethernet or other type of LAN. I/O device(s) 116 can include one or more of the following: keyboard, mouse, monitor, display, printer, modem, etc.

Software used to perform the methods of the present invention are likely to be stored in nonvolatile storage device 108, volatile memory 104 and portable storage media 110.

The advanced ID service server 160 also includes the user info store 106. In alternative embodiments, the user info store 106 is stored in memory 104, non-volatile storage 108, portable storage 110 or another storage device that is part of the system of FIG. 3 or is in communication with the system of FIG. 3. Other alternative architectures can also be used that are different from that depicted in FIG. 3. Various embodiments, versions and modifications of systems of FIG. 3 can be used to implement a computing device that performs all or part of the present invention. Examples of suitable computing devices include a personal computer, computer workstation, mainframe computer, handheld computer, personal digital assistant, pager, cellular telephone, smart appliance or multiple computers, a storage area network, a server farm, or any other suitable computing device. There may be n number of servers 160, n+1 managed by a system administrator providing a back up service in accordance with the present invention.

While only one user info store 106 is shown, it should be recognized that the user info store 106 may be replicated to or stored over a plurality of computers to ensure that the data thereon is protected from accidental loss. It should be understood that the representation of the SyncML server 195 and web server 180 need not require that such servers be provided on different physical hardware than the advanced ID service server 160.

The system of FIG. 3 illustrates one advanced ID service server 160 and one device 100 system suitable for use in the present invention. In an alternative embodiment of the invention, the advanced contact ID system can be constructed using a synchronization server described in U.S. Pat. Nos. 6,671,757, 6,694,336 or 6,757,696.

A synchronization system described with respect to U.S. Pat. Nos. 6,671,757, 6,694,336 or 6,757,696 comprises client software which provides the functions of a differencing transmitter/receiver/engine, and differencing synchronizer in the form of a device engine. The device engine may include at least one component particular to the type of device on which the device engine runs, which enables extraction of information from the device and conversion of the information to difference information, and transmission of the difference information to the storage server. The storage servers utilized in the system may be any type of storage server, such as an Internet server or an FTP server, and may be provided from any source, such as any Internet service provider. In a key aspect of the sync system, the Internet connection between the devices or between the devices and a server, need not exist at the same point in time. In addition, only those changes to the information which are required to be forwarded to other systems on the system of the present invention are transmitted to enable fast response times.

Data from each of the sync client devices is coupled with a storage server. In one embodiment, each device engine implements all processing required to keep all the systems fully synchronized. Only one device engine needs to be coupled to the sync server at one particular point in time. This permits synchronization of multiple systems in a disconnected fashion. Each device engine will download all transactions encapsulating changes that have occurred since the last synchronization from the server and apply them to the particular device. The change or difference information (termed a "data package" or "change log") is provided in one or more data packages. Each data package describes changes to any and all transfer information across all device engines, including but not limited to application data, files, folders, application settings, and the like. Each device engine can control the download of data packages that include classes of information that apply to the specified local device. For example, contact names and phone numbers while another needs only changes to e-mail, changes to document files.

Compression and encryption of the data packages may be optionally provided. Each device engine performs mapping and translation steps necessary for applying the data packages to the local format required for that type of information in the application data stores. The device engine also includes components which allow it to track ambiguous updates in cases where users have changed data to a particular data field on two different systems simultaneously since the last update. The output of the device engine comprises a data package which is output to sync server database. As noted above, only one device engine need be connected to the storage server at a given time. The data package can be stored on the storage server until a request is made to a particular location of the storage server by another device engine. Access to areas of the storage server is controlled by a management server (MS). In one embodiment, each sync operation requires that the device engine for each device login to the management server to authenticate the device and provide the device engine with the location of the individual device's data packages on the storage server.

When data is returned to the delta module from the storage server, the delta module returns differenced data to the application object for the particular application which then translates the delta information into the particular interface utilized for application. Once a device engine has been fully applied all data packages from an input stream, it generates a series of data packages that describe the changes made on the local system. The device engine uses the local application object to keep track of the last synchronized version of each application's actual data, which is then used for the next data comparison by the delta module on the next sync request. Generated data packages can include operations and encode changes generated from resolving ambiguous cases as described above.

The sync server uses the concept of a universal data record in its internal sync differencing engine and when sending data to and retrieving from external entities.

The management server supports an authentication interface that requires each device engine to authenticate with the management server before performing synchronization. Certain storage server implementations may utilize locking semantics to control read and write access to storage for multiple device engines. For example, in a generic FTP request, if two device engines attempt to connect to the same data at the same time, there must be some form of locking control to prevent device engines accessing the same data at the same time. In this instance, the management server controls the device engine acquisition, renewal, and releasing of locks against data stored in the network.

Each device engine is uniquely identified and tracked by the management server. This allows for tailoring behavior between the management server and specific types of storage systems and device engine components. All device engine components are tagged and version stamped for management via the management server.

Also shown in FIG. 3 is a server-side application ID service controller application 175 which includes a persona management component 162, a buddy management component 164, a user interface 166, and a digital rights manager 168. It will be understood in various implementations of the present invention that these functional components operating within the server-side application 175 can push information maintained by the system of the present invention directly into the phone 100 via the SyncML server 195 interacting with a fully robust SyncML client. Optionally, certain aspects of the control are handled by either the server-side application 175 or the client application 140, as described herein.

In accordance with the invention, the client application 140 communicates personification information and changes made to the personification information stored in the phone data store 170 to the advanced ID service server 160 via the wireless network 150. Communication of user data from the phone 100 may take several forms. Where the client application 140 utilizes the SyncML client 132 with the advanced ID service server 160, communication may take place using the standards set forth in the SyncML specification. Changes are transmitted on a record-by-record basis or field-by-field basis. Alternatively, communication may occur via another protocol. The SyncML client 132 is utilized to update the phone's 100 native address book with buddy published information as well as to retrieve persona and link information from the advanced ID service server 160. Information can be exchanged via the SyncML protocol, or via a direct data link with the advanced ID service server 160. The advanced ID service server 160 stores and maintains each user account, link personal and buddy information as well as multimedia content, both system provided and user created. The advanced ID service server 160 is a stand alone server and may be incorporated with the features of a synchronization system such as that described in U.S. Pat. No. 6,671,757. Details of this integration are described in further detail below. As noted above, a management interface is provided via the web server 180. Description of this interface is shown below.

The advanced ID service server 160 stores user data in the user info store 106 in a manner which associates the data with an individual user of the phone. In one embodiment, the data is stored in bulk—that is all records and information for the individual user are stored in simple text form, (or binary form, depending on the type of data in use). This information is stored in the data store using a unique identifier (UID) associating the personification data with the individual user. The identifier may be any randomly selected identifier, so long as the individual user is uniquely identified, and the data is associated with the user. In a further aspect, this user UID may be a universally unique identifier (UUID), created in a manner described in the aforementioned U.S. Pat. Nos. 6,671,757, 6,694,336 or 6,757,696 or other manners to create a single ID for a given user. In yet another embodiment, user data and changes to the user data are stored in change logs in a manner described in the aforementioned U.S. Pat. Nos. 6,671,757, 6,694,336 or 6,757,696.

The web server 180 allows the user on a computer or other user device 190 having a web browser 192 to configure aspects of the system of the invention. The web server 180 may have a hardware configuration similar to the advanced ID service server 160 and may comprise one or more physical computers. Additionally, the web server 180 may be integrated with the advanced ID service server 160.

In one embodiment, aspects of the system of the present invention are configured via the phone user interface 120. The system can alternatively be configured by the user via a web interface provided by the web server 180 via the user device 190.

FIG. 4 illustrates one process for implementing an invitation (step 212) from a subscriber to a non-subscriber or participant. At step 302, the non-subscriber receives an SMS message from the subscriber. The SMS message may contain all information necessary for the non-subscriber to publish the information into the non-subscriber's data store. In one aspect, this can include all persona information itself in a format which can be read by a native or non-native application such as a SyncML client, a vCard parser, or other application and incorporated into the phone data store. If the non-subscriber accepts the information at step 304, the information populates into the non-subscriber's data store. The next time the subscriber calls, information will be displayed on the non-subscriber's phone.

In another embodiment, shown in FIG. 5, the non-subscriber receives an SMS message from the subscriber at step 404. At step 406, the non-subscriber can select a link stored in the SMS message to connect the non-subscriber's phone to the user info store 106 which sends the subscriber's information directly to the non-subscriber's phone. At step 408, the non-subscriber's phone downloads the information of the subscriber to the phone data store 170 on the non-subscriber's phone.

FIG. 6 illustrates the concept of different personas for different groups of users. FIG. 6 shows a linkage example of different users linked to a central user 600. The central user 600, "Bob", has a mobile phone which is linked to other users 604, 606, and 602. For each group of users 602, 604, and 606, the central user 600 can establish different personas. A "friend's" persona may show Bob's personal address and home phone number and provide a first type of ringtone. A "co-worker's" persona 604 provides a more formalized name setting, a work e-mail address, and a work phone number with an undefined ringtone. A "client's" persona 606 shows an even more formal name, and includes different work and mobile phone numbers as well as a different ringtone more suitable to provide to Bob's clients.

As shown in FIG. 6, people usually have distinct groups with whom which they communicate including friends, co-workers, and clients. The establishment of different personas allows the publication of different information to each individual. As illustrated in FIG. 1, personas can include names, e-mail addresses, phone numbers, physical addresses, corporate information, pictures, ringtones, URLs, personal physical characteristics (eye/hair color, et al) and birthday information. This information handling is flexible and extensible and can accommodate any additional permanent as well as transient information such as a current time zone, digital certificates, a physical location, including geographic location (such as coordinates), and availability.

Figure 7:
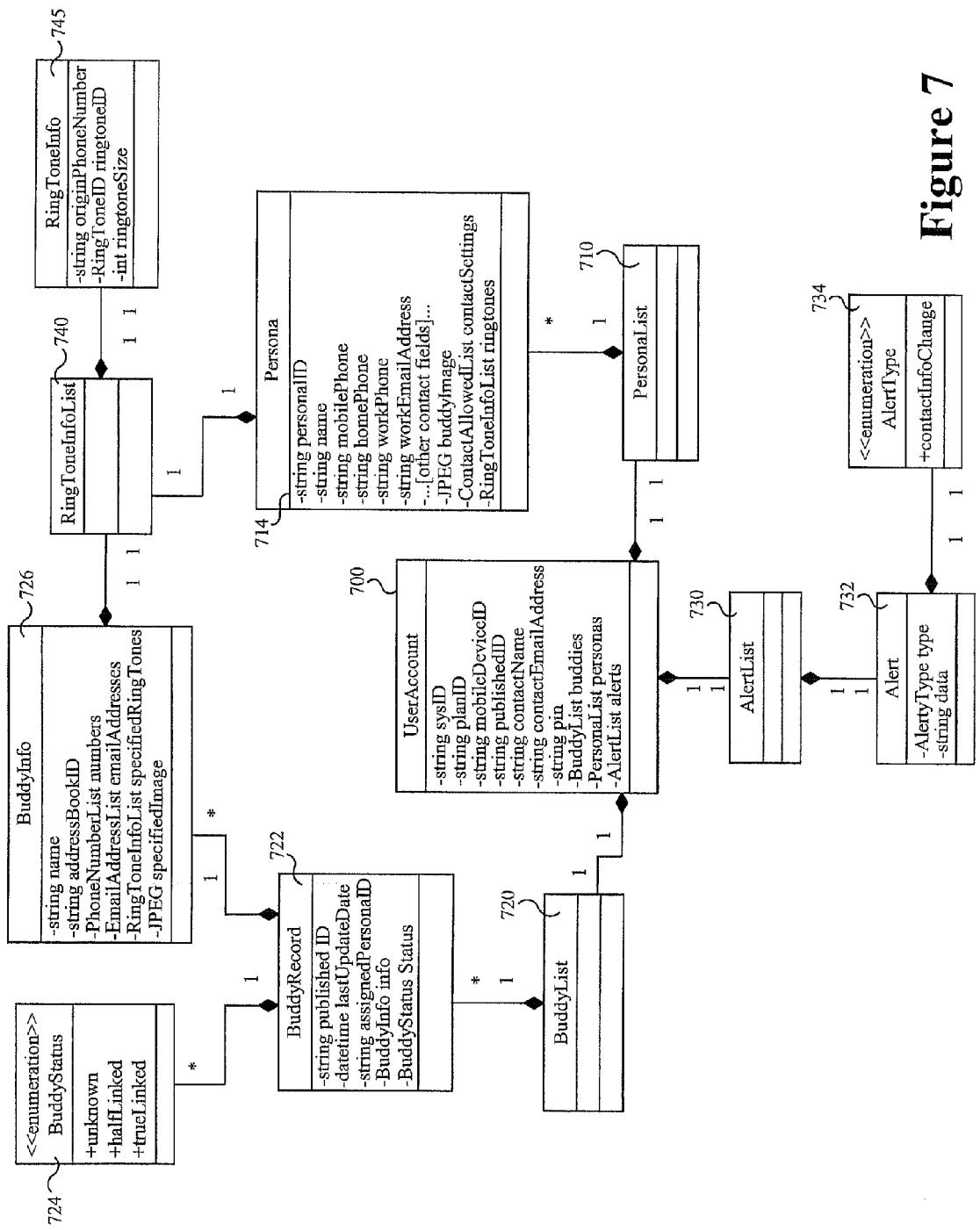
FIG. 7 is an illustration of the structure of a system database store on a server in accordance with the present invention.

FIG. 7 depicts a static structure of the records maintained for an individual user by the advanced ID service server 160 of the present invention. Each individual user account 700 includes a system ID, a plan ID (indicating a service level description), a mobile device ID, a published ID, a contact name, a contact e-mail address, and a user security pin. The user account 700 will also contain a persona list 710, a buddy list 720, and an alert list 730. The alert list 730 will define a number of alerts 732, each including an alert type 734 and data. The persona list will define a number of personas 714, each including, for example, a personal ID, a name, a mobile phone, a home phone, work phone and other information as specified above with respect to FIG. 1. Other information can include a buddy image, contact list allowed settings, and ringtone information. The ringtone information 740 may be a list of information which links to specific ringtone records 745. Each buddy in buddy list 720 has a buddy list record 722 which includes a published identifier, a last update date (indicating when the buddy record was last updated), a personal identifier, a buddy status identifier 724, and buddy information 726. Buddy information 726 includes a name, address book identifier, phone list numbers, e-mail address lists, image, and ringtone information.

Figures 8, 9:
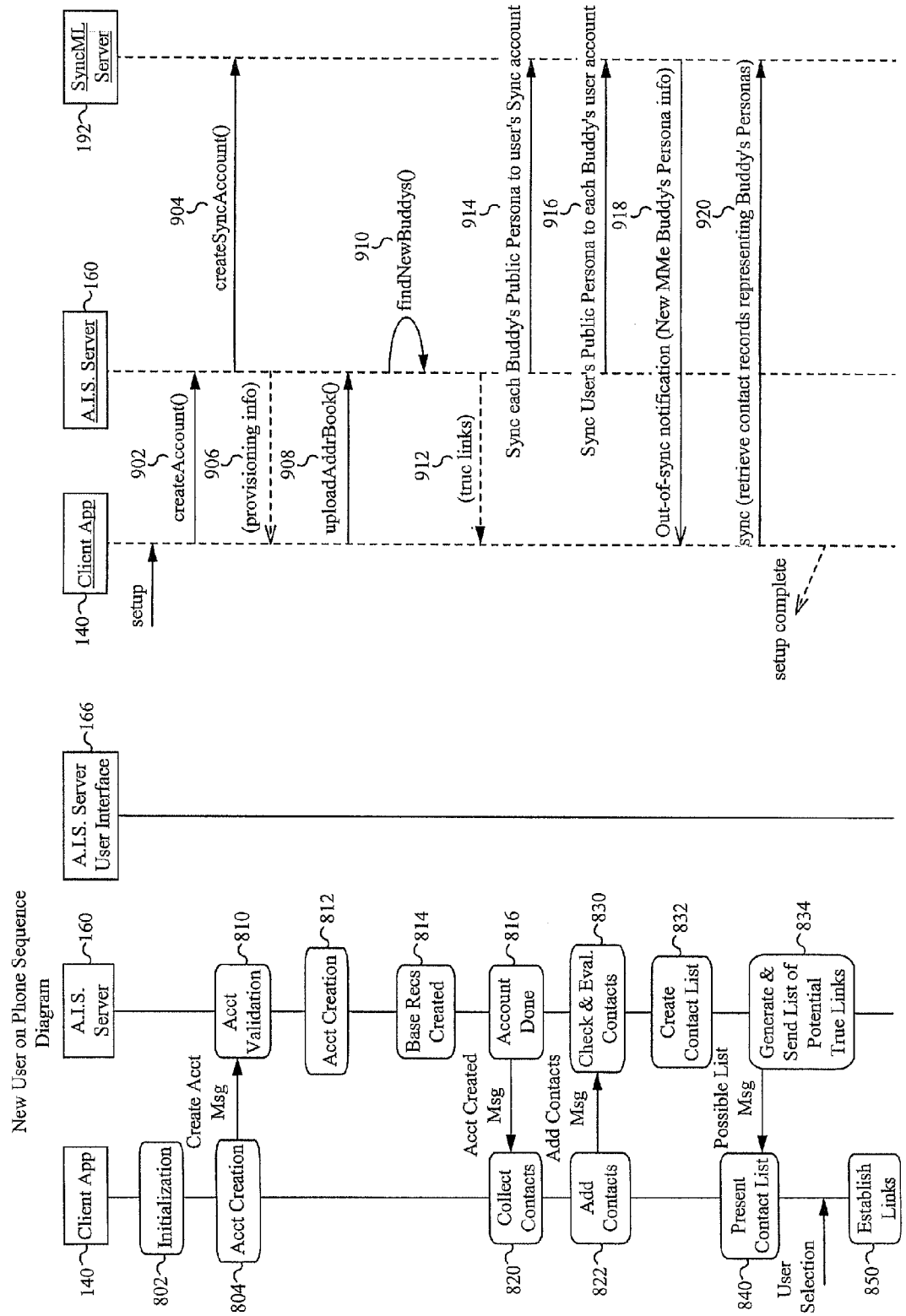
FIG. 8 is a sequence diagram illustrating the actions which occur on a client device, server, and server interface to allow a new user to subscribe to the advanced identification service in accordance with the present invention from a phone.
FIG. 9 is a sequence diagram illustrating how a user account is created when the system is used with a synchronization server in accordance with U.S. Pat. No. 6,671,757.

FIG. 8 is a sequence diagram illustrating how a new user can sign up for the advanced caller ID service provided by the enterprise service provider in accordance with the present invention. FIG. 8 shows the sequence of steps which occur between the client application 140 on the phone 100 and the server-side application 175 on the advanced ID service server 160. Upon initialization of the client application 140 at step 802, an account creation process begins at step 804 and sends a create account message to the advanced ID service server 160. At step 810, an account validation process begins, by prompting the new user to provide certain basic information such as name and e-mail contact information to the system. The account validation process at step 810 acquires required information from the new user via the phone user interface 120, and the account is created at step 812 once the required information is provided. Basic account records, including, for example, the information provided in the validation step 810, are created at step 814. Once the account creation step is finished, at step 816, an account created message will be sent to the new user's phone 100. Contacts in the new user's phone 100, which are present in the user's native address book are collected at step 820. At step 822, an add contacts message or data transmission will be sent to the advanced ID service server 160. These contacts will be checked and evaluated at step 830 to determine links between known users in the system already, and users who are not linked in the system. A contact list is created at step 832, and the list of potential true links is generated at step 834. Note that true links can be created and maintained automatically, without user intervention or approval. However, in this embodiment, at step 834, this list is returned to the new user and presented to the new user at step 840. The new user can then select which of those contacts the user wishes to establish links with, and these links will be established at step 850. Optionally the system can establish links with any user who has already established themselves with the system service as a subscriber, who already appears in the new user's local address book.

FIG. 9 is an alternative method for establishing an account with the enterprise service provider wherein a synchronization system of U.S. Pat. Nos. 6,671,757, 6,694,336 or 6,757,696 is used. This sequence illustrates that account creation for such a system requires creation of an underlying sync account with the SyncML server 195, but such account can be created through the advanced ID user interface 166.

At step 902, an account creation step is initiated on the advanced ID service server 160. The advanced ID service server 160 will also create an account with the SyncML server 195 at step 904. The advanced ID service server 160 will provide provisioning information 906 to the client application 140, which will then upload its address book at step 908 to advanced ID service server 160. The advanced ID service server 160 will attempt to establish whether direct links are present at step 910 and return those true links to the new user at step 912. Concurrently, at step 914, the system will attempt to perform synchronization with the new user's contact information on the SyncML server 195. At step 916, the new user's public persona is synced to each user's synchronization account and if there's any problem with the synchronization at step 918 an out of sync notification message is returned to the client application 140. At step 920, records are retrieved regarding the records representing the buddy's personas. Persona records are thereafter synced as other records are synced in accordance with the description in U.S. Pat. No. 6,671,757.

Figure 10:
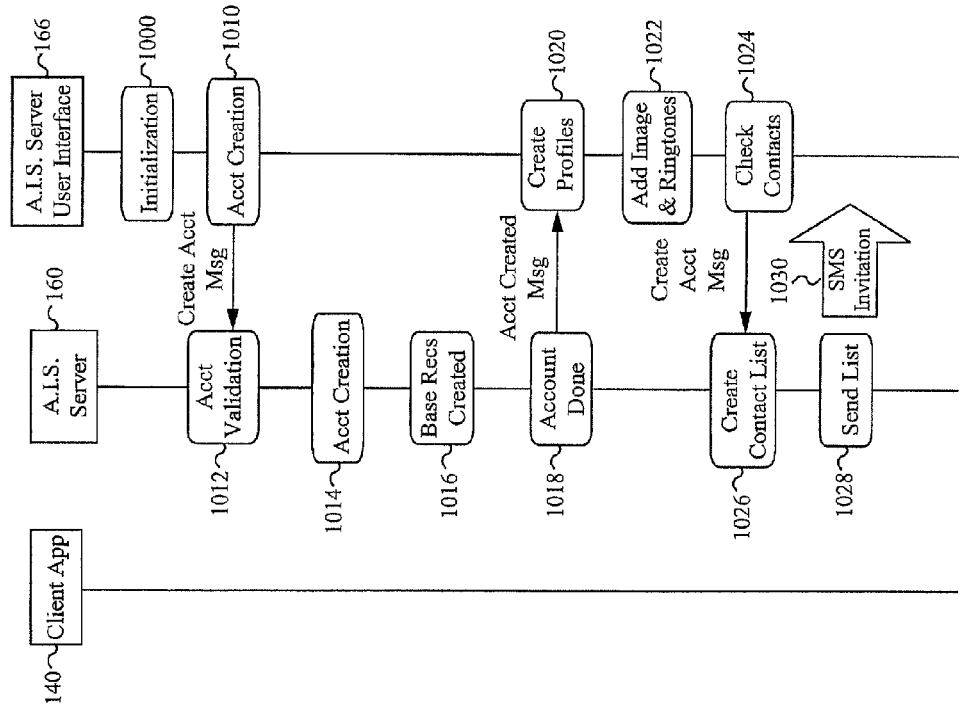
FIG. 10 is a sequence diagram illustrating how a new subscriber is established on a server provided interface in accordance with the present invention.

FIG. 10 is a sequence diagram illustrating the establishment of a new user account on the advanced ID service server 160 via the advanced ID service server user interface 166 provided via the web server 180. At step 1000, initialization begins. At step 1010, an account creation interface is provided to the advanced ID service server user interface 166. The new user provides information into the account creation interface and the information is transmitted via a create account message to the advanced ID service server 160. An account validation step will occur at step 1012 after the new user has provided sufficient information to establish an account with the enterprise service provider. Once this occurs, an account creation will occur at step 1014 and base records will be created at step 1016. When the account has been established at step 1018, an account created message will be returned to the user offering the user the opportunity to create personas and providing the new user with a set of default personas at step 1020. The new user will be provided with an initial opportunity to add images and multimedia at step 1022. Next, at step 1024, the new user will be provided with the opportunity to check "buddies" which have been created during the contact link establishment step 208 of FIG. 1. Once the new user has selected which contacts the new user wishes to establish connection with, a contact list will be created at step 1026. The list will be sent back to the new user at step 1028 and may be used to initialize SMS invitations 1030 to those users who are not already established as subscribers with the enterprise service provider.

Figure 11:
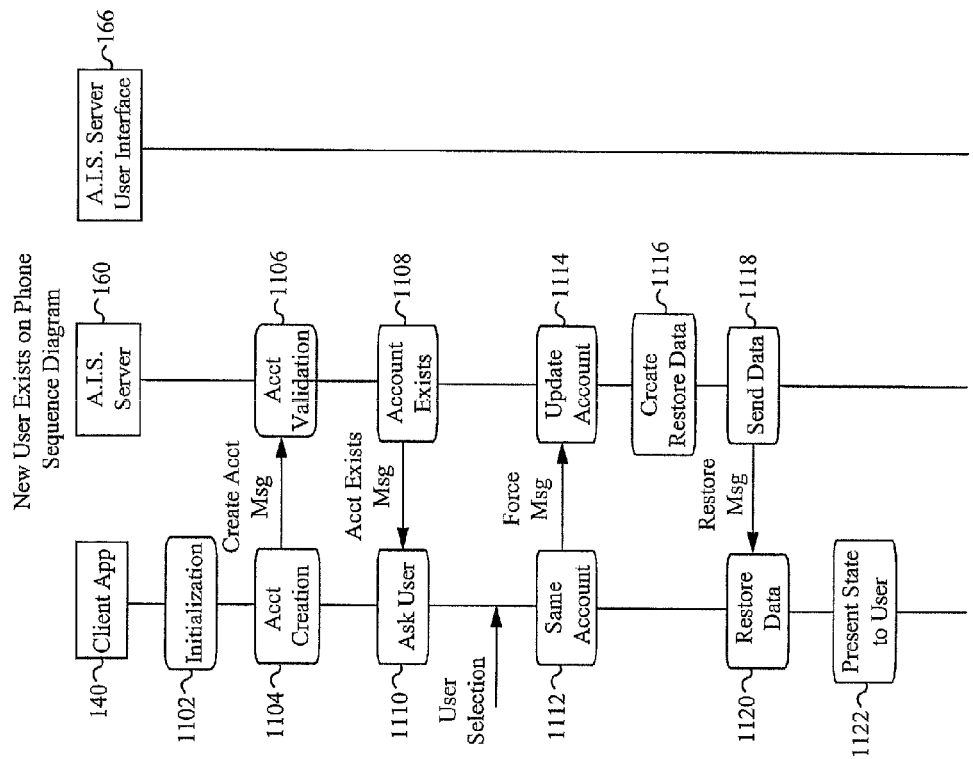
FIG. 11 is a sequence diagram illustrating how a user already having an account with the system, but utilizing a new phone, would interact with a server in accordance with the present invention.

FIG. 11 illustrates the interaction between the client application 140 and the server application 175 in a situation where an existing user may have lost the user's old phone but already has an existing account with the system. Hence, the existing user merely needs to reestablish connection with the account using the existing user's new phone. At step 1102, initialization takes place. At step 1104, an account creation routine runs on the client application 140 and an account creation message is sent to the advanced ID service server 160. When the account attempts to validate the existing user's information at step 1106, a determination that the account already exists will occur at step 1108. This will prompt a message returning to the client application 140 to ask the existing user at step 1110 whether the account which has been entered is in fact the existing user's account. Once the existing user selects a prompt indicating that it is the same account at step 1112, a message will be returned to the advanced ID service server 160 and the account will be updated at step 1114 with the existing user's new device information. The system may be utilized to restore information to the existing user's new phone by creating a restored data set at step 1116, which may be returned to the existing user at step 1118, and the data is restored in the phone device at step 1120. As such, this restores the existing user's information in the existing user's new phone to the state it was when the existing user last updated the existing user's information on the system's server. At step 1122, the user's information is presented to the user.

As noted above, the client application 140 and server application 175 provide the existing user with a number of functions to create and manage accounts with the ESP and the advanced contact ID system.

FIG. 12 illustrates functional use cases for a particular subscriber. The particular subscriber 1200 can install an application at 1202, such as by downloading the application to the phone 100 via the phone user interface 120, and create accounts at 1204 in accordance with the foregoing description. Likewise, the particular subscriber 1200 can uninstall the application at 1206 and delete accounts at 1208 with the enterprise service provider. The particular subscriber 1200 can also use the application to upgrade accounts at 1210, downgrade accounts at 1214, and change account settings at 1216 in order to modify an account at 1218.

FIG. 13 illustrates the functions the particular subscriber 1200 can implement to perform tasks linking to other subscribers. The particular subscriber 1200 can view a buddy list at 1302, requiring the buddy list to be retrieved at 1304. Likewise, the particular subscriber 1200 can change a particular buddy's persona assignment at 1305, view a mapping of buddy and personas at 1306, override the buddy's published information at 1308 in the particular subscriber's own address book, such as where a "buddy" had downloaded a ringtone which is not desired by the particular subscriber 1200, remove the buddy from the list of buddies at step 1310, add a buddy by performing a search function at 1312, or invite another person who is not a subscriber to be the particular subscriber's buddy by subscribing to the system at step 1314.

Figure 14:
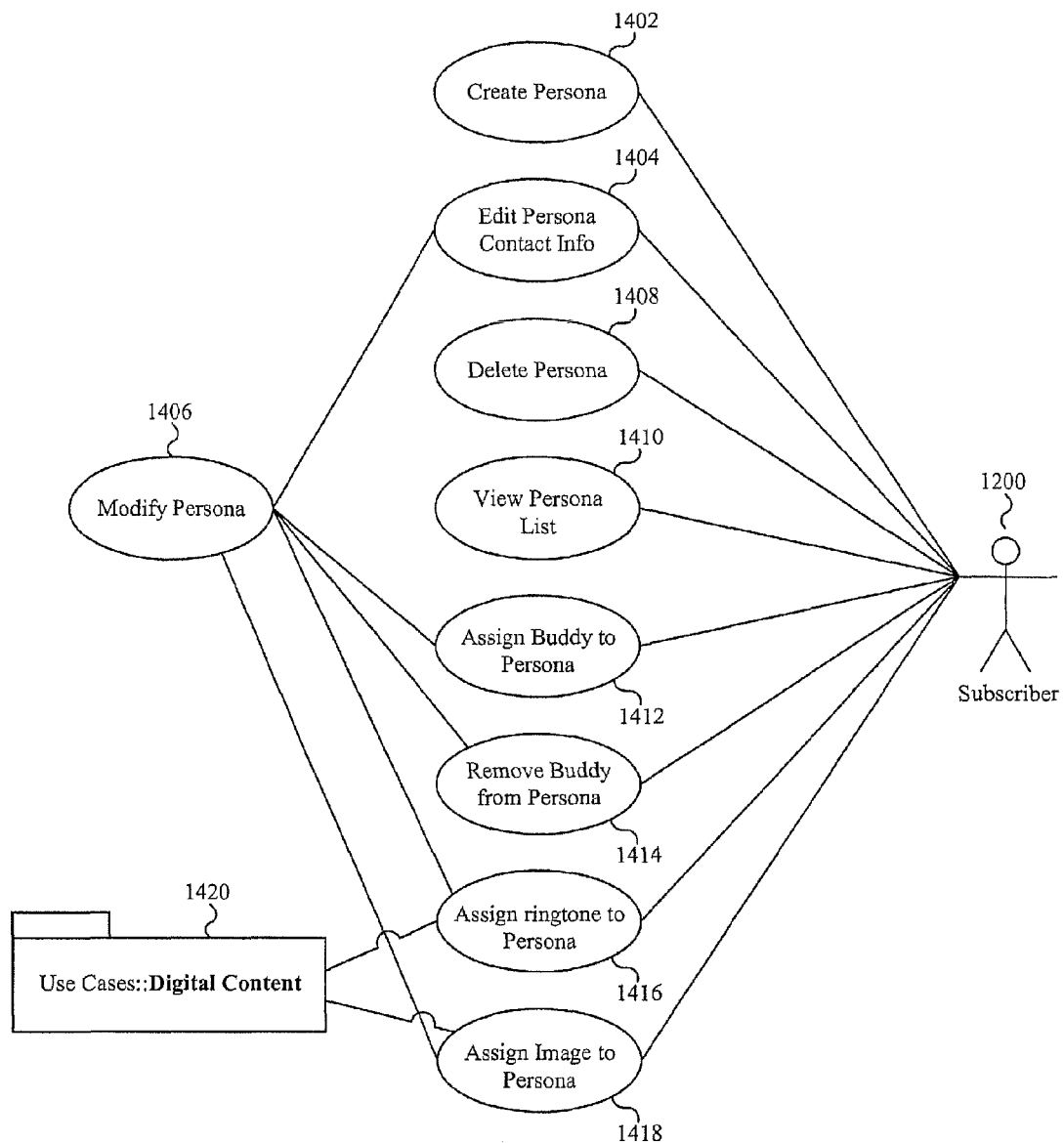
FIG. 14 is a use case diagram illustrating the persona control functions available to a user/subscriber in accordance with the system of the present invention.

FIG. 14 illustrates use cases for the particular subscriber 1200 with respect to persona manipulation. The particular subscriber 1200 can create persona at 1402, edit personas at 1404 (which results in a modify persona at 1406), delete a persona at 1408, or view a persona list at 1410. Other instances which result in modifying a persona included assign a buddy to a persona at 1412, removing a buddy from a persona at 1414, assigning a ringtone to a persona at 1416 or assigning an image to a persona at 1418. Assigning a ringtone or image also gives rise to the modification of multimedia content at 1420, specifically digital content as illustrated in FIG. 15.

Figure 15:
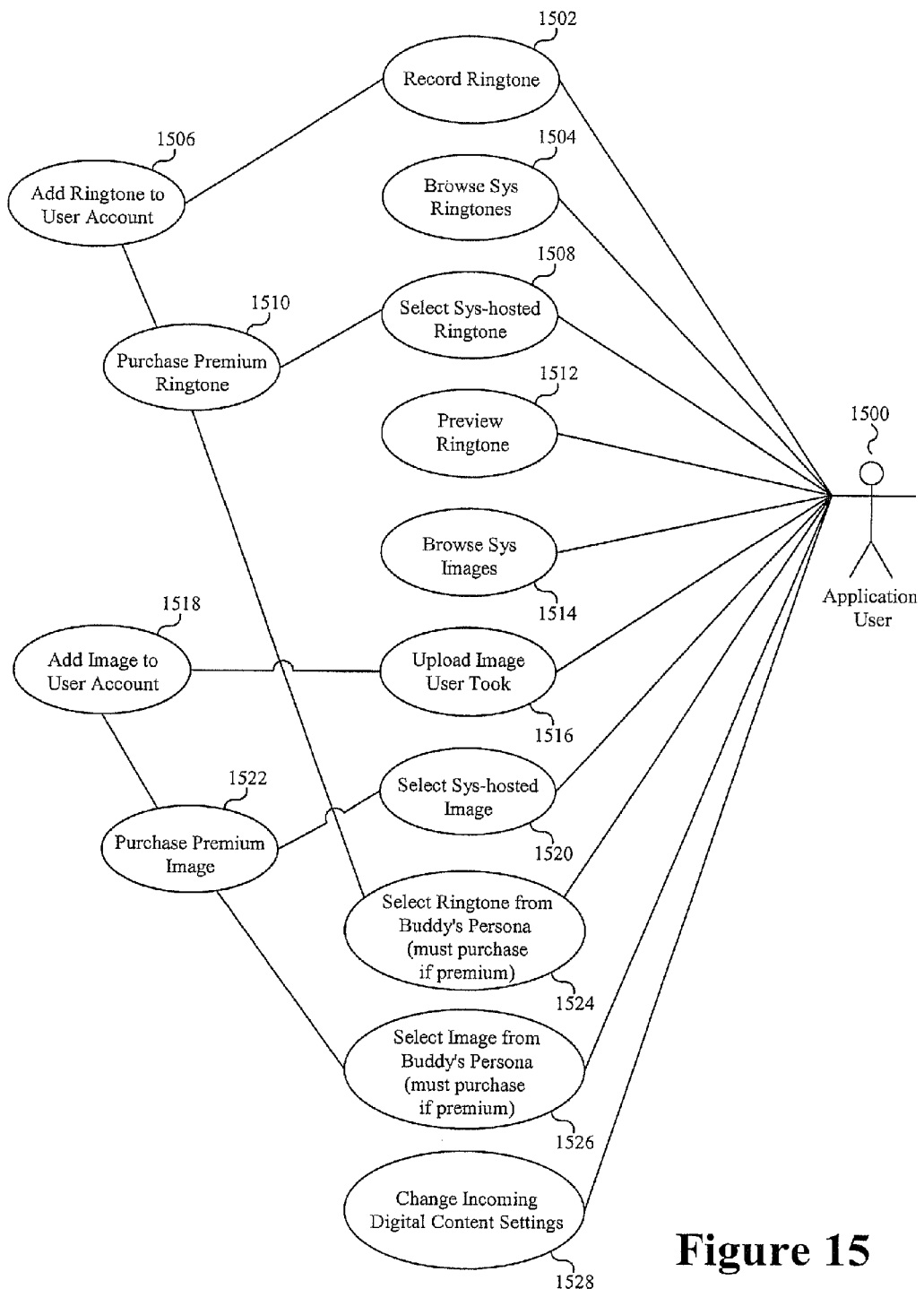
FIG. 15 is a use case diagram illustrating the multimedia control functions available to a user/subscriber in accordance with the system of the present invention.

FIG. 15 illustrates the use cases for an application user 1500 interacting with multimedia content. The application user 1500 can record the application user's own ringtone at 1502, or browse system ringtones provides by the value added service provider via the enterprise service provider at 1504. Recording a ringtone at 1502 results in the ringtone being added to the application user's account at 1506. The application user 1500 can also select system hosted ringtones at 1508 and may choose to purchase premium ringtones at 1510. The application user 1500 can also preview ringtones at 1512, and browse system provided images at 1514. The application user 1500 is allowed to upload images 1516 to and from the application user's phone when, for example, the application user's phone supports taking pictures, and adding the image to the application user's account at 1518. The application user 1500 can also choose to select system hosted images at 1520 and purchase premium value added images at 1522. Where the application user 1500 has purchased a ringtone, at 1524, the application user 1500 may choose to share this ringtone with buddies. When a buddy selects the ringtone, digital rights management provider rights in the ringtone may require that the buddy utilizing the ringtone purchase a license to use that ringtone for themselves. Step 1524 allows a prompt where the system asks the application user 1500 requesting the buddy's ringtone for the application user's own use to purchase the ringtone from the enterprise service provider. Likewise at 1526, the buddy's image can be utilized by the application user 1500, and if such image is premium content, a prompt requiring the application user 1500 to purchase the image is provided at 1526. At 1528, the application user 1500 is allowed to change digital content settings in the application user's own phone. If for example the buddy has provided an image and/or ringtone that are unsuitable for the application user 1500, the application user 1500 is allowed to override those settings in the application user's own phone using the application interface. In another embodiment, the media is donated, subsidized, or otherwise provided at reduced or no cost by one party to the other.

Figure 17:
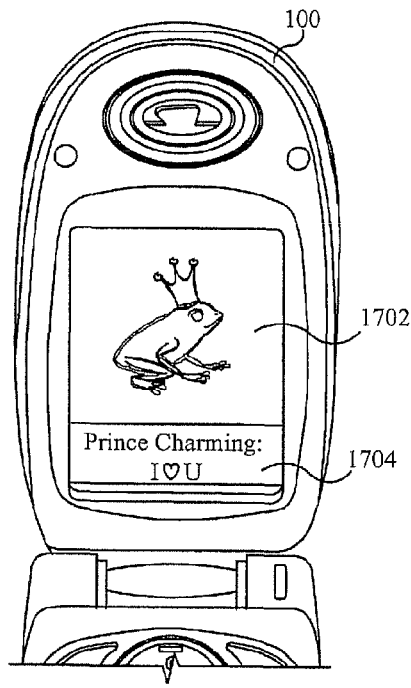
FIG. 17 is an exemplary advanced ID screen with metadata provided on a phone in accordance with the present invention.
Figure 16:
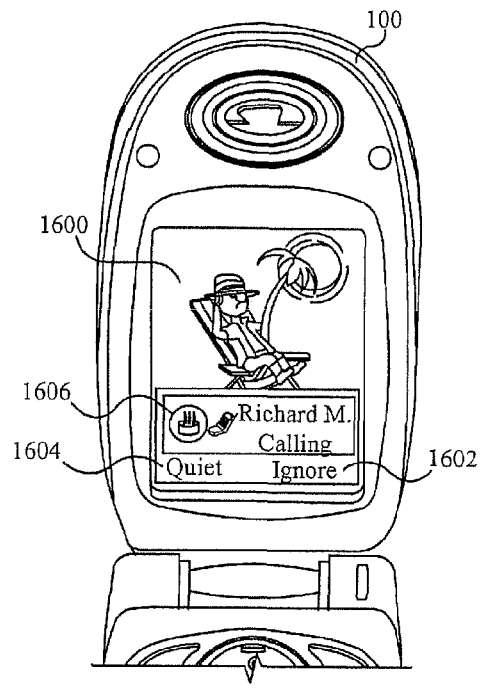
FIG. 16 is an exemplary advanced ID screen provided on a phone in accordance with the present invention.
Figure 18:
FIG. 18 is an exemplary advanced ID screen with control functions provided on a phone in accordance with the present invention.

FIGS. 16, 17, and 18 illustrate different aspects of an advanced caller ID function as displayed on a phone 100. Once subscriber information for other users is downloaded to phone 100, displays such as those set forth in FIGS. 16, 17, and 18 may appear.

FIG. 16 shows a first example of a subscriber display. When a calling subscriber "Richard" phones user's phone 100, a display 1600 of the calling subscriber's name and an image that Richard has provided is displayed on the phone 100. Even if the native display of the phone 100 includes only support for a thumbnail image (or an image that does not occupy the entire display area of the phone), the client application 140 can cause the OS services in the phone 100 to display a full screen image along with soft-key enabled function menus 1602, 1604. The display can include an icon 1606 indicating additional information of the calling subscriber. In this example, a birthday cake indicates it is Richard's birthday. As will be understood by those of average skill in the art, many phones include "soft-keys" which activate variable commands in a menu display in a phone. Selection of the soft-keys (generally directly under an interface screen) in the example of FIG. 16 provide ignore prompt 1602 and a quiet prompt 1604.

FIG. 17 shows a depiction of a movie display 1702 on the phone device 100 with a text message 1704 displayed underneath. It will be understood that the image in FIG. 17 is, for example, an AVI, MPEG, QuickTime, or other sample video image supported by the playback features of the phone 100.

FIG. 18 is another example of a display for "Richard" wherein additional meta data is provided. This information is depicted in a text message at the bottom portion 1802 of the screen, and includes location information as well as information indicating that today is Richard's birthday.

In a further embodiment, the subscriber display may be provided which incorporates data from sources other than the address book. If, for example, the user has populated a phone's native calendar with information concerning meetings with a contact, the client application 140 can extract this information and display, for example, the user's last or future meetings with the contact. Alternatively, this information can be extracted from a sync user account when a synchronization server is utilized as described herein.

Figure 19:
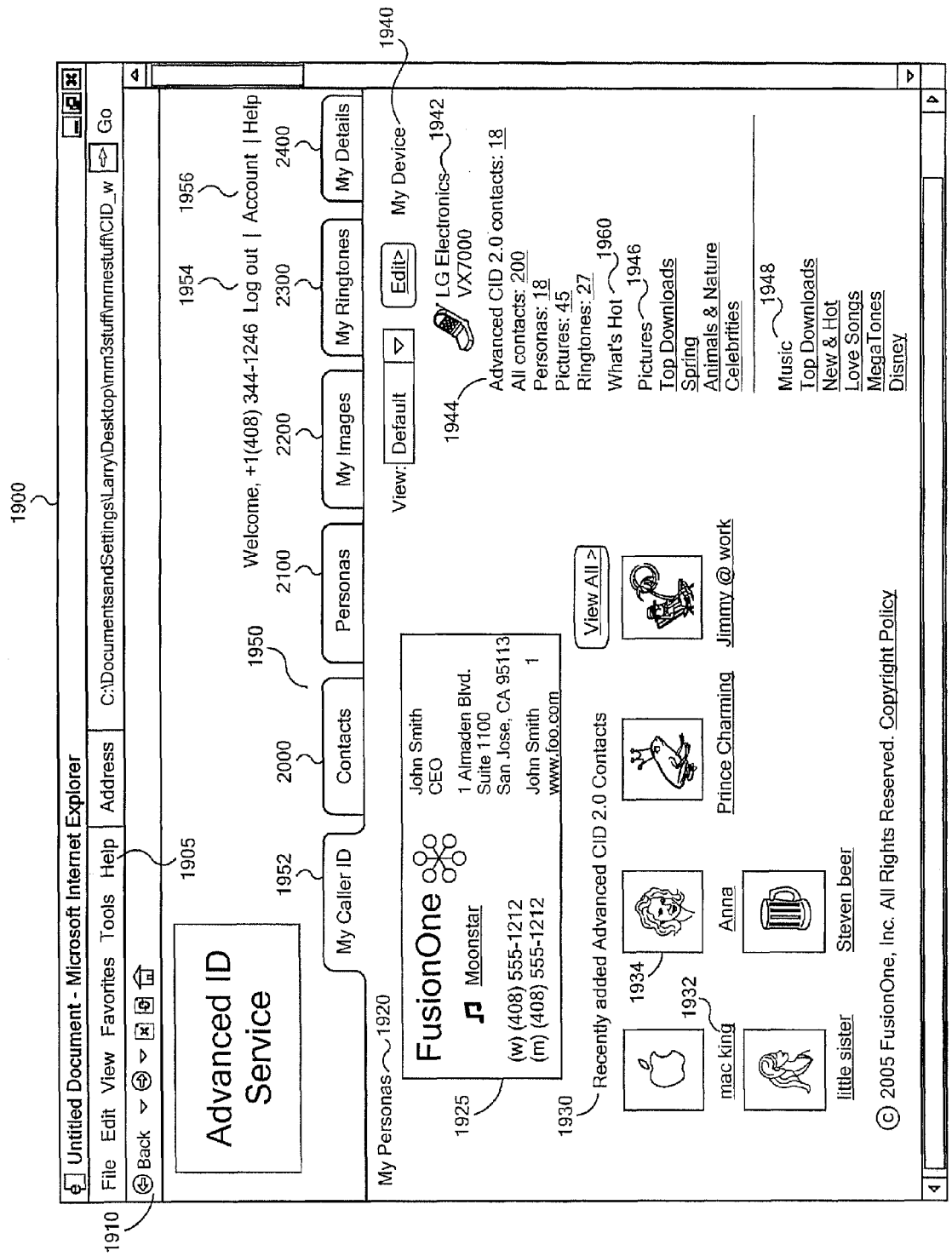
FIG. 19 is an exemplary user interface home screen for a user managing an advanced ID system in via a web browser in accordance with the present invention.

FIG. 19 is a depiction of a user interface 1900 which may be provided by the advanced ID service server 160 via web server 180 to the client device 190. A typical web browser 1910 includes a browser menu bar 1905 having a number of standard features well recognized to those of average skill in the art, including navigation features for the world wide web. User interface 1900 may be accessed via URL supplied by the web server 180. The user interface 1900 includes a menu bar 1950 having a My CallerID link 1952, a Contacts link 2000, a Personas link 2100, a My Images link 2200, a My Ringtones link 2300 and a My Details link 2400. The welcome screen includes a logout account link 1954 and a help link 1956 and displays a welcome message to a user based on the user's telephone number.

A window for My CallerID is divided into multiple sections. A My Device section 1940 displays the system's understanding of the user's current type of device at 1942, status information 1944 including the number of contacts the user has specified as direct link contacts "Advanced CID 2.0 contacts", the number of total contacts the user has, the number of personas the user has, the number of pictures the user has, and the number of ringtones the user has. An additional section labeled "What's hot" 1960 can be utilized by a value added reseller to display digital content such as pictures 1946 and music 1948 which allow the user to download this information from the value added service provider and provided to the user's account. A My Personas section 1920 includes a depiction of contact card 1925 for the user John Smith which includes the user's general information. A recently added advanced CID (ACID) contact section 1930 displays links to user's contacts as hyperlinks 1932 along with a graphic depiction 1934 associated with that contact. It will be understood that each of the terms on the page highlighted by underlining can provide a hyperlink to more detailed information about the links content.

Figure 20A:
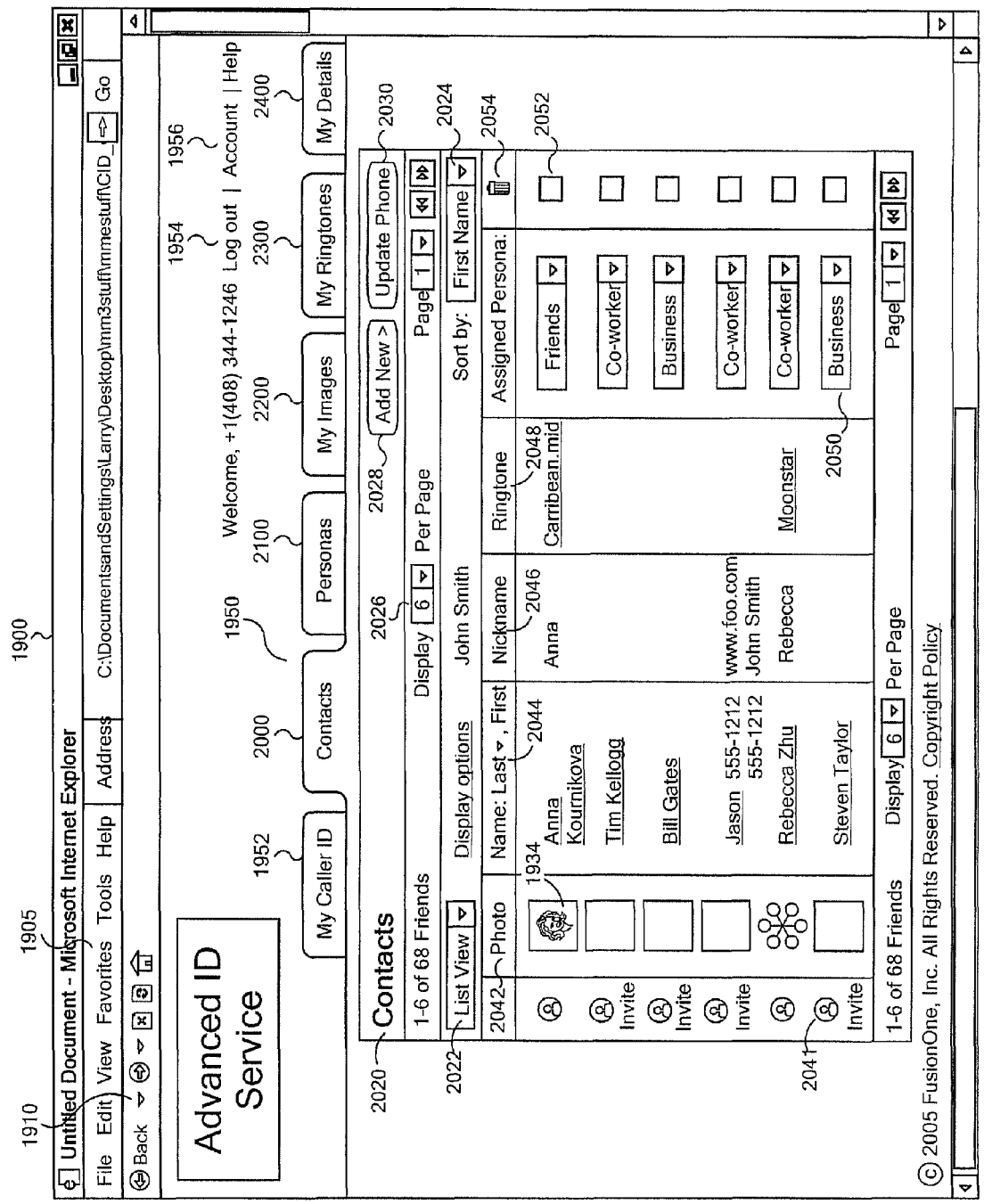
FIG. 20A is an exemplary user interface for managing contacts via a web browser provided by a server in accordance with the present invention.

Selection of the Contacts link 2000 on the menu bar 1950 gives rise to the user interface 1900 shown in FIG. 20A which allows the user to manage the user's contacts in the system of the present invention. The user interface 1900 includes a Contacts window 2020 which provides the user a number of options for listing and editing contacts. The user can choose from any of a number of different types of view via a drop down box 2022. The view shown in FIG. 20A is that of a list view for a series of contacts. Selection of a number of contacts via a drop down box 2026 allows that number of contacts to be displayed per page. Each contact includes a photo depiction in column 2042, a name display in column 2044, a nickname field in column 2046, a ringtone associated with that user in column 2048, an assigned persona which may be selected via drop down boxes in column 2050. Likewise, each user is associated with an invite link in column 2041 and a tick box in column 2052. The tick boxes allow the user to select one or more contacts for immediate deletion via selection of a delete icon 2054. Selection of one of the hyperlinks of a contact will cause the web server 180 to render an edit page allowing the user to edit information associated with that contact. The contacts are sorted in a particular manner via a drop down box 2024. The user can add a new contact via an add new button 2028 and update the phone via update phone button 2030.

The functionality associated with the user interface in FIG. 20A on the web browser 1910 can likewise be provided on a screen of a user phone. FIGS. 20B-20M depict the contact interface which is displayed on the user phone.

FIG. 20B shows an initial start-up screen 2060 displaying a "last successful synchronization" that the user has made as well as status information (all contacts, advanced CID contacts, personas, images and ringtones) such as that depicted in FIG. 20A. Options provided to the user at this point by soft-key menu items allow the user to initiate a sync at 2062, or select different options at 2064.

FIG. 20C shows a menu 2066 resulting from selection of the "options" soft-key 2064 in FIG. 20B. The menu 2066 allows the user to select a contacts link, a personas link, a sync now instruction link, or a settings link.

At FIG. 20D, if the user has selected the contacts link in FIG. 20C, a list of contacts 2068 is displayed. The user can use the soft-keys and any other input device on the phone to highlight a contact in the display for selection. Selection of a contact opens a record for that contact. Optionally an options soft-key 2070 is displayed depending on whether the contact is an advanced CID contact or not.

At FIG. 20E, the user may display an options menu 2072 for an advanced CID contact by selecting the options soft key 2070 in FIG. 20D. This options menu 2072 allows the user to open the contact, assign a persona to the contact, invite the contact into subscription with the system of the present invention, or disable advanced CID for that particular contact. Alternatively, FIG. 20F shows an options interface 2074 if a contact which has been selected in FIG. 20D is not an advanced CID contact. The only two options available for the user in FIG. 20F are to open the contact or invite the contact into subscription with the system.

If an advanced CID contact is opened (from FIG. 20E), the screen of FIG. 20G is displayed. The depiction of FIG. 20G shows that, for example, Anna K is a member of the co-workers persona, has a picture assigned entitled "Anna in NYC," is assigned the moonstar midi (moonstar.mid) ringtone, has a nickname "Anna" and has a work number and a home number associated with her contact information. Each of these items is selectable by moving a selection input on the phone and depressing an entry button. For example, pressing the Anna in NYC selection will result in the display shown in FIG. 20H wherein a graphic image associated with the contact is displayed. Selecting the moonstar midi ringtone will result in playing the ringtone in the depiction shown in FIG. 20I. Selecting the nickname will allow the user to change the nickname via an interface 20J displayed on the phone.

Selecting the assign persona (from FIG. 20E) brings up an assign persona menu as shown in FIG. 20K. The assign persona menu will display current personas which are associated with the user and allow the user to select one or more personas to assign the particular contact to. If the user selects, for example, the co-worker persona, a message such as that shown in FIG. 20L will be displayed indicating to the user that the co-worker persona has been assigned to Anna K.

Finally, if the user selects to disable advanced CID from the options interface shown in FIG. 20E, a warning message is displayed such as that shown in FIG. 20M.

Figure 21A:
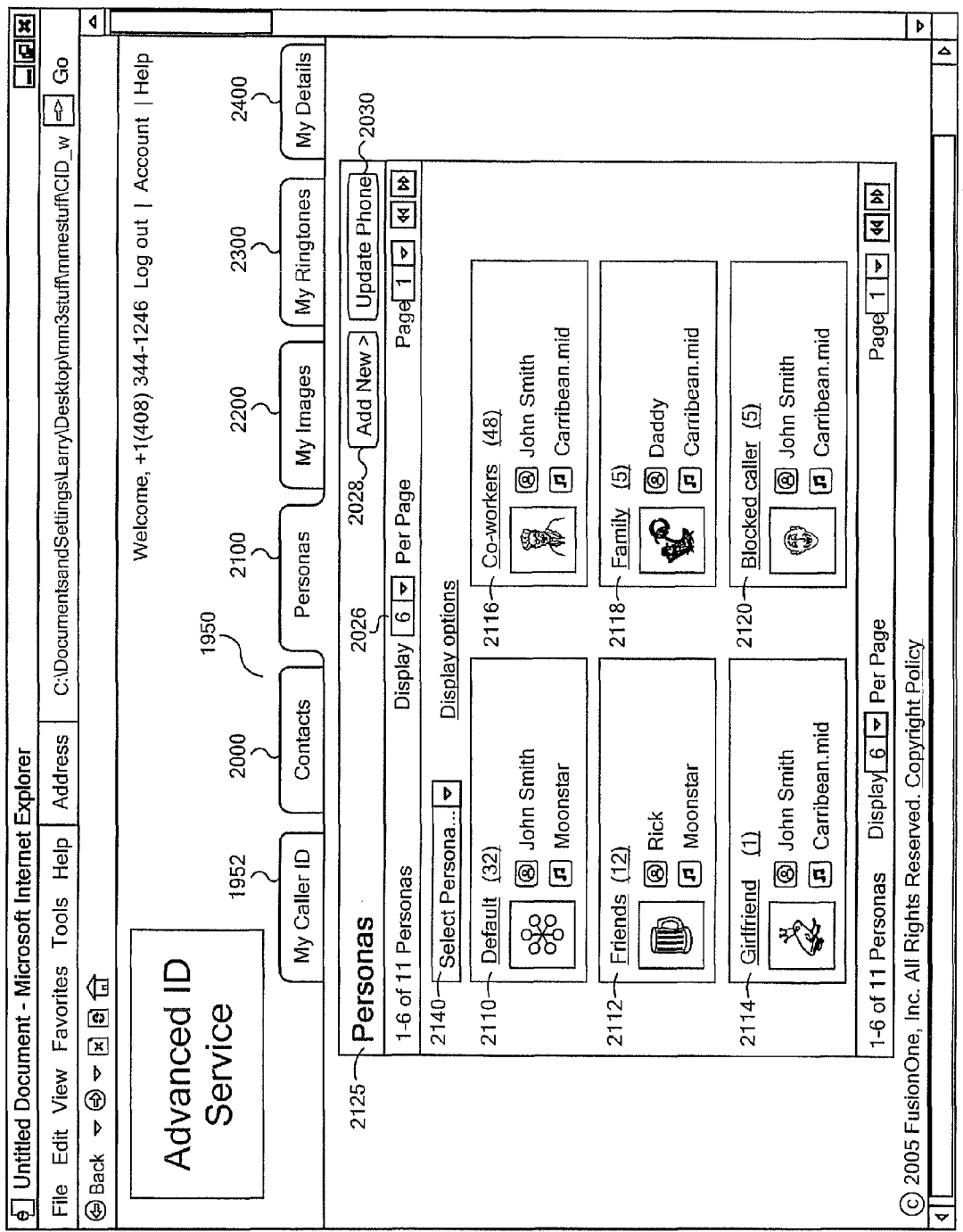
FIG. 21A is an exemplary user interface for managing personification information provided by a server on a web server in accordance with the present invention.

Pressing the "personas" menu item 2100 in menu bar 1950 displays a personas interface 2100 shown in FIG. 21A. As shown in FIG. 21A, the user interface 1900 includes a Personas window 2125 displaying a table of personas 2110, 2112, 2114, 2116, 2118, and 2120 which provides the user with a short display of name of the persona, the number of users to whom the persona is assigned in parentheses, and an image the user is displaying in the persona to others, the name the user is displaying to others and the ringtone the user is displaying to others. It should be recognized that components of the interface include additional components of the persona, or less components of the persona depending on the real estate available on the user interface on the web page. The user can choose a particular persona to display via a pull down box 2140.

FIGS. 21B-21N illustrate the same functionality provided in the Personas window 2130 on the user phone.

FIG. 21B shows a personas menu 2130 which includes links to each of the defined personas for the user. In FIG. 21B, these are default, friends, co-worker, family, girlfriend, and blocked caller. Selection of the options soft-key 2135 gives rise to a menu shown in FIG. 21C allowing the user to open, create a new persona, edit a current persona, or delete a current persona. If a user selects to open 2180 a persona such as the default persona, the display shown in FIG. 21D is shown. The display in FIG. 21D shows that for a given "default" persona, the name of the persona is displayed, the associated image "F1 logo" is displayed, the ringtone "moonstar.mid" is displayed, the nickname associated with the persona is displayed and a work number and home number associated with the persona is displayed. Selection of the persona name by navigating to the name and selecting using a phone input selection mechanism results in the display shown in FIG. 21E, offering the user soft-keys "ok" 2155 and "assigned" 2150. Selection of the assigned soft-key 2150 results in the display shown in FIG. 21F, showing the users which have been assigned to this particular persona by the user.

Currently returning to FIG. 21C, selection of the "new" menu item 2145 results in a template shown in FIG. 21G. All the items in the template are blank, allowing the user to add via the add soft key 2160. The only menu entry which is pre-populated is the user's phone number as shown in FIG. 21G. Depressing the add soft key 2160 in FIG. 21G results in the display in FIG. 21H, allowing the user to enter via the phone's text entry method the name of the persona. FIG. 21I shows a menu by selecting the "multitap" soft key 2165. The menu in FIG. 21I allows the user to choose from several input methods for text such as multitap, numbers, T9 word entry, or symbols. Once the name has been specified in FIG. 21H, the display of FIG. 21J illustrating the name of the persona is displayed. FIG. 21K results when the user has selected the add soft-key 2170 in FIG. 21J. FIG. 21K displays those graphical or image entries which are "on the phone" and allows the user to select one of the displayed entries. If the user selects the "bird" entry 2175 the image that's displayed is shown in FIG. 21L. Likewise, FIG. 21M displays a list of ringtones available for the user. FIG. 21N displays a user's availability to delete a persona, when delete is selected in FIG. 21C.

Figure 22:
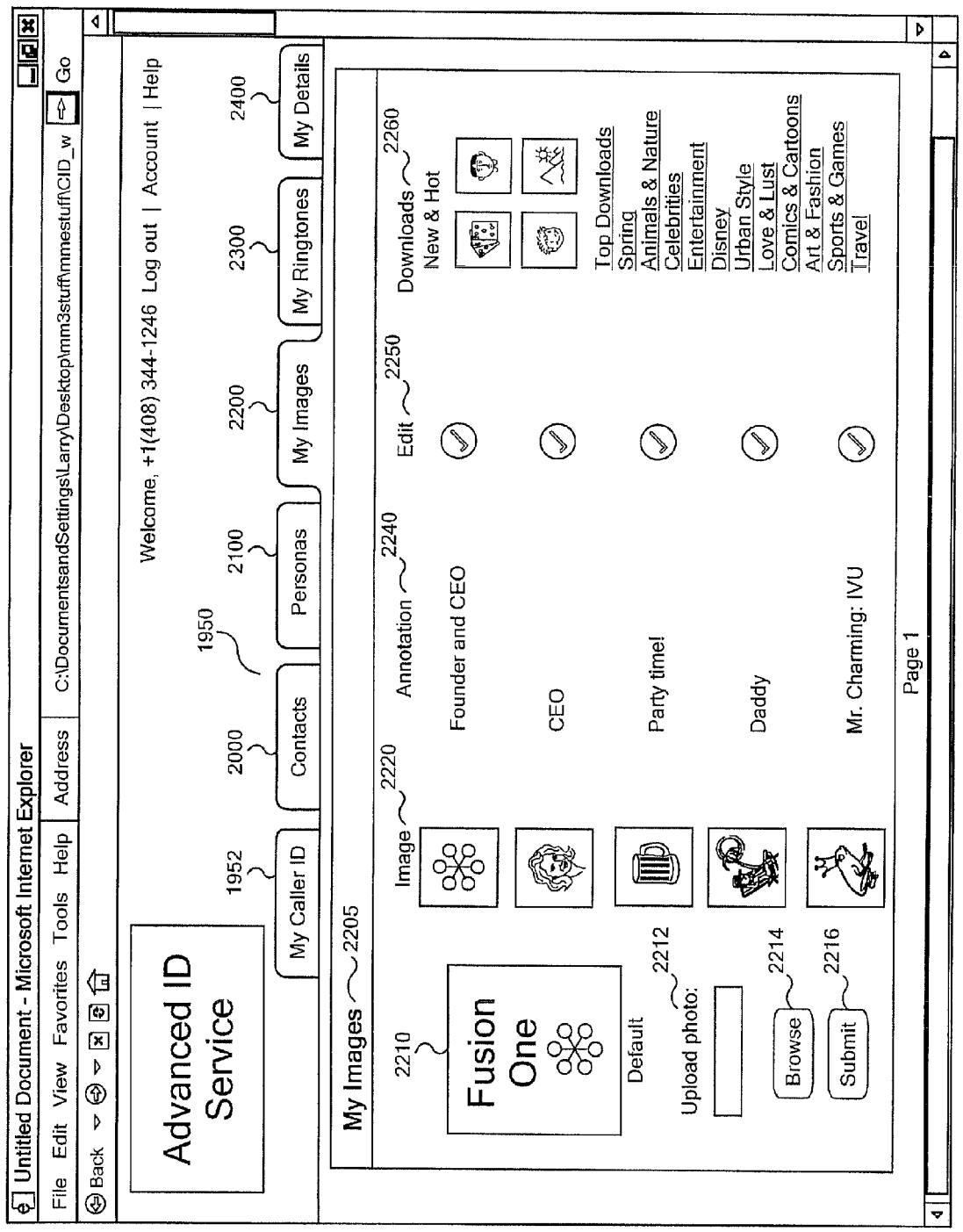
FIG. 22 is an exemplary user interface screen provided on a server allowing a user to manage images in accordance with the system of the present invention.

FIG. 22 illustrates a user interface 1900 displayed in the web browser allowing the user to manage images in accordance with the present invention. The user interface 1900 includes a My Images window 2205. Images available to the user are displayed in a column 2220, along with an associated nickname in column 2240, and an edit function hyperlink in column 2250. A default image for the user 2210 is displayed such that should the user create personas, the default image will be used. An upload interface 2212 including a browse selection button 2214 and a submit button 2216 are provided allowing the user to upload various images to their account. A premium downloads section 2660 offers the user links to value added service provider content to be downloaded and utilized by the user in accordance with the terms of the value added service provider.

Figure 23:
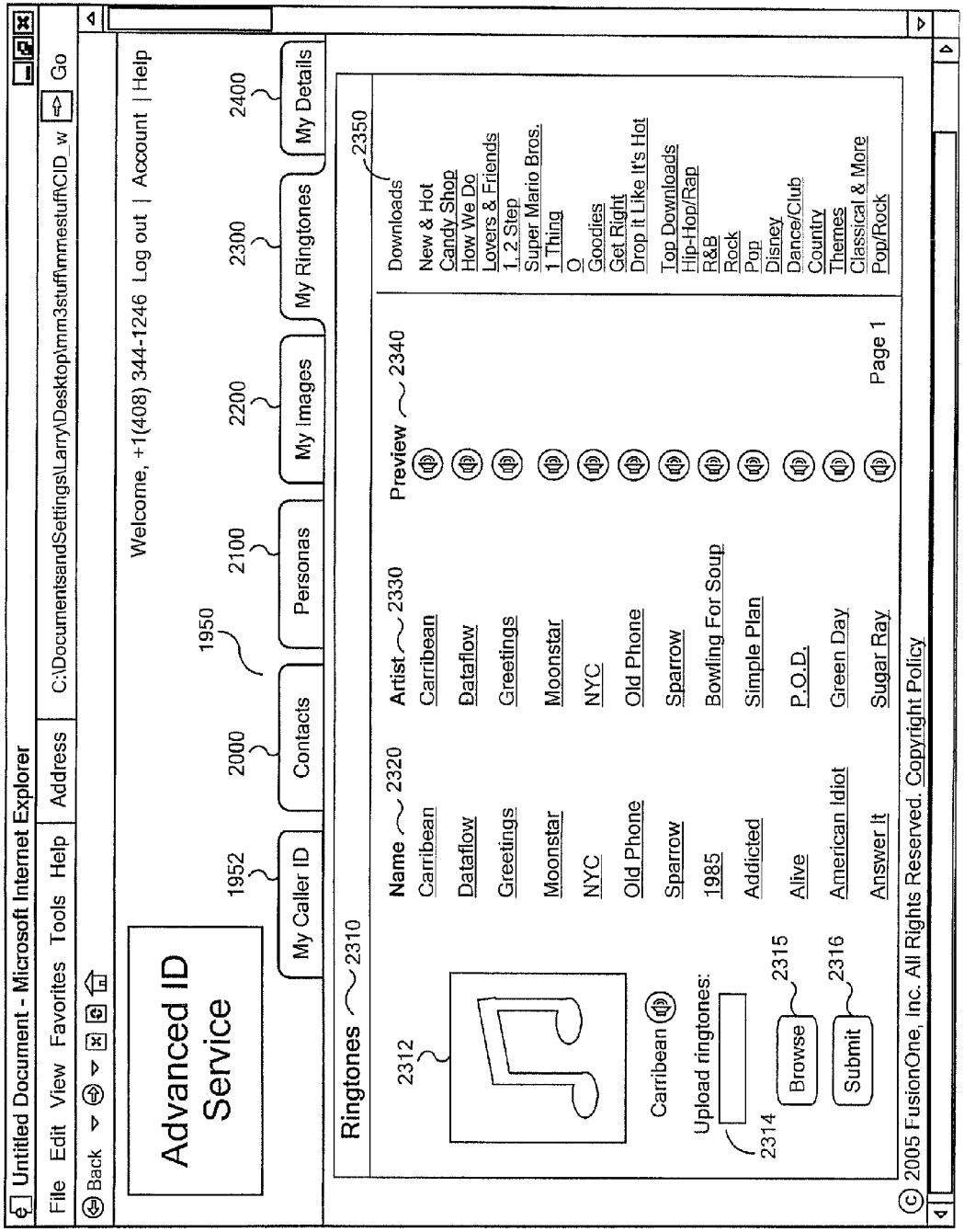
FIG. 23 is an exemplary user interface provided by a server in a web browser allowing a user to manage multimedia in accordance with the system of the present invention.

FIG. 23 illustrates a user interface 1900 displayed in the web browser allowing the user to manage ringtones in accordance with the present invention. A My Ringtones window 2310 includes a list of ringtones 2320 which have been uploaded or are available to the user via their account. The name of the ringtone is displayed in column 2320, the artist in column 2330 and a preview in hyperlink 2340. Likewise, default ringtone for the user is displayed at 2312. Again, a value added download section 2350 can be provided to allow a digital content provider to provide value-added content downloadable by the user via this interface. An upload interface 2314 including a browse button 2315 and submit button 2316 allow a user to add to the ringtone selections for his account In a well known manner.

Figure 24:
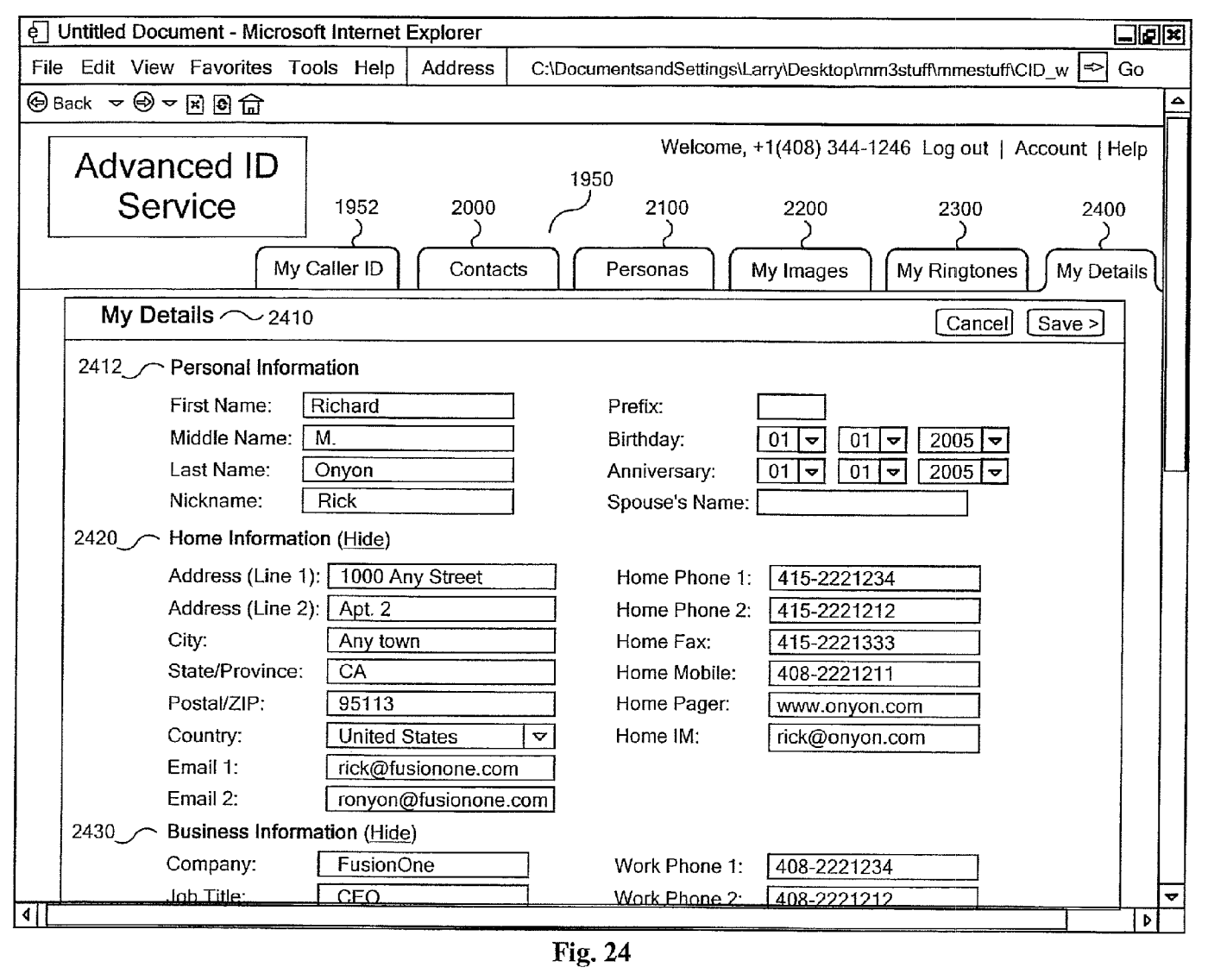

FIG. 24 illustrates a My Details window 2410 upon selection of My Details link 2400 in the menu bar 1950 of FIG. 24. The My Details window 2410 allows the user to manage information associated with the user's account. A personal information section 2412 allows the user to input and change the user's first, middle and last name, as well as the user's nickname and detailed personal information, such as their birthday, anniversary and spouse's name. A home information section 2420 and business information section 2430 allow the user to specify a number of contact points and contact numbers for the user which are then used to allow the user to create personas in accordance with the foregoing description.

Figure 25:
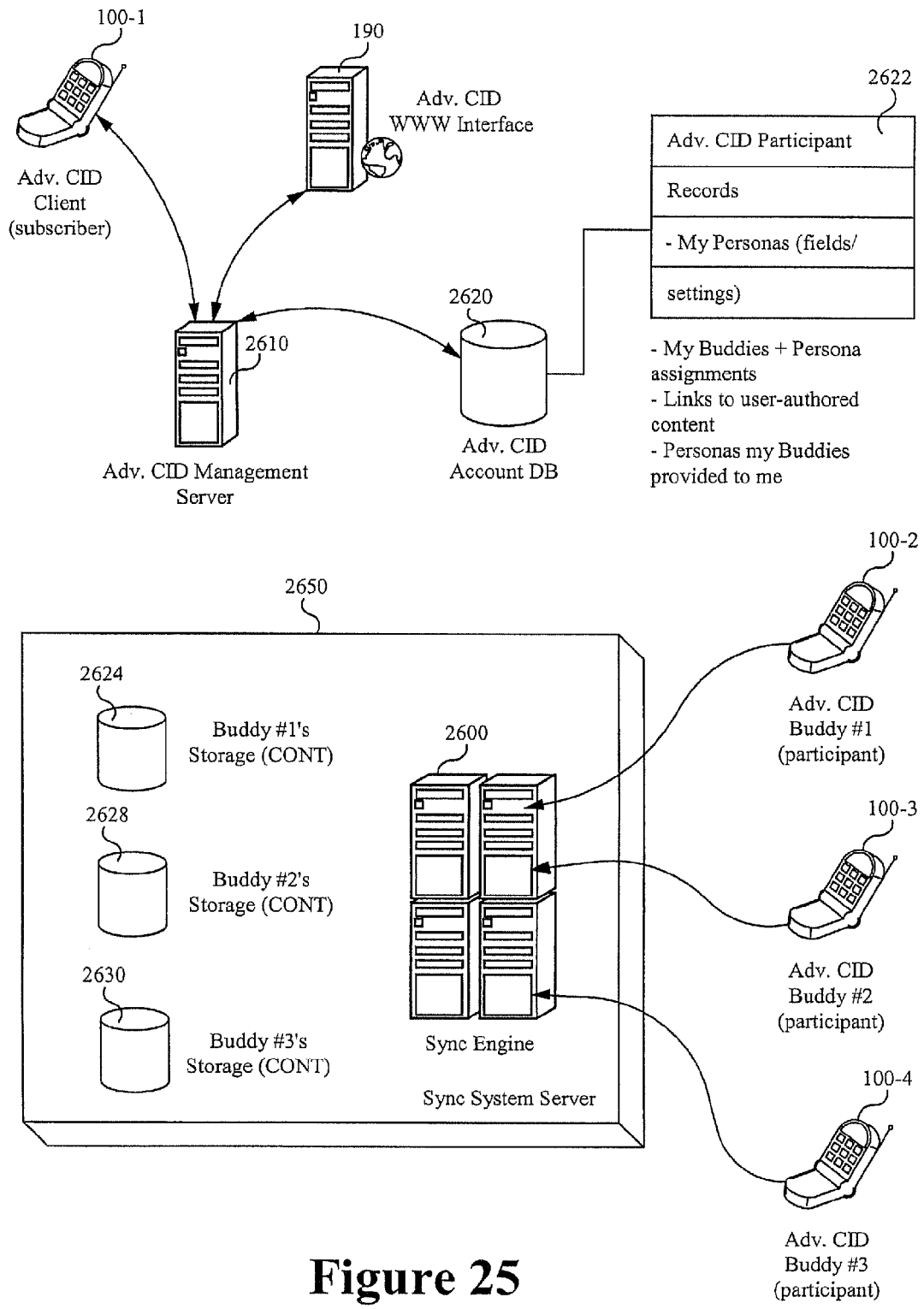
FIG. 25 is an alternative client server configuration utilizing the synchronization system disclosed in U.S. Pat. No. 6,671,757 to implement the system of the present invention.

As noted above, when the system is implemented in accordance with a synchronization system as shown and described with respect to U.S. Pat. Nos. 6,671,757, 6,694,336 or 6,757,696, additional elements other than those shown in FIG. 3 may be present. FIG. 25 is a block diagram illustrating how the integration between a number of users and the synchronization server system 2650 implemented in accordance with U.S. Pat. Nos. 6,671,757, 6,694,336 or 6,757,696 as used in to the present invention. An advanced CID management server 2610 may comprise the advanced ID service server 160 or a sub-set of the elements of the advanced ID service server 160, but including at least the server-side application 175 and the user info store 106 to an advanced CID account database 2620 containing subscriber records 2622. A sync engine 2600 within the synchronization server system 2650 is provided with sync account records 2624, 2628, 2630 for a number of buddies 100-2, 100-3, and 100-4 of a subscriber 100-1. Synch server system 2650 communicates the synchronization mechanism disclosed in U.S. Pat. Nos. 6,671,757, 6,694,336 or 6,757,696 with buddy users 100-2, 100-3, and 100-4. Rather than directly communicating changes via a download and upload of data, the transaction data packages as disclosed in U.S. Pat. Nos. 6,671,757, 6,694,336 or 6,757,696 communicate persona information by distributing changed logs to the buddy users 100-2-100-4. The user communicates with the advanced CID management server 2610 via the phone user interface 120 or web interfaces on a client device 190 as previously described.

Figure 26:
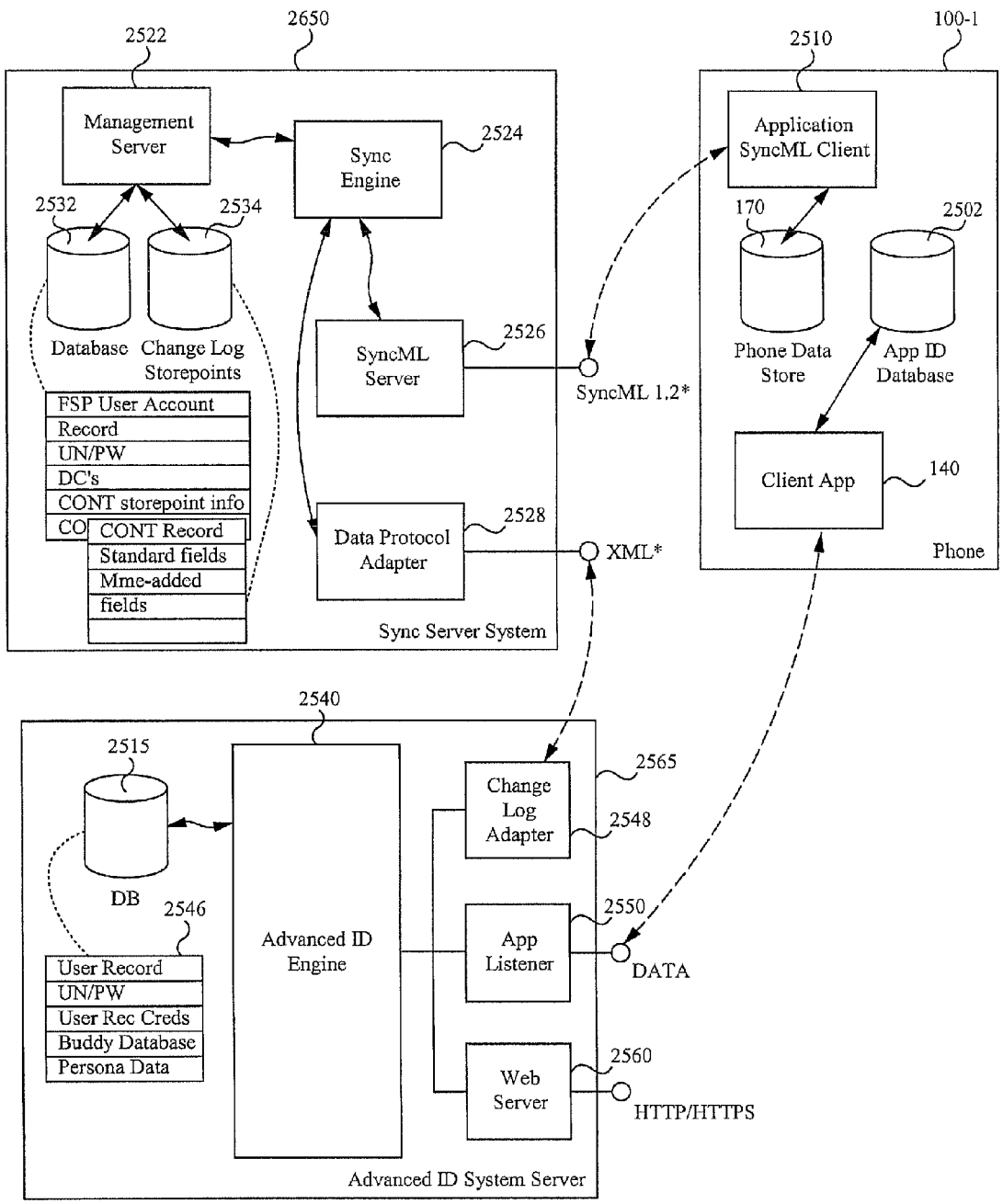
FIG. 26 is a depiction of the system of FIG. 25 integrated with multiple participants and subscribers in accordance with the system of the present invention.

FIG. 26 is a block diagram depicting a more detailed alternative configuration of a sync server system, advanced ID system server and client system for implementing the present invention. In FIG. 26, the sync server system 2650 is depicted as a stand-alone device communicating with a client such as a phone 100-1. In FIG. 26, the phone 100-1 is depicted as including a client application 140 as well as synchronization client 2510, such as that described with respect to U.S. Pat. No. 6,671,757. An advanced ID system server 2565 includes a database 2515 having user content records 2546, which include personas stored for subscribers as previously described. The advanced ID system server 2565 also includes a web server 2560 providing the web based interface screens disclosed in the foregoing figures. An application listener engine 2550 communicates with the client application 140 to allow the user to input changes directly to the advanced ID system server 2565. A change log adapter engine 2548 allows communication of changes to and from the synchronization server system 2650. The synchronization server system 2650 communicates with the synchronization client 2510 via a SyncML server 2526 and with the advanced ID system server 2565 via a data protocol adapter 2528. A management server 2522 as described in U.S. Pat. No. 6,671,757 communicates with a synchronization engine 2524 to control synchronization data packages stored in a database 2532. The system allows the user's information to be stored across any number of multiple devices, and allows users having accounts with the synchronization server system 2650 to have their information incorporated into the subscriber's advanced contact ID system. Each user account with the advanced contact ID service in the present invention requires the creation of corresponding synchronization account of the user. The synchronization account is used to synchronize the user's contents between the device 100-1 and the advanced ID system server 2565. The advanced ID system server 2565 modifies the appropriate contact in the user's persona and information.

The personal records may be represented in the synchronization server system's content records by a specially added contact record field. When a change log describing a persona arrives at the application listener engine 2550, the advanced ID engine 2540 collects the affected buddies, finds the corresponding synchronization server record 2546, and provides the contact modified transaction change log containing the new persona information back to the change log store points 2534 within the synchronization server system 2650. The synchronization server system 2650 adds these modified transactions in accordance with the description of U.S. Pat. Nos. 6,671,757, 6,694,336 or 6,757,696 to the directly linked buddies' synchronization accounts. On such buddies' next synch, each party retrieves the updated contact record representing the persona that the user has assigned it to. Once the synchronization server system 2650 contacts the advanced ID system server 2565, the advanced ID system server 2565 tracks which persona a given buddy is assigned to by adding a field to the contact record. Device 100-1 incorporates the synchronization client 2510 which syncs with the device's address book with change logs provided by the change log store points 2534 in the synchronization server system 2650. Both the native phone data store 170 and the application ID database 2502 may be used to store records for the advanced contact ID system in accordance with the present invention.

Figure 27:
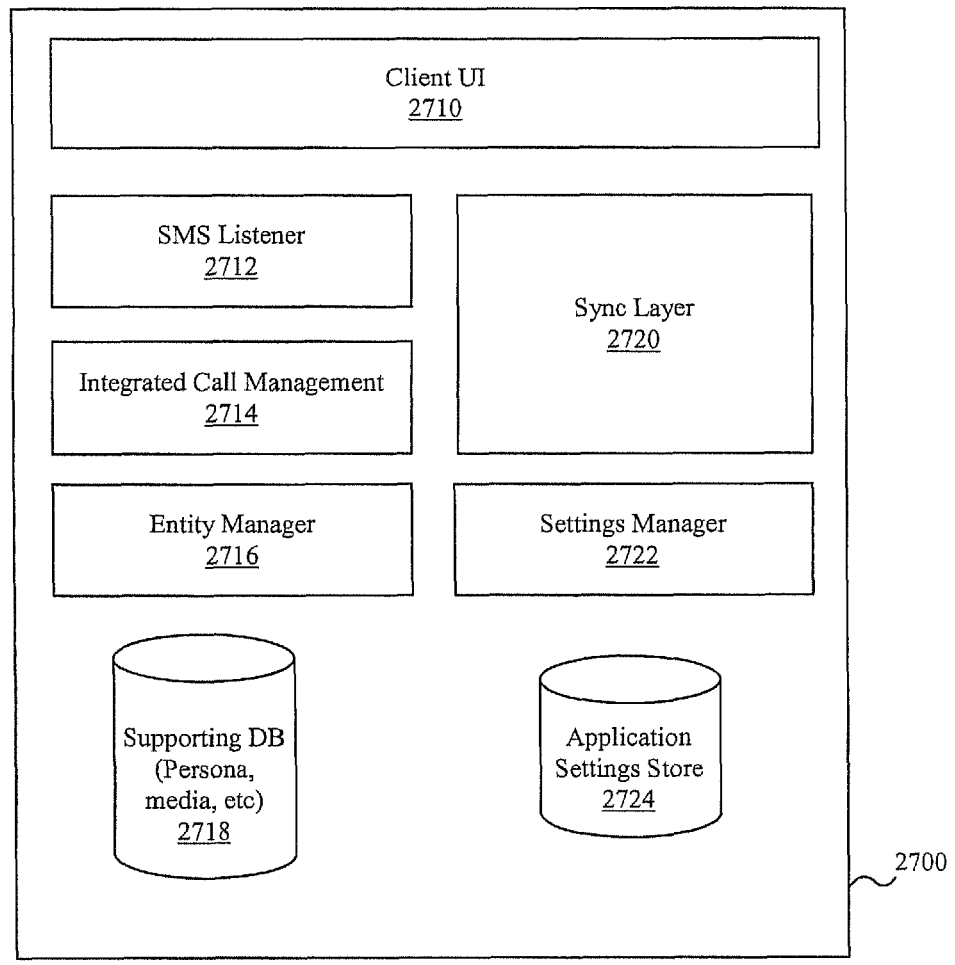
FIG. 27 is an exemplary client application structure suitable for use in accordance with the present invention.

FIG. 27 depicts a client side application including a number of subsystems. A client application 2700 includes user interface 2710, an SMS listener 2712, integrated call management 2714, an entity manager 2716, a supporting database 2718, a synchronization layer 2720, if utilized with the technology of U.S. Pat. No. 6,671,757, a settings manager 2722, and an application settings data store 2724. Client application 2700 includes the user interface 2710 which displays the interface screens of the present invention as previously described. In various configurations, portions of the phone's native address book 3150 and supporting database 2718 store advanced contact ID information on the device. As noted above, when a subscriber contacts phone 100-1, the client application 2700 accepts the inbound call and depending on the robustness of the supported device and displays a custom user interface, including for example, a full screen image overlay with meta data, or a video clip. The integrated call management 2714 allows the user a variety of options to dispense with the call, such as answering, sending it to voice mail, or blocking the call to automatically populate the address book with the caller's public information. The entity manager 2716 maintains persona and buddy information on the client itself, as discussed below. The Sync layer 2720 supports synchronization with a sync server such as that described in U.S. Pat. No. 6,671,757. The settings manager 2722 maintains the user's preferences with respect to the application (such as application defaults and when the user may not want to be disturbed), which are stored in application settings store 2724. The client application 2700 also receives short messages via the SMS listener 2712.

Figure 28:
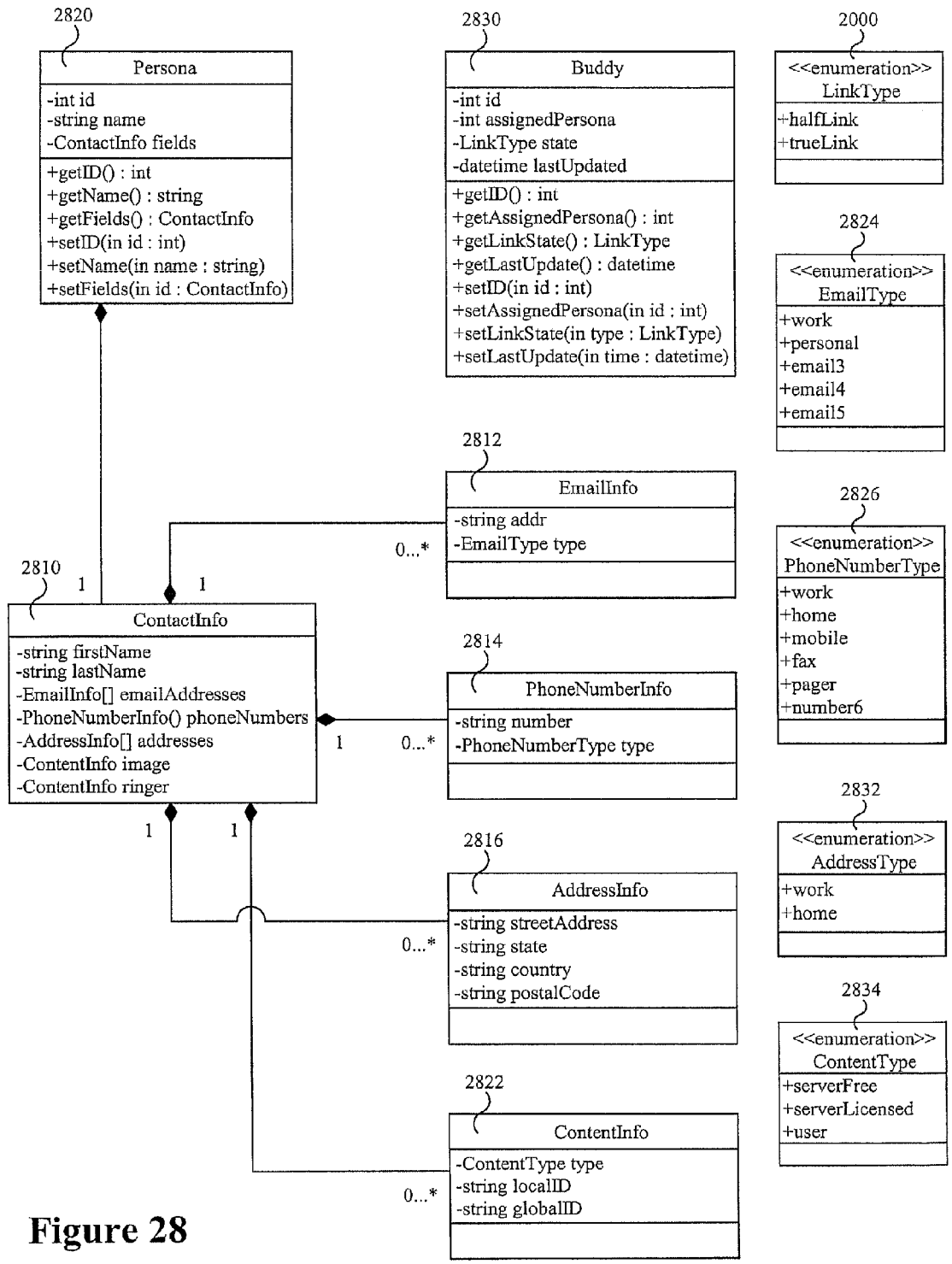
FIG. 28 is a static structure illustrating the information contained in a client-side database in accordance with the present invention.

FIG. 28 is a static illustration of the fundamental client objects utilized in the supporting database 2718 alone or in conjunction with a native database. As shown in FIG. 28, for each instance of content information 2810 for a user, the instance may include email information 2812, phone number information 2814, address information 2816 and other content information 2822 such as a local ID and global ID. Each contact instance 2810 is associated with a persona 2820 and each persona identified by an identifier associated with the user. Buddy records 2830 include a buddy identifier, an assigned persona, what type of buddy they are (link type 2000) and a field indicating when the buddy information was last updated. Likewise, the e-mail information includes e-mail type enumeration 2824, phone number information 2814 includes phone number enumerations 2826, address information 2816 includes address enumerations 2832 (for work or home addresses), and content information 2822 includes for digital content, whether it is free or licensed information 2834.

FIG. 29 is a depiction of the entity manager 2716 shown in FIG. 27. Personas and buddies are collectively referred to as entities and are handled by the entity manager 2900. As noted above, very few available devices support sufficiently robust address book data required for the implementation of the system in the present invention. To support the new data types required for this system, extended supporting database 2718 depicted in FIG. 27 may be required. Entity manager 2900 controls the use of these two data stores. Due to the peculiarities at the particular platform in question, entity manager 2900 creates a serialized a buddy record 2930 and persona record 2920 and uses the system address book 2940 and the supporting database 2718. The user interface 2910 and business logic 2912 use the entity manager 2900. Entity manager 2900 gathers the serialization code in a central place and allows expansion of the data set to include additional fields.

Figure 30:
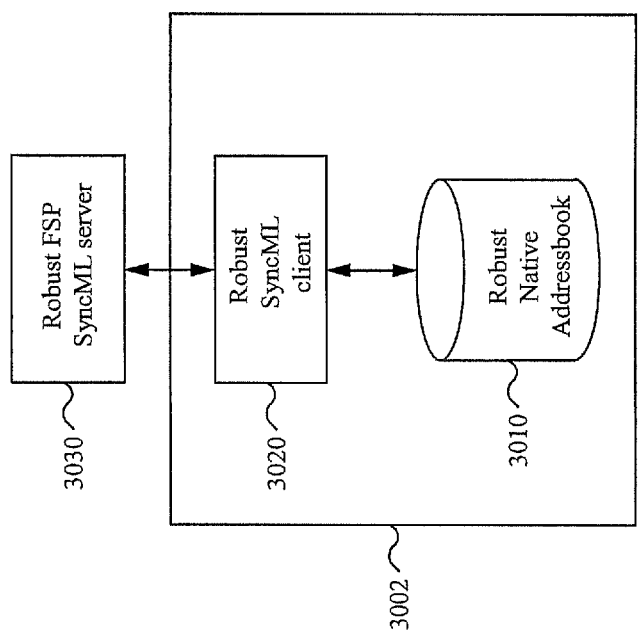
FIG. 30 is an exemplary alternative configuration of a client application in accordance with the present invention.

FIGS. 30, 31, 32, 33, and 34 illustrate alternative configurations for the client application shown in FIG. 27. An optimal configuration 3002 is shown in FIG. 30 wherein a native robust address book 3010, a robust SyncML client 3020, and a robust synchronization server 3030 are provided. In this configuration, there may be very little for the client application 3002 to do, other than managing multimedia content presented to the user interface. Most of the management and push of persona information occurs on the robust synchronization server 3030.

Figure 31:
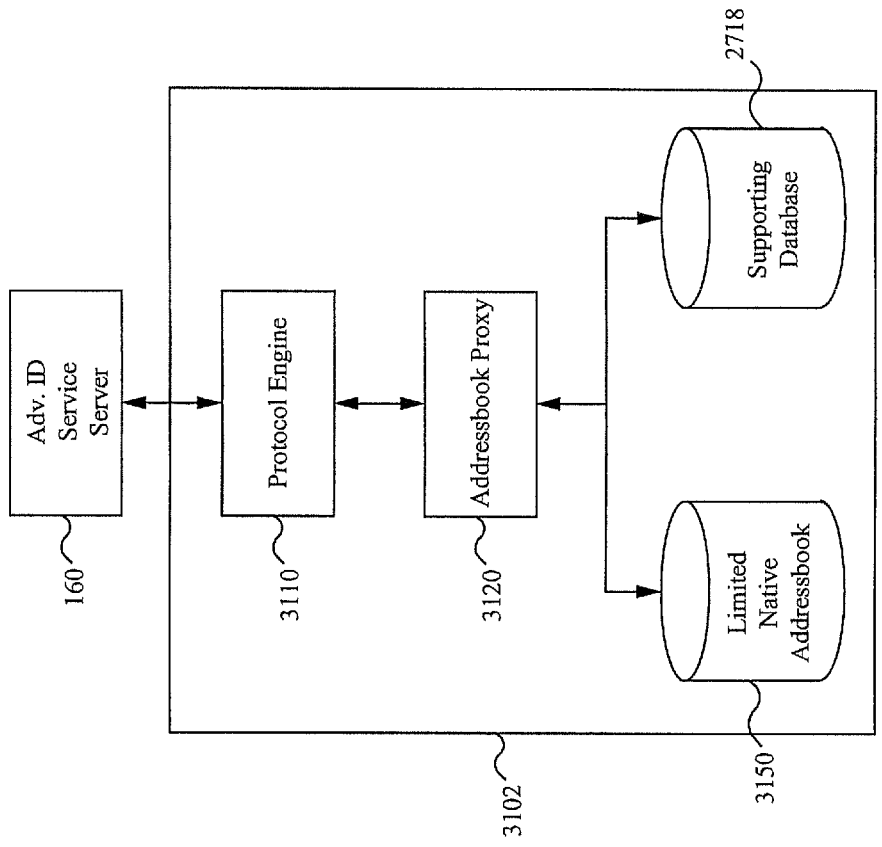
FIG. 31 is another alternative client configuration in accordance with the present invention.

Since most current clients do not include native robust address books and SyncML clients, FIG. 31 presents an alternative configuration allowing a client application 3102 to communicate with an advanced ID service server 160. The advanced ID service server 160 communicates with client application 3102 via a shared communications protocol as shown in FIG. 31. Client application 3102 includes a protocol engine 3110 and an address book proxy 3120 and utilizes both the limited native address book 3150 and supporting database 2718. The address book proxy 3120 (such as entity manager 2900 or some other form of proxy mechanism) manages communications and storage of information between the respective stores 2718 and 3150.

Figure 32:
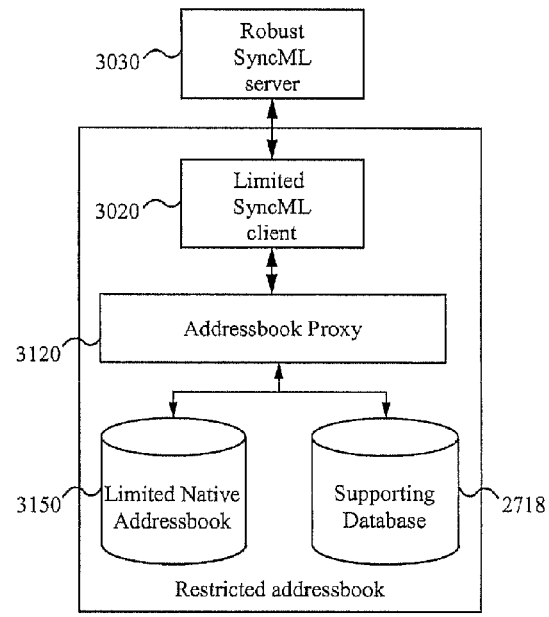
FIG. 32 is yet another alternative client configuration in accordance with the present invention.

Yet another alternative configuration is shown in FIG. 32. In FIG. 32, the robust SyncML server 3030 communicates with the robust SyncML client 3020, but utilizes the address book proxy 3120 to split information between the supporting database 2718 and address book 3150.

Figure 33:
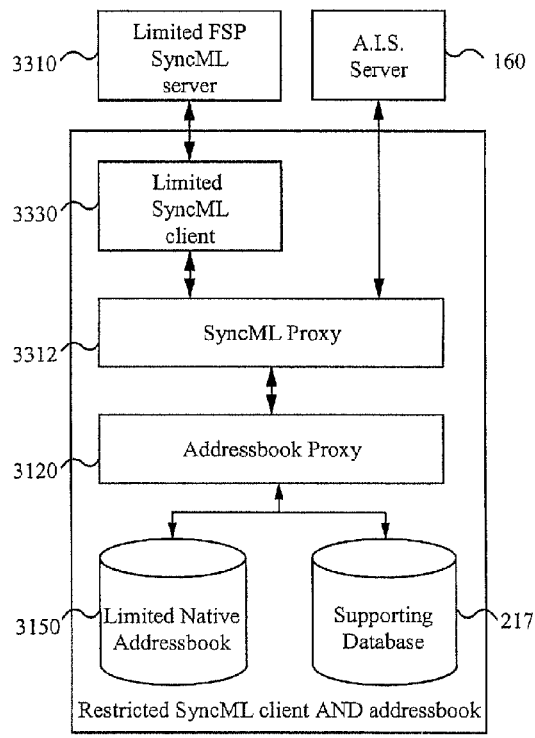
FIG. 33 is yet another alternative client configuration in accordance with the present invention.

In FIG. 33, a limited SyncML server 3310 provides support for some synchronization information required for the persona, but not all the necessary information required. Likewise the phone's limited SyncML client 3330 may only support limited synchronization or field support. For example, the advanced ID service server 160 may support address and phone number synchronization but not downloading of movies and ringtones. In this embodiment, the limited SyncML server 3310 cooperates with the advanced ID service server 160 to communicate certain information via a limited SyncML client 3330, while other information is communicated directly to phone's SyncML proxy 3312. Multimedia information can be provided via the support applications 3310 and 3330, while more basic information is provided to proxy 3312. An address book proxy 3120 splits information between the database 2718 and address book 3150.

Figure 34:
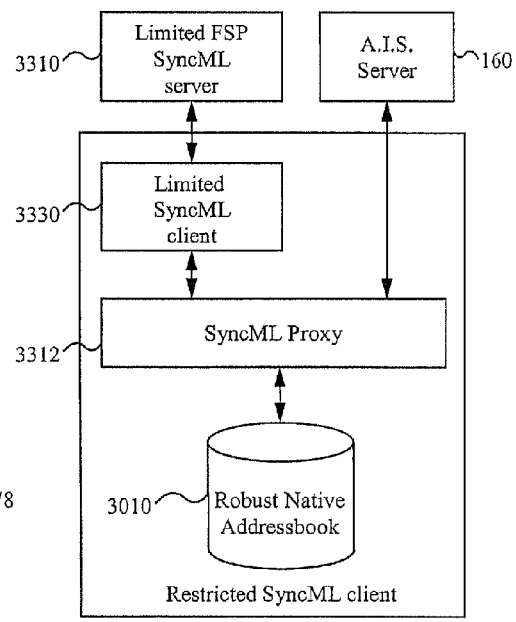
FIG. 34 is yet another alternative client configuration in accordance with the present invention.

In FIG. 34, the client is equivalent to FIG. 33 except that information is stored in the robust native address book 3010.

Figure 35:
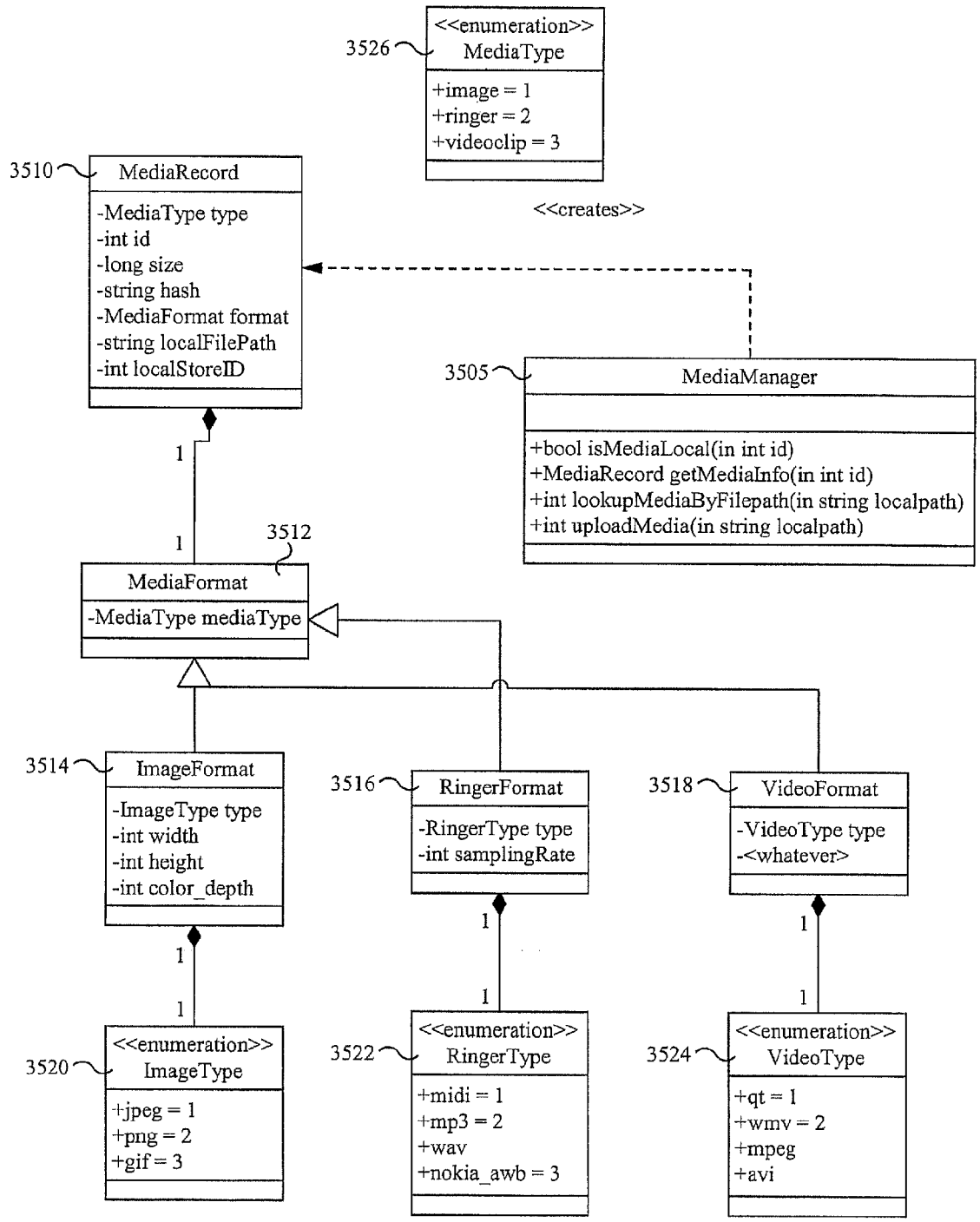
FIG. 35 is a structure illustrating the functions of the client side media manager in accordance with the present invention.

FIG. 35 illustrates a Media manager 3505 and the records associated with a piece of media information. The system supports digital rights media management. The MediaManger object provides an interface to the other client components which allows media uploading, media downloading, and retrieval of media information. Since each device has different capabilities, transcoding media objects from their original format is often required in order to support them on different devices. Transcoding refers to a process by which media in one format on one type of device or phone can be made available to other types of phones. For example, if a first user's phone creates pictures in JPEG format, but a receiving user's phone only supports GIF, the system server can automatically convert the format of the image based on the server's knowledge of the receiving user's phone. This same process may be used to change the resolution of an image to fit properly on the target device's display, given its characteristics.

Transcoding can involve an actual conversion or may involve simply selecting an alternative version of the media it already knows about. For example, a value added service provider may supply ringtones in two or more formats, and selection of the appropriate format can be made and distributed to the receiving user. When requesting media requires the media object, the transcoding will be performed by the server; the transcoded media will be transmitted to the device automatically. Clients may query information related to the media they are about to download using a function supplied in the communications protocol. This function will return relevant information concerning the transcoded media available to the client. The server may also provide transcode-on-demand support for clients which need multiple formats of the same media (e.g., image) in different sizes (e.g., a thumbnail for the contact in the address book and a full screen picture).

FIG. 35 illustrates the digital rights media record format utilized in the client application and present invention. Media manager 3505 determines whether or not the information in any media utilized in the device, whether a jpeg, mp3 movie, or the like, is a locally implemented piece of media or media from a value added provider. The media manager maintains records of the media location, whether it is downloadable or up-loadable and the like.

The system supports digital rights management contained in the native applications, allowing value added providers to check any media uploaded or downloaded to or from the server or client device to determine whether the information contained therein is subject to digitalized management. The media record 3510 which contains a media record type 3526 (local or not), identifier, size, hash value, a formula identifier, and a location. The media format 3512 can be any of an image format 3514, a ringer format 3516, a video format 3518. The image format type includes jpegs, pngs and gifs, as indicated at 3520. The ringtone format can be a midi-type, an mp3, a way or a special awb format, as indicated at 3522. The video format can be an mpeg, wmv file, quicktime, or an avi, as indicated at 3524. Additional formats for images, ringers, and videoclips may be easily added without requiring significant system modification.

An embodiment includes a Graphical User Interface (GUI) of a living address book which incorporates and utilizes many of the features described above.

Figure 36:
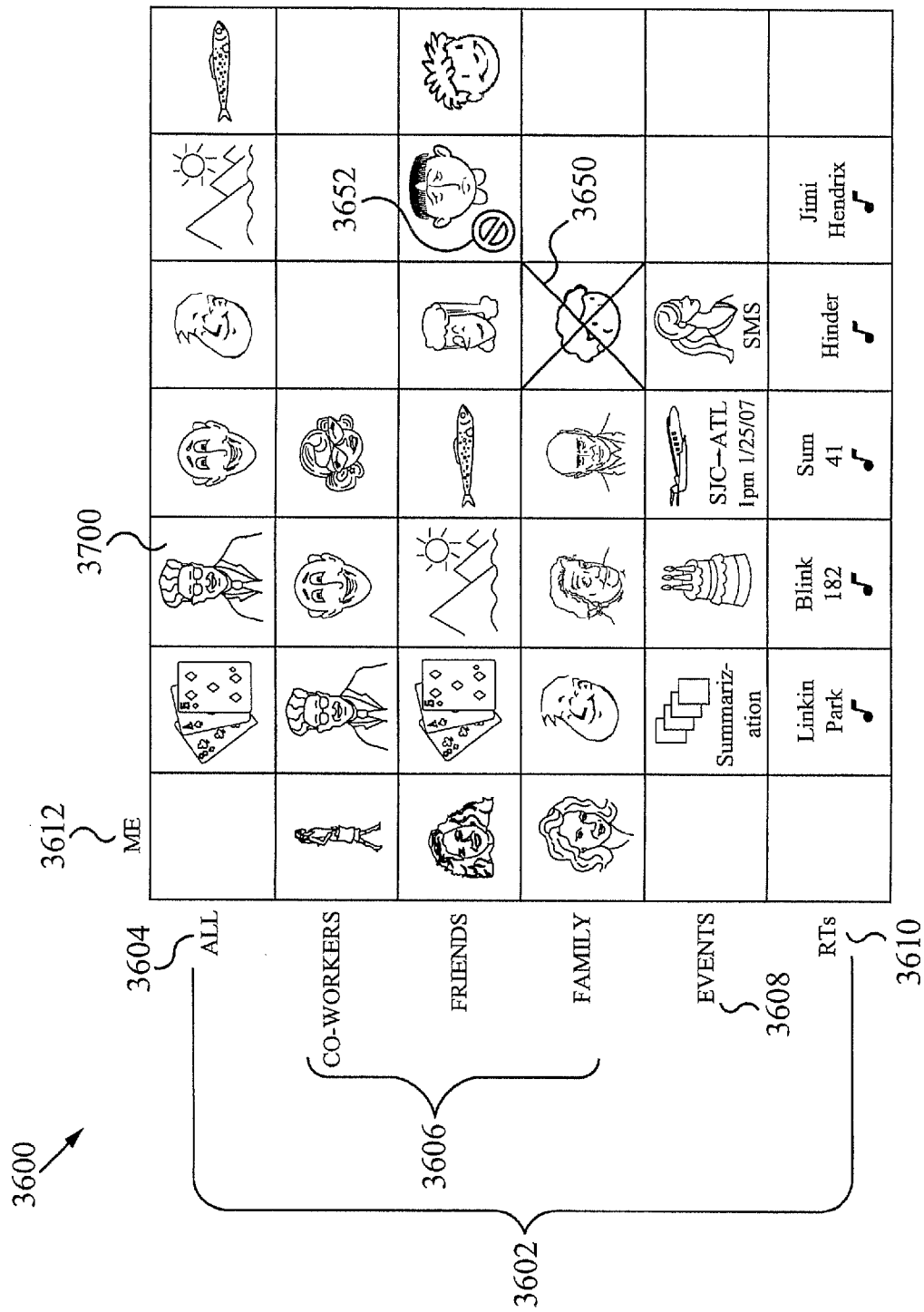
FIG. 36 illustrates a Graphical User Interface (GUI) of a living address book in accordance with the system of the present invention.

FIG. 36 illustrates a Graphical User Interface (GUI) 3600 of a living address book in accordance with the system of the present invention. Preferably, the living address book is used instead of a standard address book of a device. Preferably, the GUI 3600 is configured in a grid format which contains sections 3700 configured in columns and rows. Preferably, the rows are configured as groups 3602, although in some embodiments, the columns are configured as groups. In some embodiments, whether the rows are groups or the columns are groups is configurable by a user. The groups 3602 are groups of people, events, tasks, organizations, clubs, emails/messages, and other entities that can be grouped. Preferably, an "ALL" group 3604 is included at the top of the grid, which includes all of the contacts in the living address book. However, in some embodiments, the "ALL" group 3604 is located elsewhere in the grid, does not exist or is configurably located by the user. Contacts groups 3606 are preconfigured and/or user generated and include, but are not limited to, coworkers, clients, friends and family. Event groups 3608 and other additional groups 3610 can also be preconfigured and/or generated. An example of additional groups 3610 includes metagroups, and an example of a metagroup is a group of ringtones. The names of the groups and the number of groups are configurable as well. For example, a user with many contacts may desire to generate multiple groups of friends where some friends are very close friends, some friends are college buddies and some are more professional friends. In some embodiments, the groups are unlabeled. In some embodiments, the groups are labeled with text and/or icons, and in some embodiments the labeling can be configured such as off/text/icons. Although FIG. 36 illustrates the GUI 3600 containing sections 3700 with a thumbnail image in each section 3700, other representations of contacts, events and metagroups can be shown such as text or videos. For example, instead of displaying a representative thumbnail image of Andy, the name "Andy" is shown in the section 3700. Preferably, at least one column of the grid is a column devoted to a user of the device, referred to as a "me" column 3612.

Figure 37:
FIG. 37 illustrates a close-up view of an exemplary section within the grid of the GUI of FIG. 36 in accordance with the system of the present invention.

FIG. 37 illustrates a close-up view of an exemplary section 3700 within the grid of the GUI 3600 in accordance with the system of the present invention. Each section 3700 within the grid contains information 3702 related to that contact, event or other entity. The information includes at least one of the following: a first name, a last name, a middle name, a middle initial, a signature, a birthday, a mobile phone number, a home phone number, a work phone number, corporate information, a physical address, a web address, an email address, an instant messenger username, a web log ("blog"), an image, a video, an audio file, a song, a ring tone, a zodiac sign, a horoscope, a mood, event information, personal physical characteristics such as hair color, eye color, height, weight, gender and age, a current relationship status such as single, recently broken up, with someone, engaged, married and divorced, a current selected location such as "at the mall", notes, a gaming username, personal preferences such as likes/dislikes, dynamic information such as a geographic location, time zone and availability and other information. Preferably, a menu 3704 or other input mechanism allows selection of the information 3702 to be displayed. Furthermore, there may be multiple pages for each section 3700. For example, a first page includes contact details, a second page contains physical address details, a third page contains personal details such as birthday, horoscope, vacation plans, availability and mood and a fourth page contains a blog. The page orders and contents of each section 3700 are completely configurable, and there can be more or less pages for each section 3700.

In some embodiments, the information is able to be purchased by another user. For example, after a phone call, a user is able to purchase the ring tone played. Additionally, if a user recognizes a ring tone, he is able to purchase the ring tone. For example, a user notices a ring tone of a friend, and later the user is able to acquire the ring tone to use as his own.

Aside from the "me" column 3612 or similar columns, each section 3700, specifically each contacts section information 3702, is preferably generated from information transferred or pushed by another user. Preferably, the information is transferred utilizing one or more applications of the living address book using the synchronization scheme as described above and incorporated herein. The information can be transferred directly from one device to another, and the information can also be transferred via multiple hops. For example, user A can transfer his information to user B directly or can transfer his information to a server which then transfers the information to user B. In alternative embodiments, the information is transferred using another transfer scheme besides the synchronization scheme. For example, user B generates information to be stored in a living address book section representing himself where he includes a picture of himself, his contact information and his blog. User B then sends that information to user A's device which stores the information in a section within the grid. User A can preconfigure where the information is located or can configure where the information is located after it is received. For example, User A can put User B's information into his "friends" group. In some embodiments, the information is not stored on the receiving user's device but is accessible by the device. The information can be altered from the receiver's device and/or sender's device, wherein altering includes generating, adding, deleting and modifying. For example, if a user initially sends an image of himself, but later decides to change the image, the user can alter his information by changing the image on his device which is then transmitted to the devices which contain or display his information. In some embodiments, the sender can lock his information, so that only he can modify the information. The information can also be altered by an administrator if the device is configured accordingly. For example, a large company requires its employees to use a mobile device which contains the contact information of all of the employees. To maintain accurate contact information an administrator can manage the additions, deletions and modification of employees as they are hired, fired and have changes to their information.

As described above, preferably at least one column of the grid is a column devoted to a user of the device, referred to as a "me" column 3612. Each section 3700 of the "me" column 3612 corresponds to the appearance of the user based on the contact groups 3606. As described above, a user can generate multiple personas for himself for different groups of people. For example, the "me" section 3700 corresponding to the "family" group includes different personification information than the "me" section 3700 corresponding to the "coworkers" group. Additional columns are able to be devoted to a company/organization or another entity.

To configure sections 3700 in the "me" column 3612, the user edits information such as the information described above: a personal picture, contact information, physical address information, personal information, a ringtone, a blog and other information. For each group, different information can be stored. For example, if the living address book contains the groups of family, friends and coworkers in the "me" column 3612, the user supplies the desired information specific to each group. For family, the user may supply a nice picture, provide contact information and physical address information and nothing more. For friends, the user may supply an amusing picture, contact information, physical address information and some additional personal information such as what upcoming parties there are as well as a personal blog. For coworkers, a professional picture may be used, and contact information is stored in addition to a professional blog. Each "me" section 3700 for the separate groups can be configured as desired so that a user can provide different information to different groups of people. The appropriate "me" section 3700 is then sent to the contacts in the respective groups. If a user wants multiple groups to see the same information, the user can copy a "me" section 3700 from one group to another. In some embodiments, some, if not all of the information is stored centrally, and the user selects whether or not to include the information in a specified "me" section 3700. For example, instead of a user repeatedly entering his mobile phone number, home phone number and address for others to have, the information is entered once and stored, and then via an interface (e.g. check boxes or menu items), the user selects which information will be available to which groups. Furthermore, some of the information can come from multiple locations such as a calendar and/or other locations.

Figure 38:
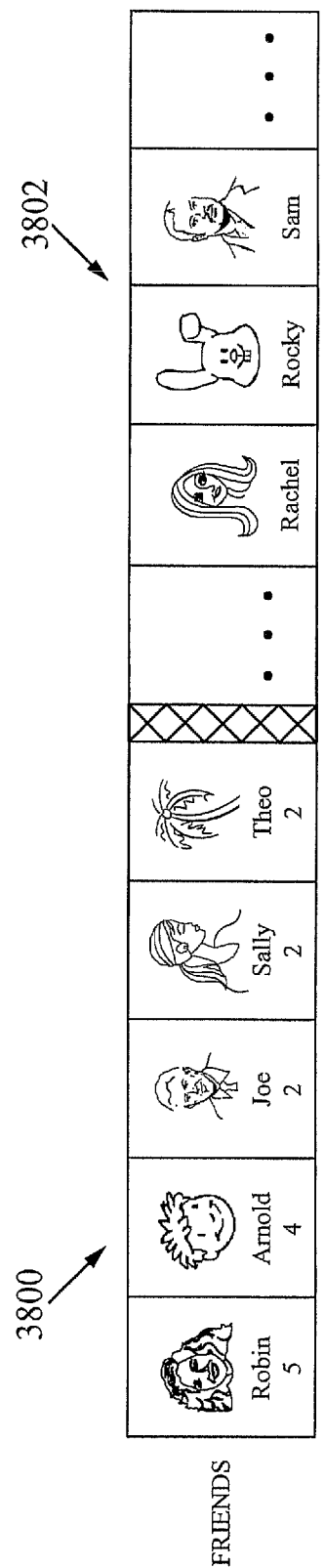
FIG. 38 illustrates an ordering of two subgroups of the grid of the GUI of FIG. 36 in accordance with the system of the present invention.

Within each group, the order of the sections 3700 is configurable as to whom is listed first, second and so on. A user can manually set the order such that person X is listed first and so forth. The order can also be based on one or more schemes such as alphabetical order, call frequency, most recent to least recent calls, personal relevancy, importance rank, relationship to a specific user and personal preference. Preferably, alphabetical ordering is based on first name, but in other embodiments, the ordering is based on last name or is configurable. As an example of the different order configurations, if the user has a "friends" group which includes all of the user's friends and acquaintances that the user has ever met, simple alphabetical order is not likely the most efficient method of ordering the sections 3700. If the user calls his girlfriend, Robin, 5 times a day, and has not talked with Rachel in 10 years, it is not very logical to have Rachel listed ahead of Robin via simple alphabetical order. However, if call frequency, recent calls, personal preference and/or other factors are factored in to determine the order, the section 3700 containing Robin can be located closer to the beginning of the group rather than at the alphabetical location. In some embodiments, each group contains two or more subgroups for ordering purposes, wherein each subgroup is ordered by a different scheme. For example, as shown in FIG. 38, a "friends" group contains a first subgroup 3800 which is ordered based on call frequency and a second subgroup 3802 which is ordered alphabetically. The first subgroup 3800 can optionally show how many times the person has called or has been called in a time period such as the past 24 hours. Therefore, using the above example with Robin who is called 5 times a day, she will be located in the first subgroup 3800, and Rachel, who has not been contacted in 10 years, will be located in the second subgroup 3802 grouped with persons having the first name beginning with "R". The sections can be ordered by other information beyond names also. For example, mood can be used so that a user can see who is in a better mood. For the "events" group the order can be any of the above listed orders and can be based on the order of arrival or the order of occurrence. For example, if the events are birthdays, the birthday coming soonest is preferably first in the group. For the metagroups, the order can be based on other items such as popularity for an order of ringtones. Any ordering scheme that provides a better user experience is contemplated within the scope of the present invention.

In addition to the contents of the groups being configurable, the order of the groups is also configurable. For example, if family is one of the most important groups, then the "family" group is one of the first groups at the top, while a less important group such as "high school buddies" might be one of the last groups. The order of the groups can be based on other characteristics as well.

Referring again to FIG. 36, contacts groups 3606 are not the only groups that can be preconfigured and/or generated; an events group 3608 or groups can be as well. The events group 3608 contains a variety of events such as birthday notifications, trip notifications, new SMS messages, MMS messages and other events. The event information can come from varying locations such as within a contact entry in a section of the grid for the birthday notification, a calendar for the trip notification and a message store for the SMS message. Other possible sources of event information include voice mail, e-mail and blogs. Event information can come from anywhere accessible to the device, such as within the device or beyond the device. In some embodiments, the event group 3608 also includes a summary of inbound communications.

In addition to the contacts groups 3606 and event groups 3608, metagroups 3610 can also be generated. Metagroups 3610 are preferably generated by a user. Some metagroups 3610 are subgroups of groups already generated. For example, the user can generate metagroups 3610 for people based on their birthdays to more easily remember when to get gifts. Other possible metagroups 3610 include a list of ringtones (such as shown in FIG. 36), auction data, images, videos, songs, moods, web sites, and contacts based on geographic location.

Figure 39A:
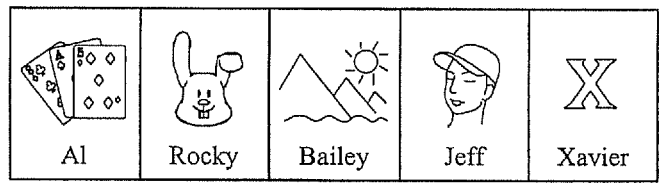
FIGS. 39A-39D illustrate speed dial implementations in accordance with the system of the present invention.
Figure 39B:
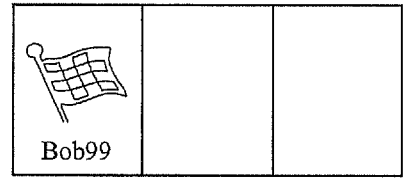
Figure 39C:
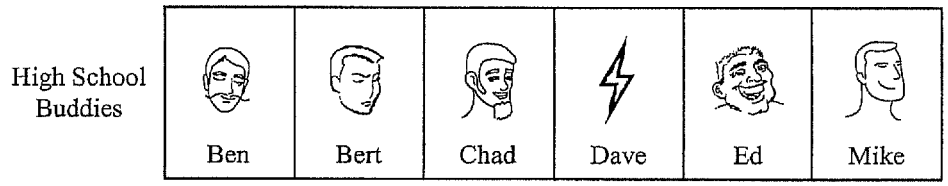
Figure 39D:
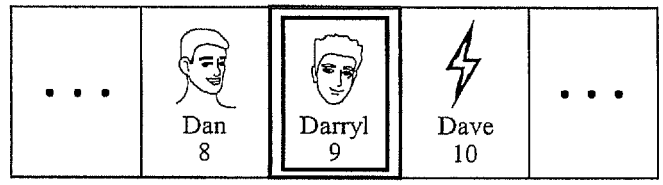

A speed dial component is also implemented within the living address book GUI 3600. FIGS. 39A-39D illustrate speed dial implementations in accordance with the system of the present invention. FIG. 39A shows, in one configuration, the speed dial displays all of the contacts in a specified metagroup. FIG. 39B shows, in another configuration, the result of pressing a number for speed dial, such as 9, to display everyone who has the number 9 in their name. FIG. 39C shows, in yet another configuration, the result of selecting a speed dial number to display an entire group which has that speed dial label. FIG. 39D shows, in another configuration, a row of sections which implement a standard speed dial of a number where a contact is designated by the number. Other speed dial implementations are possible as well.

A voice input component is implemented with the living address book GUI 3600. Voice input allows users to speak, rather than type, their input. For example, instead of clicking on "search" and then typing "Robin" to search for "Robin," the user can say "search" and the name "Robin," and the section for Robin will be shown. Any feature that requires typing can be implemented by voice input including but not limited to searching for a contact, calling a contact, generating information about a contact, adding information, deleting information or modifying information.

Figure 40:
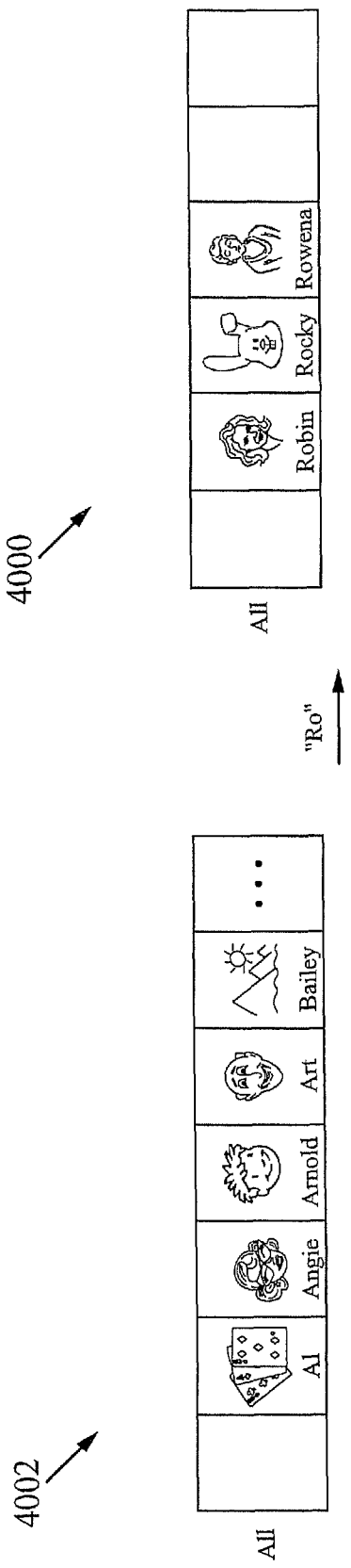
FIG. 40 illustrates a graphical representation of an exemplary metagroup used in cooperation with an intelligent search engine to temporarily modify larger groups while searching in accordance with the system of the present invention.

FIG. 40 illustrates a graphical representation of an exemplary metagroup 4000 used in cooperation with an intelligent search to temporarily modify larger groups while searching in accordance with the system of the present invention. For example, if the "ALL" group 4002 contains 5,000 contact sections 3700, simply searching via scrolling left and right is not very efficient or precise as the user will likely have to go back and forth often to ultimately reach the desired section 3700 within the 5,000 sections 3700. However, via the intelligent search, the number of sections will be narrowed based on entered text to generate a smaller metagroup 4000. For example, the user searches for Robin. While in the "ALL" group, the user first enters "R" via the buttons or touch screen of a device which narrows the displayed sections to only those contacts which start with the letter "R." The user enters an "o" so that "Ro" has been entered. Only sections with names beginning with "Ro" from the metagroup 4000 will be displayed. Thus, a group with 5,000 contacts has been shrunk down to a metagroup 4000 containing Robin, Rocky and Rowena, making it much easier to find and select Robin. Furthermore, the search is not limited to names; any information 3702 within each section can be input to thereby narrow the search results.

Figure 41A:
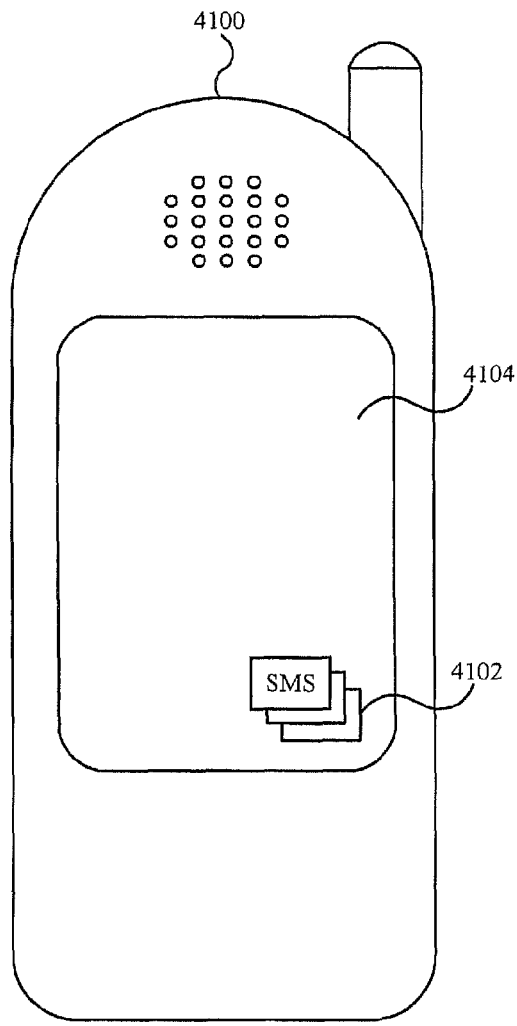
FIG. 41A illustrates a device containing summarized objects in accordance with the system of the present invention.

FIG. 41A illustrates a device 4100 displaying a summarization component 4102 which provides a summary of any modifications to the living address book in accordance with the system of the present invention. Modifications to the living address book include, but are not limited to any changes of sections such as a contact modification, an event modification, SMS messages, MMS messages, email and voice mail. The summarization component 4102 contains information related to the address book as well as other components of the device. The summarization component preferably utilizes a ring buffer so that the information stored within is continuously accessible as in a ring. Referring to FIGS. 36 and 41A, in some embodiments, the summarization component 4102 is included in a section 3700 within the GUI 3600, and preferably within a section 3700 within the events group 3608. In some embodiments, the summarization component 4102 is a separate interface. As a separate interface, the summarization component 4102 is preferably displayed in a corner of the device's screen 4104.

Figure 41B:
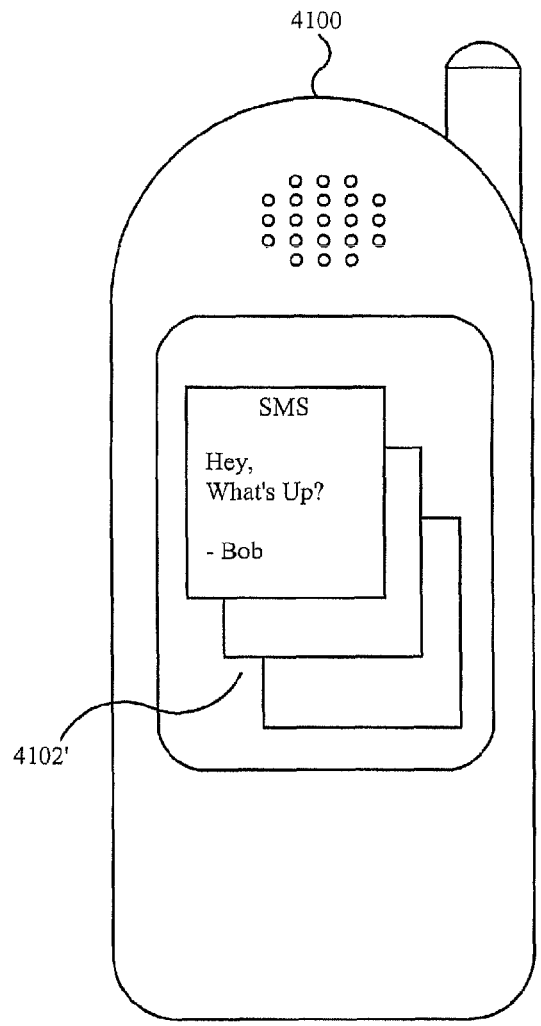
FIG. 41B illustrates a device containing an expanded summarization component which provides a summary of any modifications to a living address book in accordance with the system of the present invention.

After a user selects the summarization component 4102 to view the summarized objects 4102' of the summarization component 4102, the summarized objects 4102' appear in an expanded view as shown in FIG. 41B. In the expanded view, the summarized objects 4102' are able to be scrolled as well. In some embodiments, selecting a summarized object of the summarization component 4102 only displays a single selected summarized object instead of the scrollable group as shown. Further interaction using the summarized objects is possible such as responding to a received email, voicemail or text message.

Figure 42:
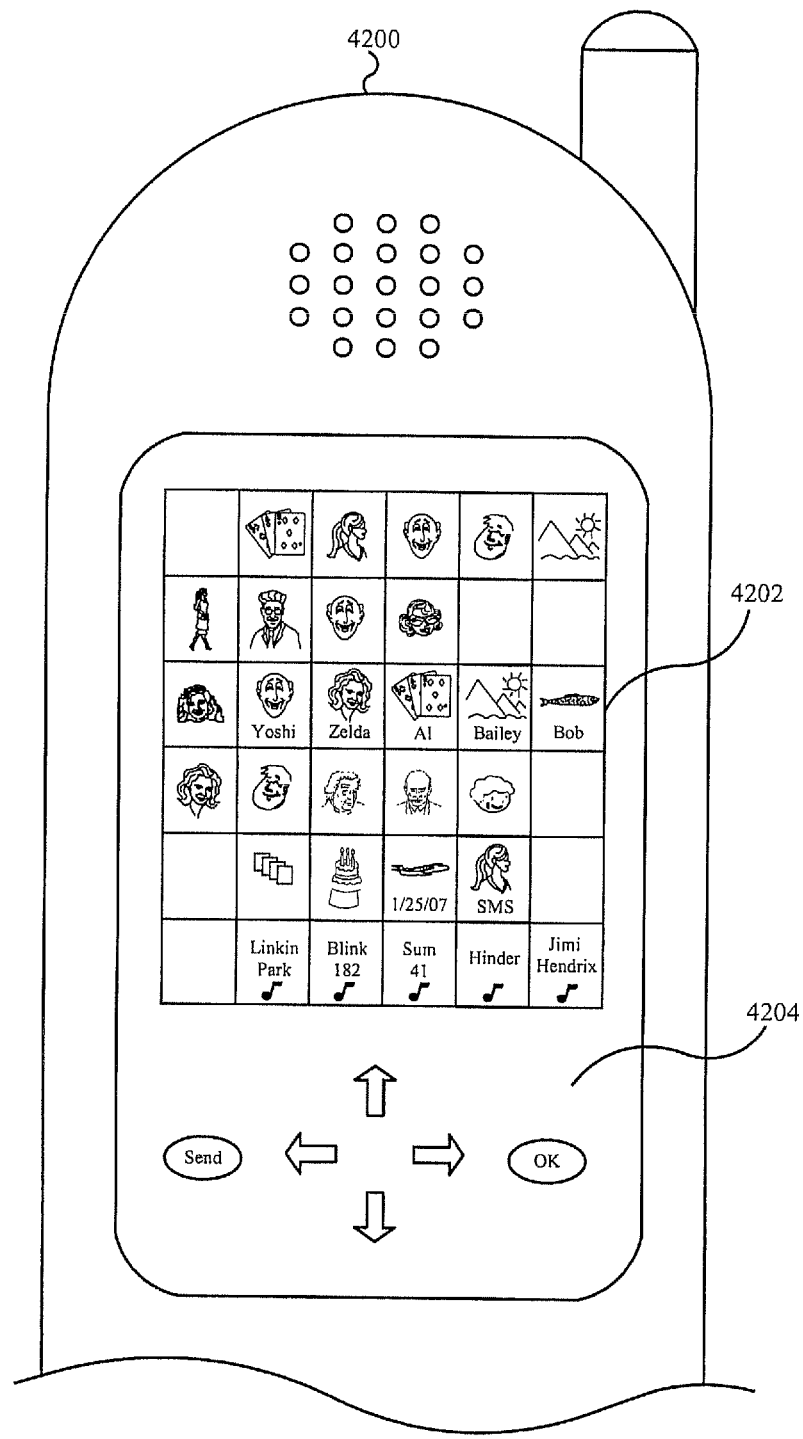
FIG. 42 illustrates a device with a GUI wherein a row is implemented as a ring buffer in accordance with the system of the present invention.

Referring to FIGS. 36 and 42, in operation, to navigate through the GUI 3600, a user utilizes buttons, a touch screen 4204 and/or another input mechanism. When navigating, by pressing and holding a button or a part of a touch screen 4204 on the device to scroll in a direction, a visual effect is displayed. Preferably, the visual effect is a blur effect, although other effects are possible. Moreover, in some embodiments, the longer the button or touch screen 4204 is depressed, the faster the scrolling occurs.

Once the user navigates to a desired section, the user can perform a number of different actions. The user can perform any standard mobile phone operation such as calling the person in the currently selected section by pressing a "talk" button or similar feature. In some embodiments, the user can access and alter the section by pressing an "ok" button or similar feature. Accessing and altering include, but is not limited to, reviewing, retrieving, generating, adding, editing, configuring and deleting information. Preferably, accessing also includes displaying a full screen of an image contained in the section. Preferably, the image is representative of the person or event. In addition to accessing and altering each section, a user can access and alter entire groups. For example, a user can select to block calls from an entire group.

FIG. 42 shows a device 4200 with a GUI 3600 wherein a row is implemented as a ring buffer 4202 in accordance with the system of the present invention. Preferably, the information displayed by the GUI 3600 is stored within ring buffers to allow easy navigation. The ring buffers or another implementation enable users to continuously scroll without reaching an end. As shown in FIG. 42, as the user scrolls around a group and reaches the last section of the group, such as Zelda, the first section of the group appears, such as A1, and the rest of the group continues, so that the group is a continuous ring. Preferably, each row of groups utilizes an independent ring buffer so that only a single group is scrolled when the user scrolls right or left. In some embodiments, all of the groups scroll at the same time. Preferably, all of the columns scroll at the same time. In some embodiments, the "me" column 3612 (FIG. 36) or other designated columns scroll alone while the other columns remain stationary.

In addition to providing better management of information and easier navigation through the information, the living address book also can be utilized when an incoming call is received. When a device receives a call, instead of receiving only a caller's name, phone number, the caller's picture and possibly a ringtone, additional information can also be provided. As described above and shown in FIG. 18, around the caller's birthday, the user can receive a notification/reminder of the birthday or other event. Furthermore, this information can come from multiple sources such as a calendar, the living address book, a central database and other sources. The user can configure what information is received, for example, to always receive geographic location information for callers. The information received can also be conditional. For example, a husband can configure the device to display anniversary information during the thirty days before their anniversary any time his wife calls within that period.

In addition to retrieving information from multiple sources when receiving a call, the living address book can retrieve information that is utilized within the GUI 3600. As described above, information can be retrieved from the calendar, a central database, other databases, web sites like Facebook[SM] and Myspace®, personal computers and other locations. For example, instead of using an image stored on a device as the image for a user's persona, the image can be from a link to picture on myspace.com. In another example, the information can be retrieved from a central database of employee contact information instead of storing all of that information on each device.

The living address book can also provide information to callers when the user of the device is unavailable. As described above, the living address book supports controlling both the calling user's phone and the called user's phone. If user B has configured his "me" persona (which is downloaded to user A) to prevent calls during a certain period of time, the client application on the calling user's phone can prevent user A from connecting to user B during this period.

Furthermore, a user can determine to whom he is available and to whom he is not and how each group of people is informed of the user's availability. For example, if the user has a meeting in which he does not want to be interrupted by anyone except other coworkers, he can configure his settings, preferably in his "me" column 3612, so that his device will indicate income calls only from co-workers. The user can select how his device indicates a call based on whom is calling. For example, the user can set a device to accept calls from coworkers and family but no one else, and set the phone to ring only for coworkers and vibrate for family. The user can also set individual settings. For example, a husband with an expecting wife can configure the living address book to always receive her calls. Many other calling configurations are possible as well.

Furthermore, the user can configure an automatic response, if desired, which indicates that the user is temporarily unavailable. Any response is possible, such as an automatic text message which simply says, "currently unavailable" or a specific message such as "in meeting from 10:00 am-11:00 am." The response can also direct the caller to perform a specified activity such as "send me a text message." The user can set varying responses for each group such as do nothing when friends call, send "currently unavailable" when family calls and send the specific meeting time if anyone in an "attorney" group calls. Other items can be sent in the response as well, such as a ringtone, an image or anything else that the user chooses.

The user can also configure the device to only allow certain types of communications such as text messages but not voice calls. These settings can be based on contact groups.

Incoming calls can be routed based on other conditions besides availability of the user. For example, if the user wants to ensure he talks only to people in a good mood, the device can route calls directly to voice mail from people whose mood does not meet a certain threshold. Furthermore, a message can be sent to that person who does not meet the threshold such as to "cheer up."

Users can also project their availability to others in their address book. As shown in FIG. 36, when a user views the GUI 3600, indicators indicate the status of contacts within the address book. For example, the contacts section 3650 indicates that the user is unavailable because, for instance, that user's mobile phone is turned off. The contacts section 3652 indicates that the user is not receiving incoming calls by a "no" or "stop" icon for example. Other indicators can be used, for example, grayed out sections, different colored backgrounds (e.g. red), other icons and text. Furthermore, additional information such as a detailed message can be displayed when highlighting the section or selecting the section. By utilizing these indicators, users no longer have to call to determine if a user is available or not.

Figure 43:
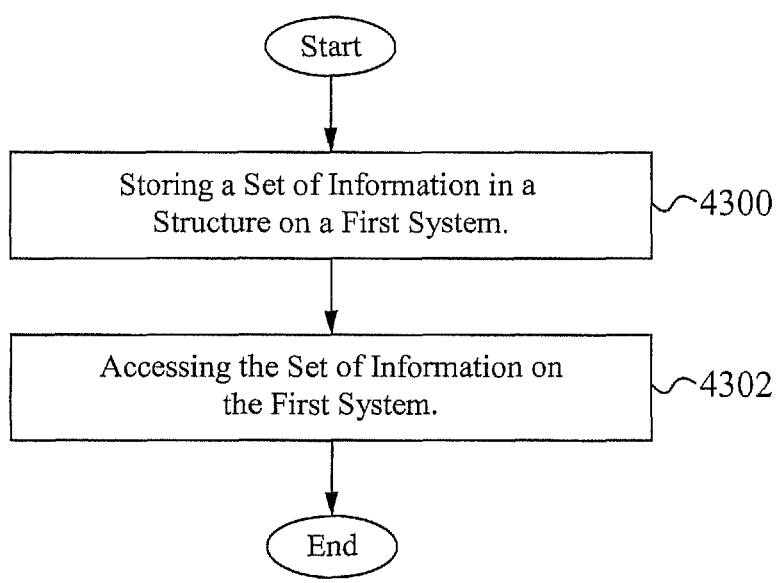
FIG. 43 illustrates a flowchart of a process for utilizing the living address book in accordance with the system of the present invention.

FIG. 43 illustrates a flowchart of a process for utilizing the living address book in accordance with an embodiment of the present invention. In the step 4300, information accessible through a GUI is stored in a structure on a first system. In some embodiments, storing the information includes first sending or pushing the information from a second system to the first system. Preferably, a subset of the information is altered on or by the second system or other additional systems. Specifically, the subset of information sent by the second system is altered by the second system. Preferably, the information is pushed by the second system utilizing a synchronization implementation. As described above, pushing does not have to be directly from the second system to the first system; intermediate systems are able to direct and/or store the information. Preferably, the GUI utilizes a set of ring buffers to store the information. Preferably, the GUI includes a grid of sections arranged with one or more rows and one or more columns.

In the step 4302, the information is accessed to be displayed. In some embodiments, accessing can lead to or include altering the information such as by generating, adding to, deleting from or updating the information by the first system. In some embodiments, all of the information is alterable by the first system. In some embodiments, some of the information is alterable only by a system that sent the information. In some embodiments, the information is dynamically alterable. The information includes at least one of the following: a first name, a last name, a middle name, a middle initial, a signature, a birthday, a mobile phone number, a home phone number, a work phone number, corporate information, a physical address, a web address, an email address, an instant messenger username, a blog, an image, a video, an audio file, a song, a ring tone, a zodiac sign, a horoscope, a mood, event information, personal physical characteristics such as hair color, eye color, height, weight, gender and age, a current relationship status such as single, recently broken up, with someone, engaged, married or divorced, a current selected location such as "at the mall", notes, a gaming username, a nickname, personal preferences such as likes/dislikes, dynamic information such as a geographic location, time zone and availability and other information.

In addition to displaying and altering the information, a user can also search the information with the first system. The search is an intelligent search as described above.

To access the information a user preferably navigates by scrolling through any one or more of the one or more columns and the one or more rows to reach a section. Preferably, when the one or more columns and/or the one or more rows are scrolled, a visual effect such as a blur effect is displayed. Preferably, the length of time a user holds down an input device such as a button or touch screen increases the scrolling speed. Each section of the grid contains the information directed to a single entity, which includes a person, an event, a task, an organization, a club, an email/message or any other entities.

Preferably, each row of the one or more rows of the GUI corresponds to a group. In some embodiments, accessing the information can include configuring the information into groups. Configuring the groups includes grouping contacts, events, metagroups and other items into groups. The event group includes information obtained from one or more different sources such as a calendar, the living address book, an SMS, an MMS, a central database, a web log, a website and/or other sources. The event group can also include a summary of inbound communications. Preferably, the summary of inbound communications utilizes a ring buffer. The metagroup or groups include birthdays, ringtones, auction data, images, videos, songs, moods, web sites, contacts based on geographic location and/or other items.

Preferably, each section of each of the one or more rows of the grid is ordered. The order is based on at least one of an alphabetical order, call frequency (e.g. from most frequent to least frequent), recent calls, personal relevancy, importance rank, relationship, personal preference and other criteria. Preferably, the order is configurable by a user. Preferably, the GUI includes a speed dial component. Preferably, the GUI also supports voice input that allows entering search terms and criteria by voice. In some embodiments, the information is generated by an administrator.

In some embodiments, accessing the information also includes configuring/altering information related to the user. Preferably, at least one column of the one or more columns of the GUI is dedicated to user information related to at least one of a user of the first system, an organization or another entity. For example, one of the columns is a "me" column 3612. In some embodiments, each section of the column dedicated to the user is different. For example, a "me" section for "family" is different than a "me" section for "coworkers."

In some embodiments, call filtering is implemented such that depending on the caller's grouping, the first system performs a certain action such as blocking the call, sending an automated response to the caller or accepting the call. In some embodiments, status information of the first system is displayed on the second system. The status information includes, for example, availability, geographic location, time zone and other information. The steps above are only illustrative and some steps can be deleted, others can be added and the steps can be performed in a different order.

Figure 44:
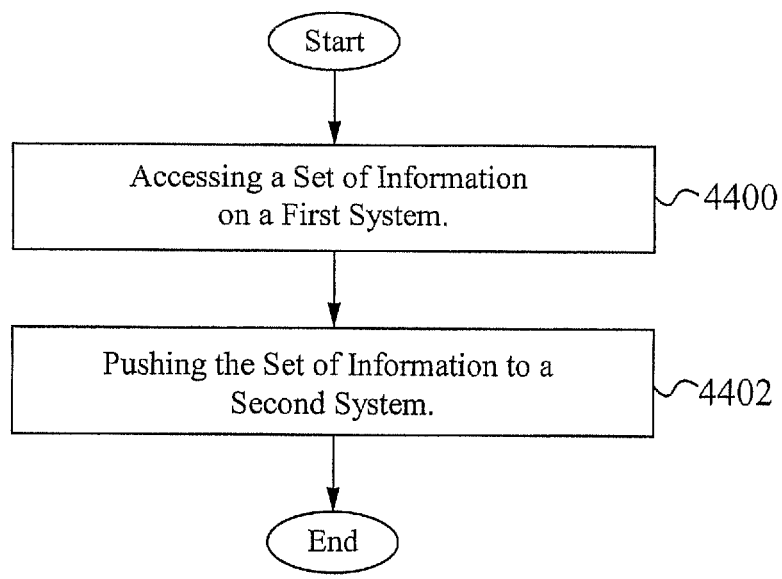
FIG. 44 illustrates a flowchart of a process for utilizing the living address book in accordance with the system of the present invention.

FIG. 44 illustrates a flowchart of a process of utilizing the living address book in accordance with an embodiment of the present invention. In the step 4400, information is accessed to display or alter the information such as by generating, adding to, deleting from or updating by a first system. The information includes at least one of the following: a first name, a last name, a middle name, a middle initial, a signature, a birthday, a mobile phone number, a home phone number, a work phone number, corporate information, a physical address, a web address, an email address, an instant messenger username, a blog, an image, a video, an audio file, a song, a ring tone, a zodiac sign, a horoscope, a mood, event information, personal physical characteristics such as hair color, eye color, height, weight, gender and age, a current relationship status such as single, recently broken up, with someone, engaged, married or divorced, a current selected location such as "at the mall", notes, a gaming username, a nickname, personal preferences such as likes/dislikes, dynamic information such as a geographic location, time zone and availability and other information. Preferably, the information is related to the user. Preferably, at least one column of the one or more columns is dedicated to user information related to at least one of a user of the first system, an organization or another entity. For example, one of the columns is a "me" column 3612. In some embodiments, each section of the column dedicated to the user is different. For example, a "me" section for "family" is different from a "me" section for "coworkers." Preferably, the information is accessible through the GUI. Preferably, the GUI utilizes a set of ring buffers. Preferably, the GUI includes a grid of sections arranged with one or more rows and one or more columns.

In the step 4402, the information is pushed to a second system. Preferably, the information is pushed utilizing a synchronization implementation. As described above, pushing does not have to be directly from the first system to the second system; intermediate systems are able to direct or store the information.

In some embodiments, a user can search the set of information with the first system. The search is an intelligent search such as described above.

To access the information a user preferably navigates by scrolling through any one or more of the one or more columns and the one or more rows to reach a section. Preferably, when the one or more columns and/or the one or more rows are scrolled a visual effect such as a blur effect is displayed. Preferably, the length of time a user holds down an input device such as a button or touch screen increases the scrolling speed. Each section of the grid contains the set of information directed to a single entity, wherein the single entity includes a person, an event, a task, an organization, a club, an email/message or any other entities.

Preferably, each row of the one or more rows of the GUI corresponds to a group. In some embodiments, accessing the information can include configuring the information into groups. Configuring the groups includes grouping contacts, events, metagroups and other items into groups. In some embodiments, the information pushed to the second system depends on the group the second system corresponds to. The event group includes information obtained from one or more different sources such as a calendar, the living address book, an SMS, an MMS, a central database, a web log, a website and/or other sources. The event group can also include a summary of inbound communications. Preferably, the summary of inbound communications utilizes a ring buffer. The metagroup or groups include birthdays, ringtones, auction data, images, videos, songs, moods, web sites, contacts based on geographic location and/or other items.

Preferably, each section of each of the one or more rows of the grid is ordered. The order is based on at least one of an alphabetical order, call frequency, recent calls, personal relevancy, importance rank, relationship, personal preference and others. Preferably, the order is configurable by a user. Preferably, the GUI includes a speed dial component. Preferably, the GUI also supports voice that allows entering search terms and criteria by voice. In some embodiments, the set of information is generated by an administrator.

In some embodiments, call filtering is implemented such that depending on the caller's grouping, the first system performs a certain action such as blocking the call, sending an automated response to the caller or accepting the call. In some embodiments, status information of the first system is displayed on the second system. The status information includes, for example, availability, geographic location, time zone and other information. The steps above are only illustrative and some steps can be deleted, others can be added and the steps can be performed in a different order.

Examples of suitable devices which utilize the living address book include a personal computer, a computer workstation, a mainframe computer, a handheld computer, a personal digital assistant, a pager, a cellular telephone, a smart appliance or a multiple computers, a storage area network, a server farm, or any other suitable computing device.

Any GUI modifications which improve usability of the living address book are contemplated within the scope of the present invention.

The present invention has been described in terms of specific embodiments incorporating details to facilitate the understanding of principles of construction and operation of the invention. Such reference herein to specific embodiments and details thereof is not intended to limit the scope of the claims appended hereto. It will be readily apparent to one skilled in the art that other various modifications may be made in the embodiment chosen for illustration without departing from the spirit and scope of the invention as defined by the appended claims.

What is claimed is:

1. A method of utilizing an interactive address book on a first system comprising:
   a) altering a set of information in the interactive address book on the first system, wherein the set of information is accessible through a graphic user interface in a grid of sections containing one or more rows and columns;
   b) pregrouping the set of information with same or similar characteristics to be presented in either the rows or the columns;
   c) presenting the characteristics in either the rows or the columns configurable by a user;
   d) configuring, for at least one group, each section in a group to simultaneously contain different information;
   e) generating a visually recognizable icon for each of the sections in a majority of an area of the section for identifying the same or similar characteristics;
   f) arranging the visually recognizable icons in a same row or a same column; and
   g) pushing the set of information to a second system, wherein the set of information controls a representation of a user of the first system on the second system.

2. The method of claim 1 wherein altering includes any one of generating, adding, deleting, modifying and any combination of these.

3. The method of claim 1 wherein the set of information includes at least one of a first name, a last name, a middle name, a middle initial, a signature, a birthday, a mobile phone number, a home phone number, a work phone number, corporate information, a physical address, a web address, an email address, an instant messenger username, a web log, an image, a video, an audio file, a song, a ring tone, a zodiac sign, a horoscope, a mood, event information, personal physical characteristics, a current relationship status, a current selected location, text data, a gaming username, a nickname, personal preferences, a geographic location, a time zone and availability.

4. The method of claim 1 wherein the first system is selected from the group consisting of a personal computer, a computer workstation, a mainframe computer, a handheld computer, a personal digital assistant, a pager, a cellular telephone, a smart appliance, multiple computers, a storage area network and a server farm.

5. The method of claim 1 wherein the second system is selected from the group consisting of a personal computer, a computer workstation, a mainframe computer, a handheld computer, a personal digital assistant, a pager, a cellular telephone, a smart appliance, multiple computers, a storage area network and a server farm.

6. The method of claim 1 wherein pushing utilizes a synchronization implementation.

7. The method of claim 1 wherein the user interface utilizes a set of ring buffers.

8. The method of claim 1 further comprising scrolling through the one or more columns and the one or more rows.

9. The method of claim 8 further comprising displaying a visual effect while scrolling the one or more columns and the one or more rows.

10. The method of claim 9 wherein the visual effect is a blur effect.

11. The method of claim 8 wherein a scroll speed of the one or more columns and the one or more rows increases relative to a length of time a user holds down a corresponding scroll input device on the first system.

12. The method of claim 11 wherein the scroll input device is selected from the group consisting of a button and a touch screen.

13. The method of claim 1 wherein each section of the grid contains information directed to a single entity.

14. The method of claim 13 wherein the single entity is selected from the group consisting of a person, an event, a task, an organization, a club and an email/message.

15. The method of claim 1 wherein each row of the one or more rows of the user interface corresponds to a group.

16. The method of claim 15 further comprising configuring the group.

17. The method of claim 15 wherein the group corresponds to at least one of people, events, tasks, organizations, clubs and metagroups.

18. The method of claim 15 wherein the set of information pushed to the second system depends on the group the second system corresponds to.

19. The method of claim 1 wherein at least one column of the one or more columns is dedicated to user information related to at least one of a user of the first system, an organization and an entity.

20. The method of claim 19 wherein each section of the column dedicated to user information is different.

21. The method of claim 1 wherein each section of each of the one or more rows of the grid is ordered in an order.

22. The method of claim 21 wherein the order is selected from the group consisting of alphabetical, call frequency, most recent to least recent calls, personal relevancy, importance rank, relationship to a specific user and personal preference.

23. The method of claim 21 wherein the order is a combination of two or more of alphabetical, call frequency, most recent to least recent calls, personal relevancy, importance rank, relationship to a specific user and personal preference.

24. The method of claim 21 wherein the order is configurable by a user.

25. The method of claim 1 wherein the user interface includes an intelligent search engine wherein the intelligent search engine incorporates metagroups to help a user narrow a search.

26. The method of claim 1 wherein the user interface includes a speed dial component.

27. The method of claim 1 wherein the user interface supports voice input.

28. The method of claim 27 wherein a search engine is configured to perform searches against the voice input.

29. The method of claim 15 wherein the group is an event group which includes information obtained from one or more different sources.

30. The method of claim 29 wherein the one or more different sources include a calendar, an SMS message, an MMS message, a database, a web log and a web page.

31. The method of claim 29 wherein the event group includes a summary of inbound communications.

32. The method of claim 31 wherein the summary of inbound communications utilizes a ring buffer.

33. The method of claim 15 wherein the group is a metagroup which includes a list of items selected from the group consisting of ringtones, auction data, images, videos, songs, moods, web sites and contacts based on geographic location.

34. The method of claim 1 wherein the set of information is generated by an administrator.

35. The method of claim 1 further comprising filtering calls.

36. The method of claim 35 wherein filtering calls includes sending an automated response to a caller.

37. The method of claim 1 further comprising displaying on the second system status information of the first system.

38. The method of claim 37 wherein the status information includes at least one of availability, geographic location and time zone.

39. The method of claim 1 wherein a user of the first system is prompted to purchase content played on the first system after a call is received.

40. The method of claim 1 wherein a user of the second system is prompted to purchase content contained on the first system.

41. The method of claim 1 wherein the interactive address book stores address information for a first user and the second system stores an interactive address book storing address information for a second user, wherein the first and second users are different.

* * * * *